United States Patent
Park et al.

(10) Patent No.: US 10,993,598 B2
(45) Date of Patent: May 4, 2021

(54) ROBOT CLEANER AND METHOD OF CONTROLLING THE SAME

(71) Applicant: LG ELECTRONICS INC., Seoul (KR)

(72) Inventors: Jeongseop Park, Seoul (KR); Jaewon Jang, Seoul (KR); Donghoon Kim, Seoul (KR)

(73) Assignee: LG ELECTRONICS INC., Seoul (KR)

(*) Notice: Subject to any disclaimer, the term of this patent is extended or adjusted under 35 U.S.C. 154(b) by 194 days.

(21) Appl. No.: 16/333,124

(22) PCT Filed: Jul. 14, 2017

(86) PCT No.: PCT/KR2017/007562
§ 371 (c)(1),
(2) Date: Mar. 13, 2019

(87) PCT Pub. No.: WO2018/012923
PCT Pub. Date: Jan. 18, 2018

(65) Prior Publication Data
US 2019/0223678 A1    Jul. 25, 2019

Related U.S. Application Data

(60) Provisional application No. 62/362,358, filed on Jul. 14, 2016.

(51) Int. Cl.
| | |
|---|---|
| A47L 11/283 | (2006.01) |
| A47L 11/293 | (2006.01) |
| A47L 11/14 | (2006.01) |
| A47L 11/282 | (2006.01) |
| B08B 3/04 | (2006.01) |

(Continued)

(52) U.S. Cl.
CPC ............. *A47L 11/283* (2013.01); *A47L 9/009* (2013.01); *A47L 9/0606* (2013.01);
(Continued)

(58) Field of Classification Search
CPC ........ A47L 11/283; A47L 11/16; A47L 11/40; A47L 11/292; A47L 11/20; A47L 11/24;
(Continued)

(56) References Cited

U.S. PATENT DOCUMENTS

| | | |
|---|---|---|
| 3,381,334 A | 5/1968 | Redmond |
| 3,827,099 A | 8/1974 | Allaire et al. |

(Continued)

FOREIGN PATENT DOCUMENTS

| | | |
|---|---|---|
| CN | 1823677 | 8/2006 |
| CN | 2817718 U | 9/2006 |

(Continued)

OTHER PUBLICATIONS

PCT Search Report dated Sep. 28, 2017, on PCT International Patent appl. No. PCT/KR2017/007549.

(Continued)

*Primary Examiner* — Mikhail Kornakov
*Assistant Examiner* — Richard Z. Zhang
(74) *Attorney, Agent, or Firm* — Finnegan, Henderson, Farabow, Garrett & Dunner, LLP

(57) ABSTRACT

A robot cleaner includes a rolling cleaning module including a rolling member configured to rotate clockwise or counterclockwise when viewed from a left side while in contact with a floor, a sensor unit, and a controller configured to detect a change in position of the robot cleaner and a change in load current of a motor connected to the rolling member based on data detected by the sensor unit. When there is a change in position and a change in load current, a specific area of a floor is determined to be a contaminated area.

12 Claims, 27 Drawing Sheets

| | A CHANGE IN THE LOAD CURRENT O | A CHANGE IN THE LOAD CURRENT X |
|---|---|---|
| A CHANGE IN THE POSITION O | CONTAMINATION | MOVEMENT CAUSED BY EXTERNAL FORCE |
| A CHANGE IN THE POSITION X | CHANGE OF A KIND OF A FLOOR | NORMAL |

(51) Int. Cl.

| | |
|---|---|
| B08B 3/08 | (2006.01) |
| A47L 11/292 | (2006.01) |
| A47L 11/40 | (2006.01) |
| A47L 11/16 | (2006.01) |
| A47L 11/34 | (2006.01) |
| B25J 9/16 | (2006.01) |
| B25J 11/00 | (2006.01) |
| G05D 1/02 | (2020.01) |
| A47L 9/00 | (2006.01) |
| A47L 9/06 | (2006.01) |
| A47L 11/20 | (2006.01) |
| B25J 5/00 | (2006.01) |
| B25J 9/00 | (2006.01) |
| B25J 9/12 | (2006.01) |
| A47L 13/20 | (2006.01) |
| B08B 1/04 | (2006.01) |
| A47L 9/28 | (2006.01) |
| A47L 11/24 | (2006.01) |

(52) U.S. Cl.
CPC .......... *A47L 9/2826* (2013.01); *A47L 9/2852* (2013.01); *A47L 11/14* (2013.01); *A47L 11/16* (2013.01); *A47L 11/161* (2013.01); *A47L 11/20* (2013.01); *A47L 11/201* (2013.01); *A47L 11/24* (2013.01); *A47L 11/282* (2013.01); *A47L 11/292* (2013.01); *A47L 11/293* (2013.01); *A47L 11/34* (2013.01); *A47L 11/40* (2013.01); *A47L 11/4002* (2013.01); *A47L 11/4005* (2013.01); *A47L 11/405* (2013.01); *A47L 11/408* (2013.01); *A47L 11/4011* (2013.01); *A47L 11/4013* (2013.01); *A47L 11/4038* (2013.01); *A47L 11/4058* (2013.01); *A47L 11/4061* (2013.01); *A47L 11/4066* (2013.01); *A47L 11/4069* (2013.01); *A47L 11/4072* (2013.01); *A47L 11/4083* (2013.01); *A47L 11/4088* (2013.01); *A47L 13/20* (2013.01); *B08B 1/04* (2013.01); *B08B 3/041* (2013.01); *B08B 3/08* (2013.01); *B25J 5/007* (2013.01); *B25J 9/0003* (2013.01); *B25J 9/126* (2013.01); *B25J 9/1664* (2013.01); *B25J 9/1666* (2013.01); *B25J 11/0085* (2013.01); *G05D 1/0223* (2013.01); *A47L 2201/00* (2013.01); *A47L 2201/04* (2013.01); *A47L 2201/06* (2013.01); *G05D 2201/0203* (2013.01)

(58) Field of Classification Search
CPC .......... A47L 11/4061; A47L 11/4066; A47L 11/4013; A47L 11/4011; A47L 11/4038; A47L 11/4069; A47L 11/14; A47L 11/282; A47L 11/293; A47L 11/4002; A47L 11/284; A47L 11/4036; A47L 2201/04; A47L 2201/06; A47L 9/009; A47L 9/0606; A47L 9/2826; A47L 9/2852; A47L 9/281; A47L 9/2831; B25J 9/0003; B25J 11/0085

See application file for complete search history.

(56) References Cited

U.S. PATENT DOCUMENTS

| | | | |
|---|---|---|---|
| 4,418,342 A | 11/1983 | Aschoff et al. | |
| 5,991,951 A | 11/1999 | Kubo et al. | |
| 6,493,896 B1 * | 12/2002 | Stuchlik | A47L 11/283 15/49.1 |
| 7,320,149 B1 | 1/2008 | Huffman et al. | |
| 9,814,364 B1 | 11/2017 | Caruso | |
| 2004/0163199 A1 | 8/2004 | Hsu | |
| 2004/0221474 A1 | 11/2004 | Slutsky et al. | |
| 2005/0015913 A1 | 1/2005 | Kim et al. | |
| 2005/0166356 A1 | 8/2005 | Uehigashi | |
| 2005/0183230 A1 * | 8/2005 | Uehigashi | A47L 9/2889 15/319 |
| 2006/0185690 A1 | 8/2006 | Song | |
| 2007/0261715 A1 | 11/2007 | Lee et al. | |
| 2010/0031463 A1 | 2/2010 | Adams et al. | |
| 2012/0084938 A1 | 4/2012 | Fu | |
| 2012/0125363 A1 * | 5/2012 | Kim | A47L 9/2852 134/6 |
| 2013/0096717 A1 | 4/2013 | Yoon et al. | |
| 2013/0263889 A1 | 10/2013 | Yoon et al. | |
| 2014/0130289 A1 | 5/2014 | Hyun et al. | |
| 2014/0209122 A1 | 7/2014 | Jung et al. | |
| 2015/0142169 A1 | 5/2015 | Kim et al. | |
| 2015/0143646 A1 | 5/2015 | Jeong et al. | |
| 2015/0150429 A1 | 6/2015 | Yoo et al. | |
| 2015/0182090 A1 | 7/2015 | Park et al. | |
| 2015/0196183 A1 | 7/2015 | Clark et al. | |
| 2016/0022109 A1 | 1/2016 | Dooley et al. | |
| 2016/0051108 A1 | 2/2016 | Huang et al. | |
| 2018/0120833 A1 * | 5/2018 | Lindhe | A47L 9/2852 |
| 2019/0270124 A1 | 9/2019 | Jang et al. | |

FOREIGN PATENT DOCUMENTS

| | | |
|---|---|---|
| CN | 101267759 A | 9/2008 |
| CN | 101305893 A | 11/2008 |
| CN | 101313829 | 4/2012 |
| CN | 202341952 U | 7/2012 |
| CN | 102652654 | 9/2012 |
| CN | 103006153 | 4/2013 |
| CN | 203113255 U | 8/2013 |
| CN | 203296009 U | 11/2013 |
| CN | 103717117 A | 4/2014 |
| CN | 104244794 A | 12/2014 |
| CN | 104337469 | 2/2015 |
| CN | 104918529 A | 5/2015 |
| CN | 104757906 | 7/2015 |
| CN | 105744874 | 7/2016 |
| CN | 205411088 U | 8/2016 |
| EP | 2702918 A1 | 3/2014 |
| EP | 2762051 A2 | 8/2014 |
| EP | 3485785 | 5/2019 |
| JP | H05-300860 | 11/1993 |
| JP | H11-178764 | 7/1999 |
| JP | 2000-051128 | 2/2000 |
| JP | 2000070203 A | 3/2000 |
| JP | 2005-006816 | 1/2005 |
| JP | 2009-056216 | 3/2009 |
| JP | 2014-045898 | 3/2014 |
| KR | 20-0195057 | 9/2000 |
| KR | 10-2002-0074985 | 10/2002 |
| KR | 10-2005-0012047 | 1/2005 |
| KR | 10-2005-0014652 | 2/2005 |
| KR | 20-0412179 U | 3/2006 |
| KR | 20-0413777 | 4/2006 |
| KR | 10-2006-0094374 | 8/2006 |
| KR | 10-0669889 | 1/2007 |
| KR | 20-0435111 U | 1/2007 |
| KR | 10-0822785 | 4/2008 |
| KR | 10-2009-0026031 | 3/2009 |
| KR | 10-20090086657 | 8/2009 |
| KR | 10-2009-0119638 | 11/2009 |
| KR | 10-2010-006151 | 1/2010 |
| KR | 20-2010-0001717 U | 2/2010 |
| KR | 10-0962121 | 6/2010 |
| KR | 10-0985376 | 10/2010 |
| KR | 10-2010-0133870 | 12/2010 |
| KR | 10-1000178 | 12/2010 |
| KR | 10-2011-0105305 | 9/2011 |
| KR | 10-1073102 | 11/2011 |
| KR | 20-0458863 | 3/2012 |
| KR | 20-2012-0002399 U | 4/2012 |
| KR | 10-2012-0042391 | 5/2012 |
| KR | 10-2012-0055891 | 6/2012 |
| KR | 10-2012-0100682 | 9/2012 |

(56) References Cited

FOREIGN PATENT DOCUMENTS

| | | |
|---|---|---|
| KR | 10-20130042423 | 4/2013 |
| KR | 10-1303159 | 9/2013 |
| KR | 10-2013-0129059 | 11/2013 |
| KR | 10-20140022472 | 2/2014 |
| KR | 10-2015-0014351 | 2/2015 |
| KR | 10-2015-0022133 | 3/2015 |
| KR | 10-2015-0031821 | 3/2015 |
| KR | 10-2015-0048490 | 5/2015 |
| KR | 10-2015-0057959 | 5/2015 |
| KR | 10-1522177 | 5/2015 |
| KR | 10-2015-0060030 | 6/2015 |
| KR | 10-20150078094 | 7/2015 |
| KR | 10-2015-0107396 | 9/2015 |
| KR | 10-2015-0107693 | 9/2015 |
| KR | 10-20150107693 | 9/2015 |
| KR | 10-2015-0116311 | 10/2015 |
| KR | 10-1569058 | 11/2015 |
| KR | 10-2015-0139111 | 12/2015 |
| KR | 10-1578887 | 12/2015 |
| KR | 10-1595727 | 2/2016 |
| KR | 10-20160033615 | 3/2016 |
| KR | 10-2016-0090570 | 8/2016 |
| KR | 10-2016-0104429 | 9/2016 |
| KR | 10-2016-0122520 | 10/2016 |
| KR | 10-1678443 | 12/2016 |
| KR | 10-2018-0105109 | 9/2018 |
| TW | 537326 U | 6/2003 |
| TW | M455464 | 6/2013 |
| WO | WO 2015/186944 A1 | 12/2015 |
| WO | WO 2016/027957 | 2/2016 |
| WO | WO 2016/036183 A1 | 3/2016 |

OTHER PUBLICATIONS

PCT Search Report dated Nov. 20, 2017, on PCT International Patent appl. No. PCT/KR2017/007555.
PCT Search Report dated Nov. 20, 2017, on PCT International Patent appl. No. PCT/KR2017/007552.
PCT Search Report dated Nov. 20, 2017, on PCT International Patent appl. No. PCT/KR2017/007550.
PCT Search Report dated Nov. 23, 2017, on PCT International Patent appl. No. PCT/KR2017/007561.
PCT Search Report dated Nov. 23, 2017, on PCT International Patent appl. No. PCT/KR2017/007557.
PCT Search Report dated Nov. 23, 2017, on PCT International Patent appl. No. PCT/KR2017/007560.
PCT Search Report dated Nov. 23, 2017, on PCT International Patent appl. No. PCT/KR2017/007562.
Australian Office Action dated Jul. 16, 2019, on Australian Patent appl. No. 2017297104.
PCT Search Report dated Nov. 20, 2017, on PCT International Patent Application No. PCT/KR2017/007551.
European Search Report dated Mar. 31, 2020, on European Patent Application No. 17827982.4.
European Search Report dated May 4, 2020, on European Patent Application No. 17827984.0.
European Search Report dated Apr. 2, 2020, on European Patent Application No. 17827992.3.
U.S. Office Action dated May 22, 2020, on U.S. Appl. No. 16/333,098.
U.S. Office Action dated May 6, 2020, on U.S. Appl. No. 16/333,144.
European Search Report dated May 26, 2020, on European Patent Application No. 17827993.1.
European Search Report dated May 26, 2020, on European Patent Application No. 17827985.7.
U.S. Office Action dated Jul. 15, 2020, on U.S. Appl. No. 16/333,129.
European Search Report dated Aug. 13, 2020, on European Patent Application No. 17827983.2.
EP Search Report dated Aug. 14, 2020.
U.S. Office Action dated Sep. 21, 2020 on U.S. Appl. No. 16/333,138.
U.S. Office Action dated Oct. 6, 2020 on U.S. Appl. No. 16/333,124.
U.S. Office Action dated Oct. 9, 2020 on U.S. Appl. No. 16/333,135.

* cited by examiner

FIG. 4
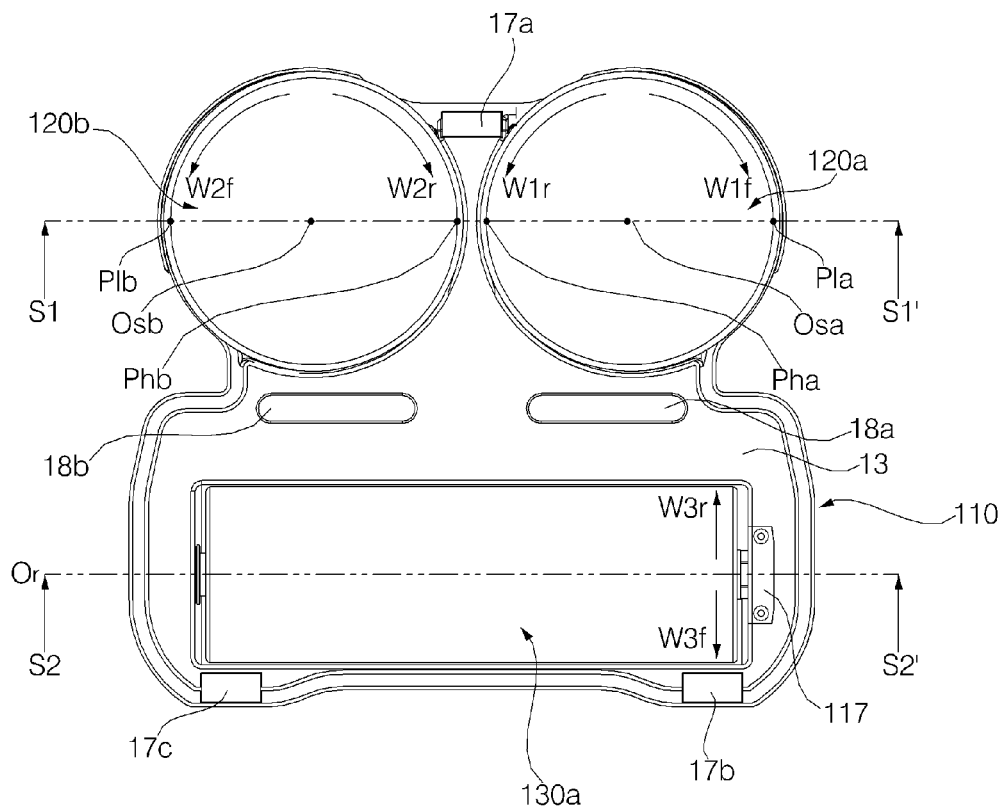
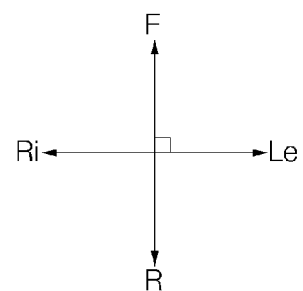

FIG. 10
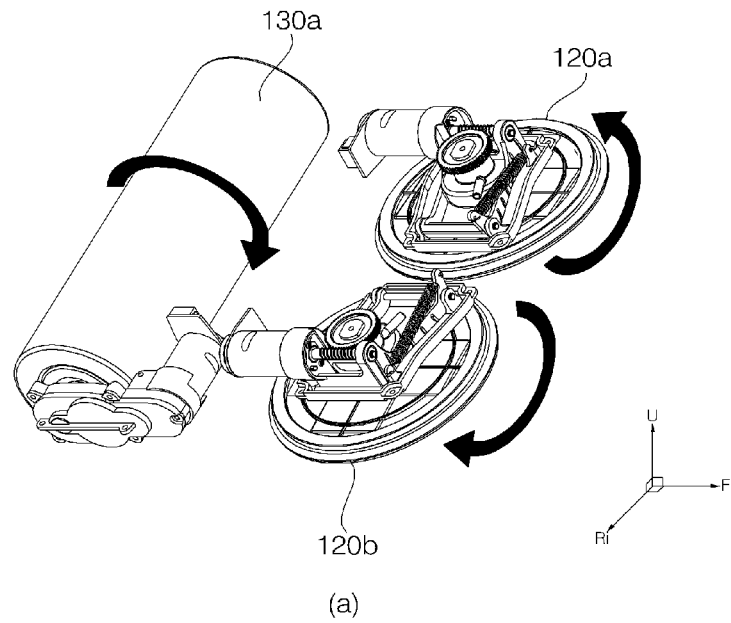
(a)
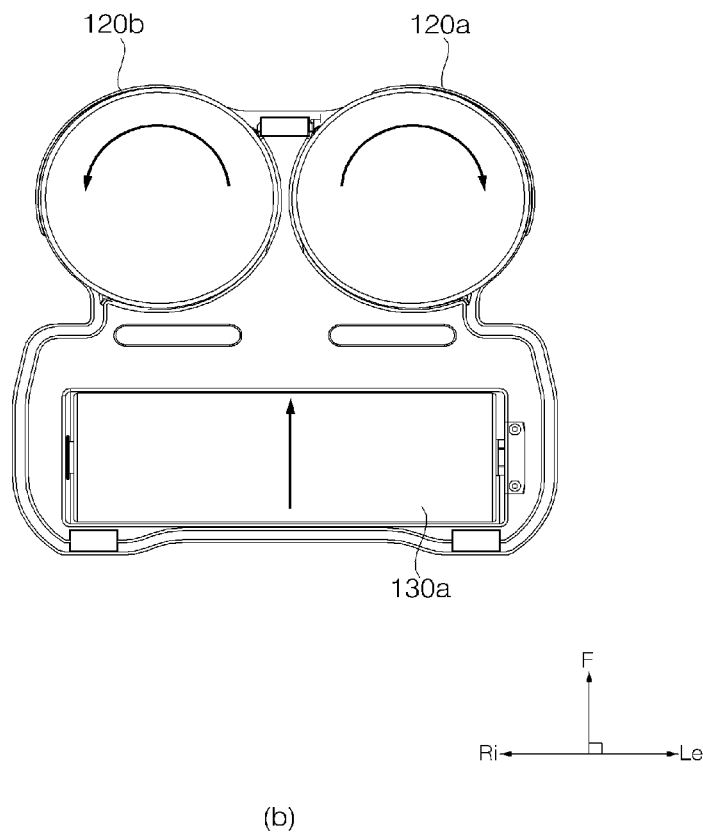
(b)

FIG. 11
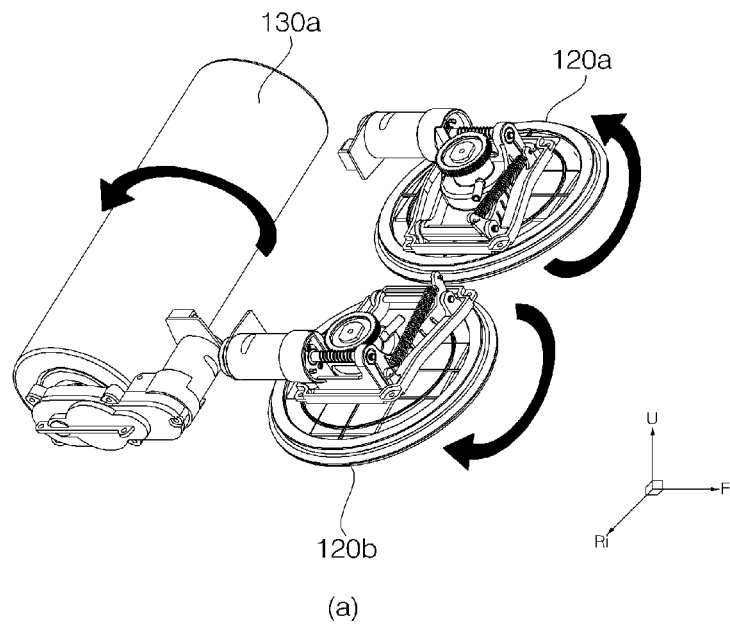
(a)
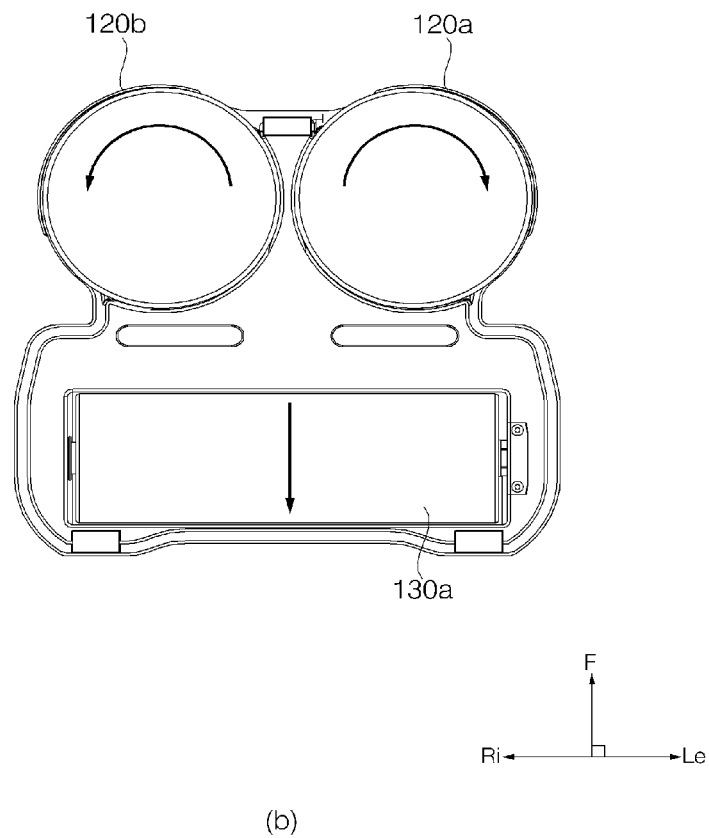
(b)

FIG. 12
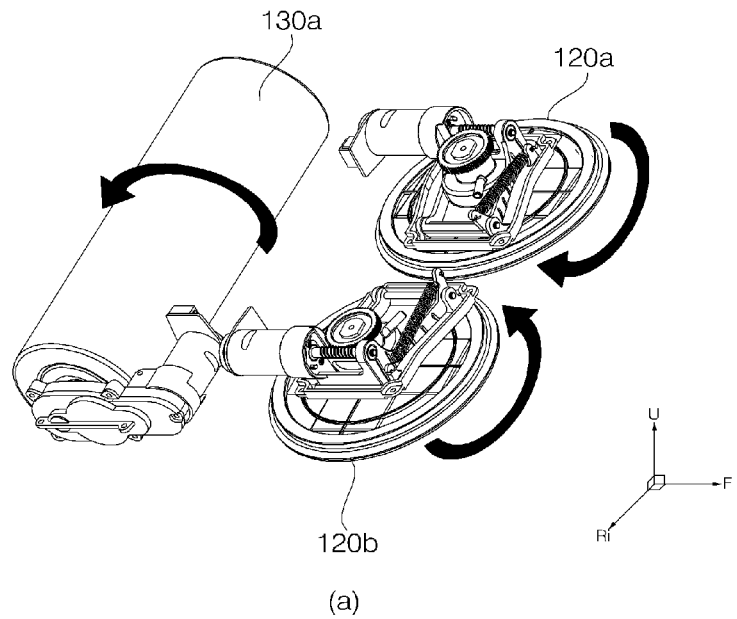
(a)
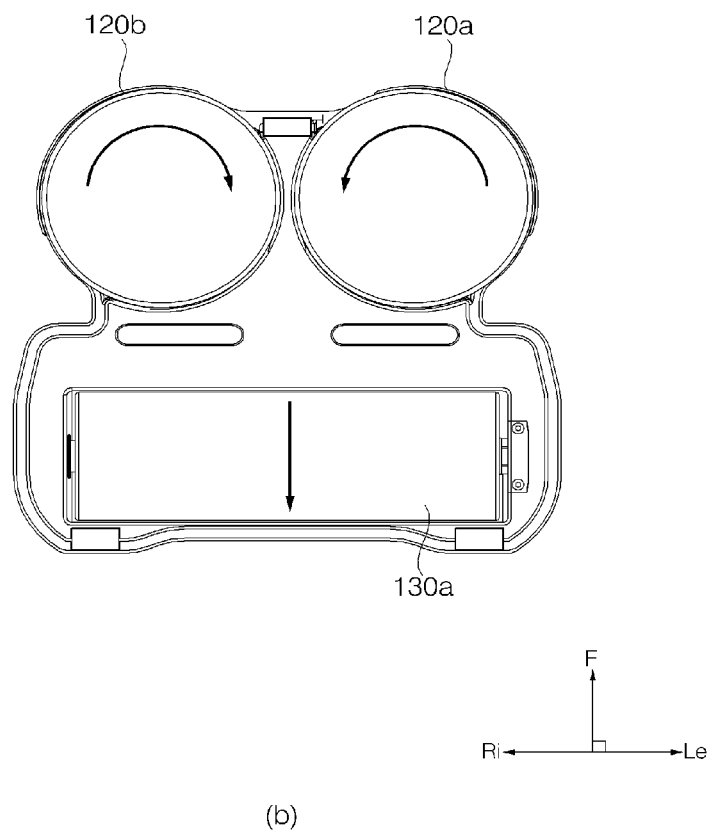
(b)

FIG. 13
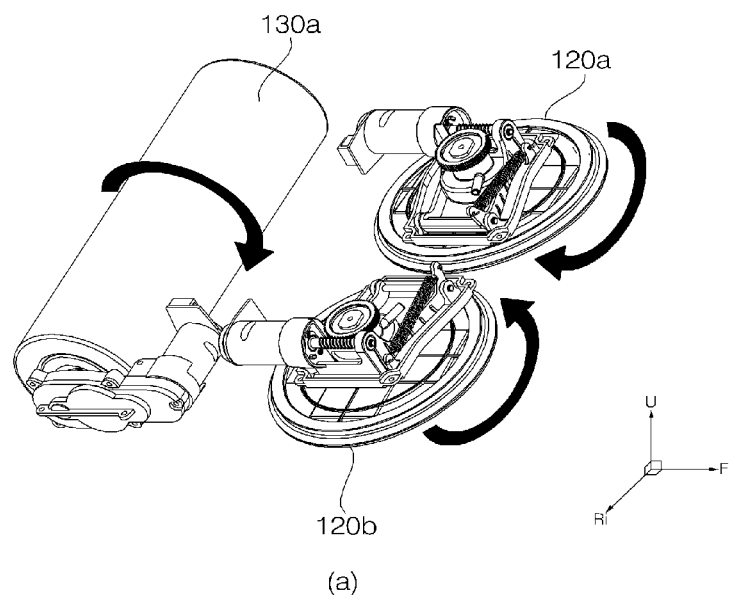
(a)
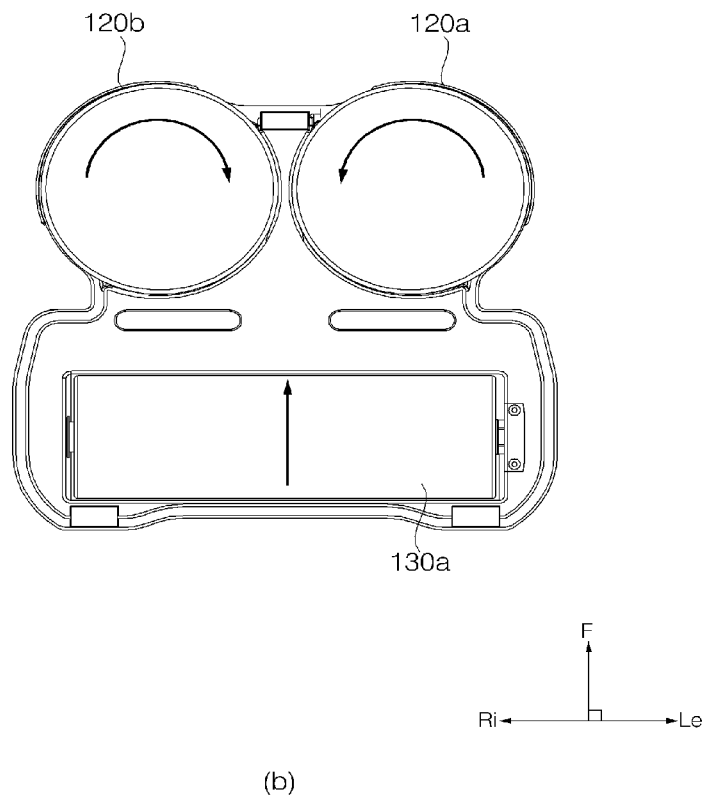
(b)

FIG. 14
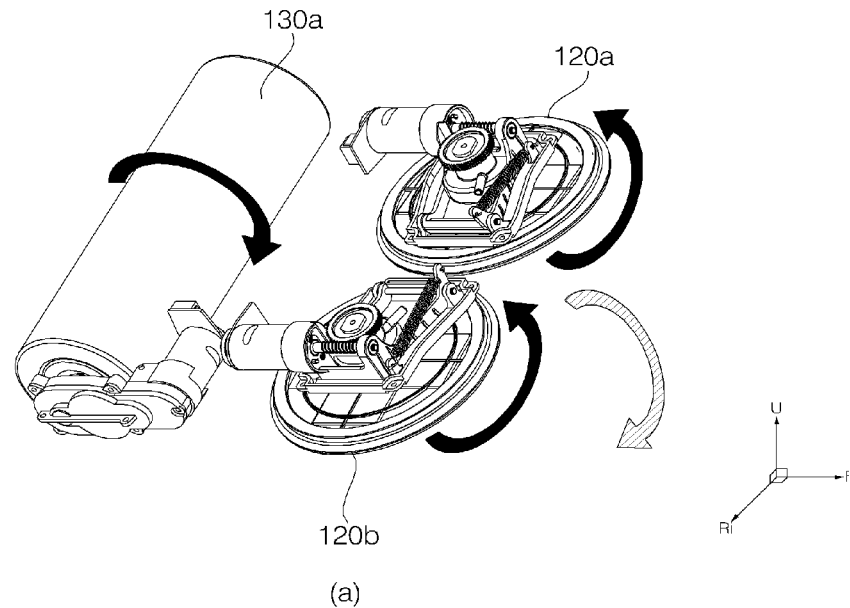
(a)
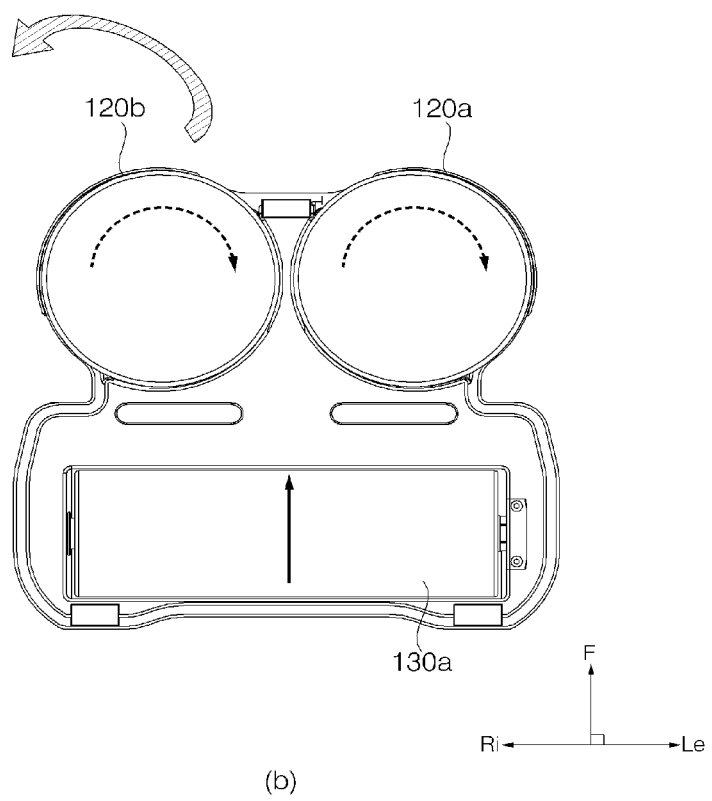
(b)

FIG. 15
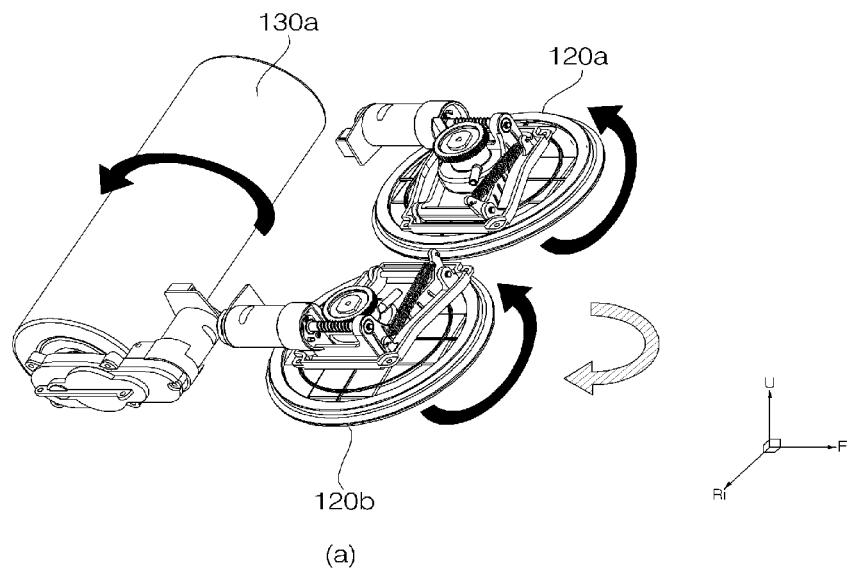
(a)
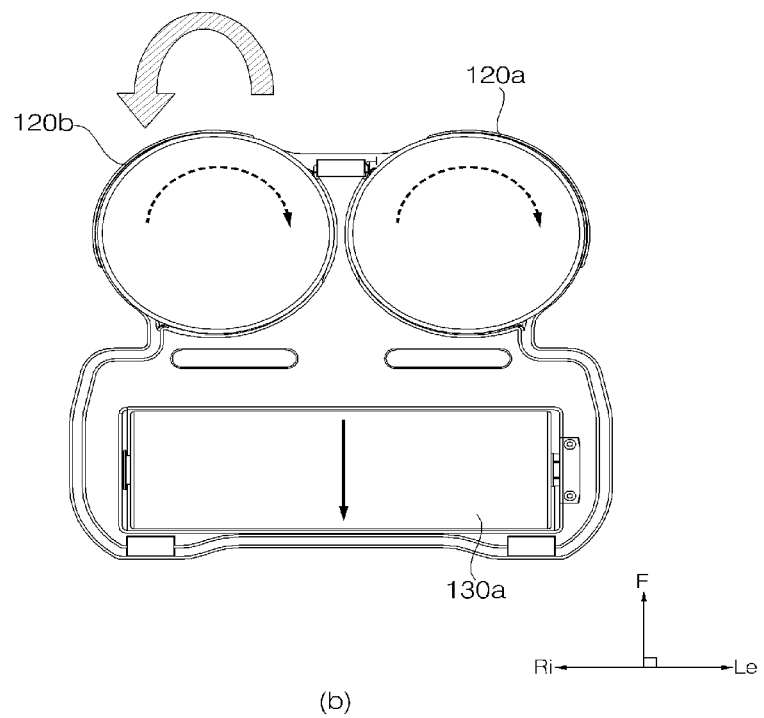
(b)

FIG. 16
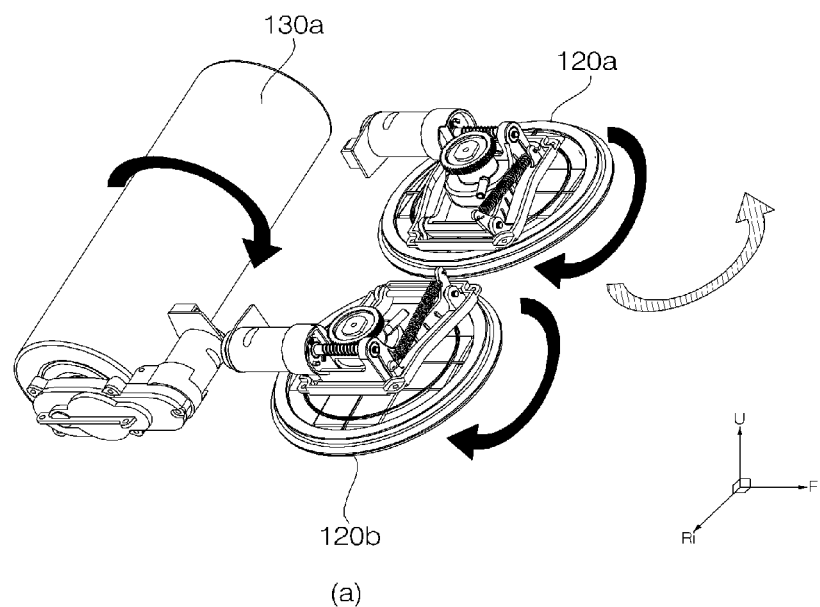
(a)
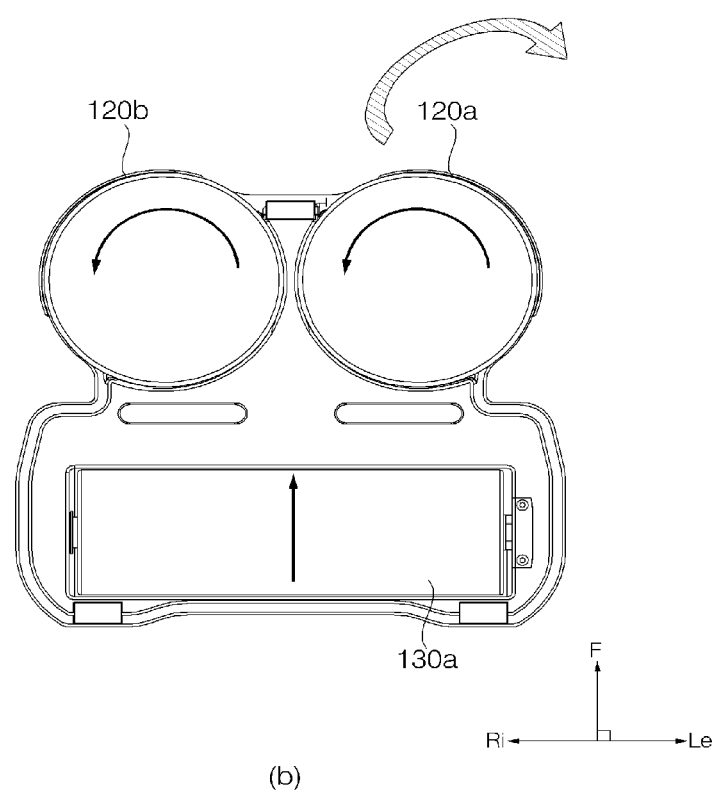
(b)

FIG. 17
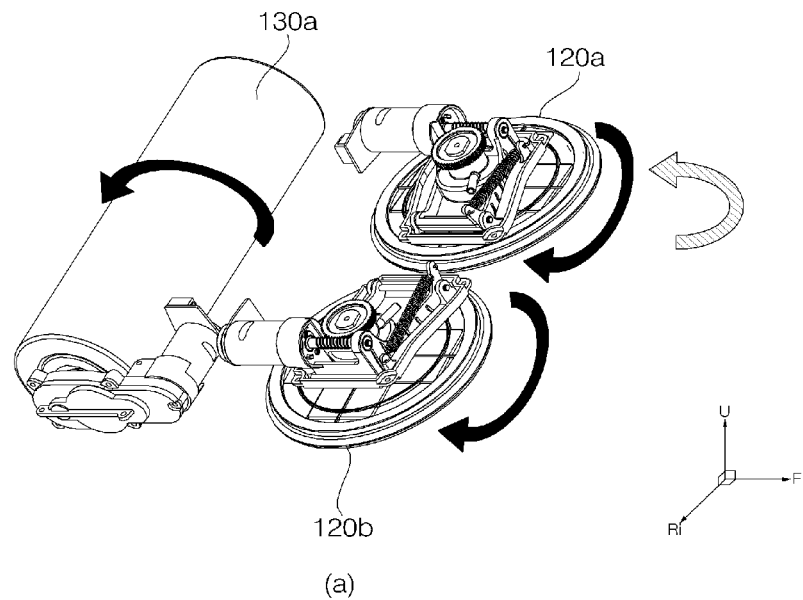
(a)
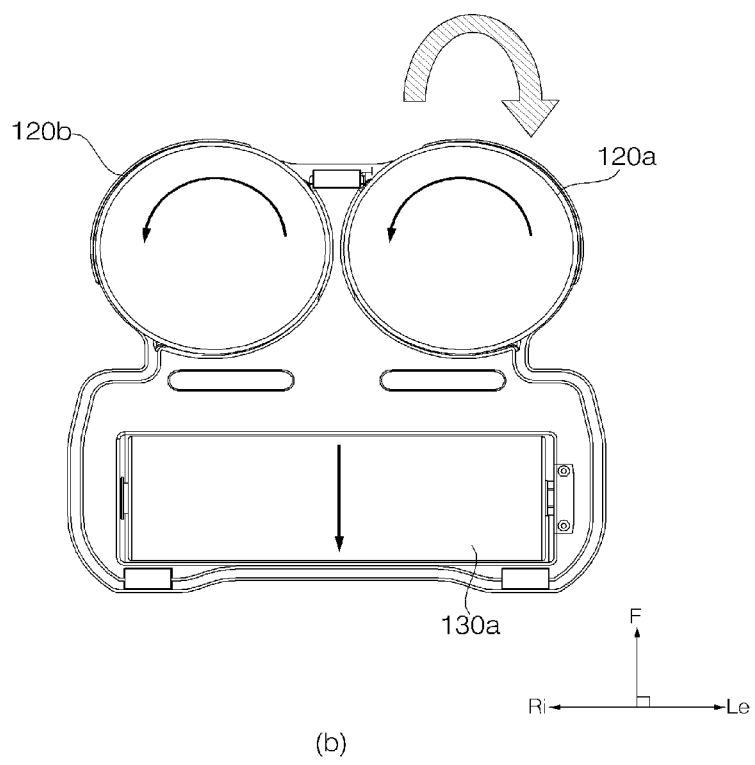
(b)

FIG. 19
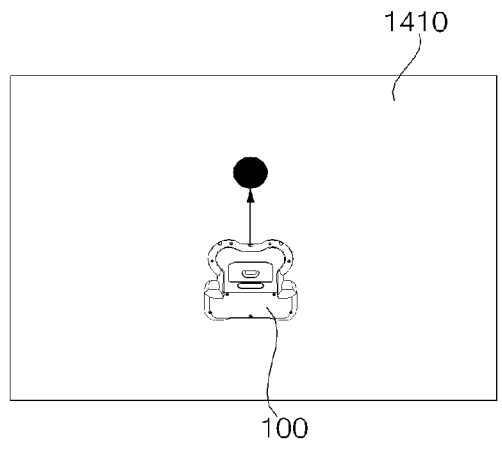
(a)
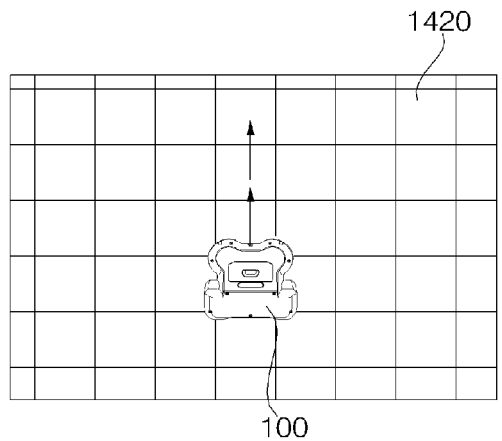
(b)
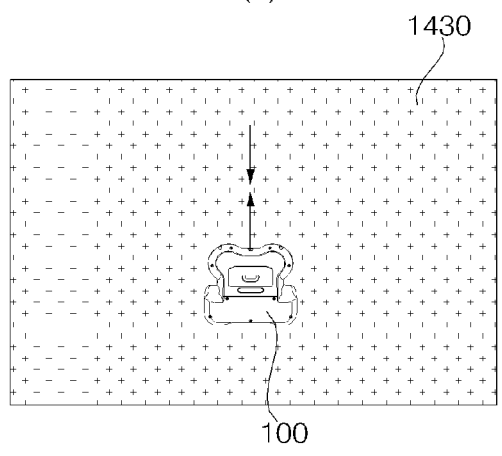
(c)

|  | A CHANGE IN THE LOAD CURRENT O | A CHANGE IN THE LOAD CURRENT X |
|---|---|---|
| A CHANGE IN THE POSITION O | CONTAMINATION | MOVEMENT CAUSED BY EXTERNAL FORCE |
| A CHANGE IN THE POSITION X | CHANGE OF A KIND OF A FLOOR | NORMAL |

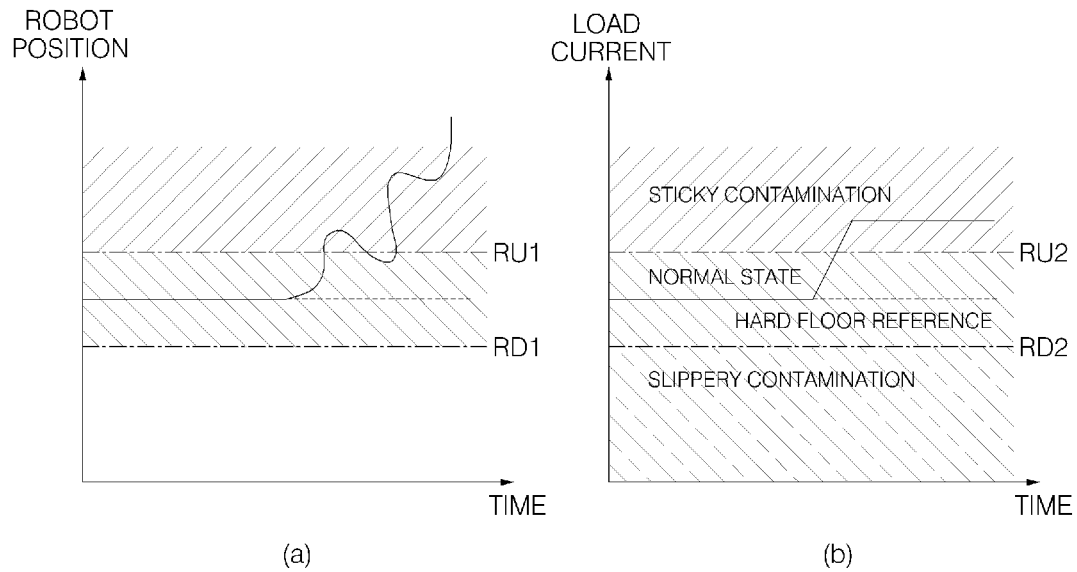
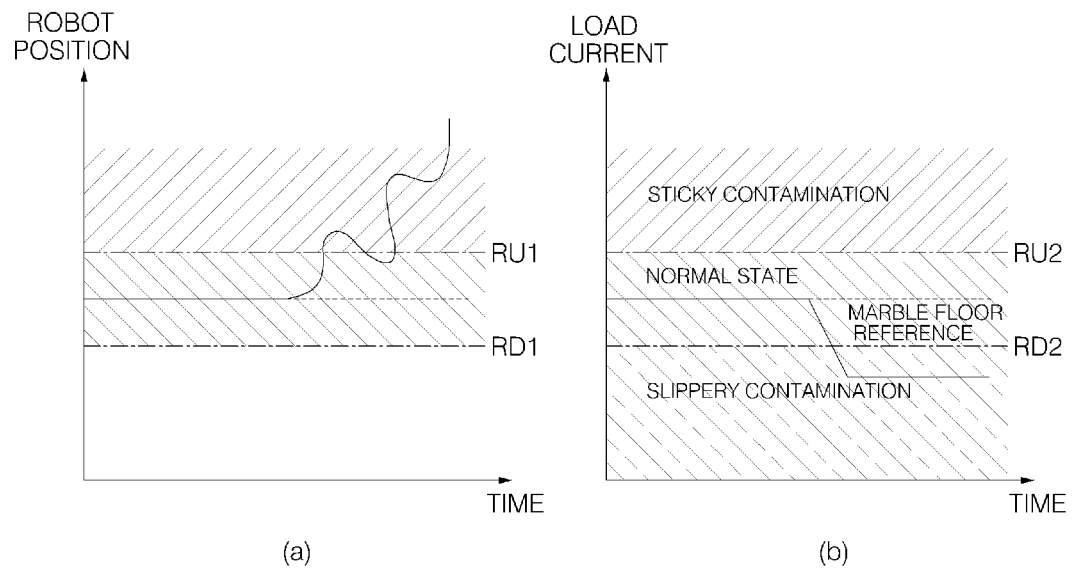

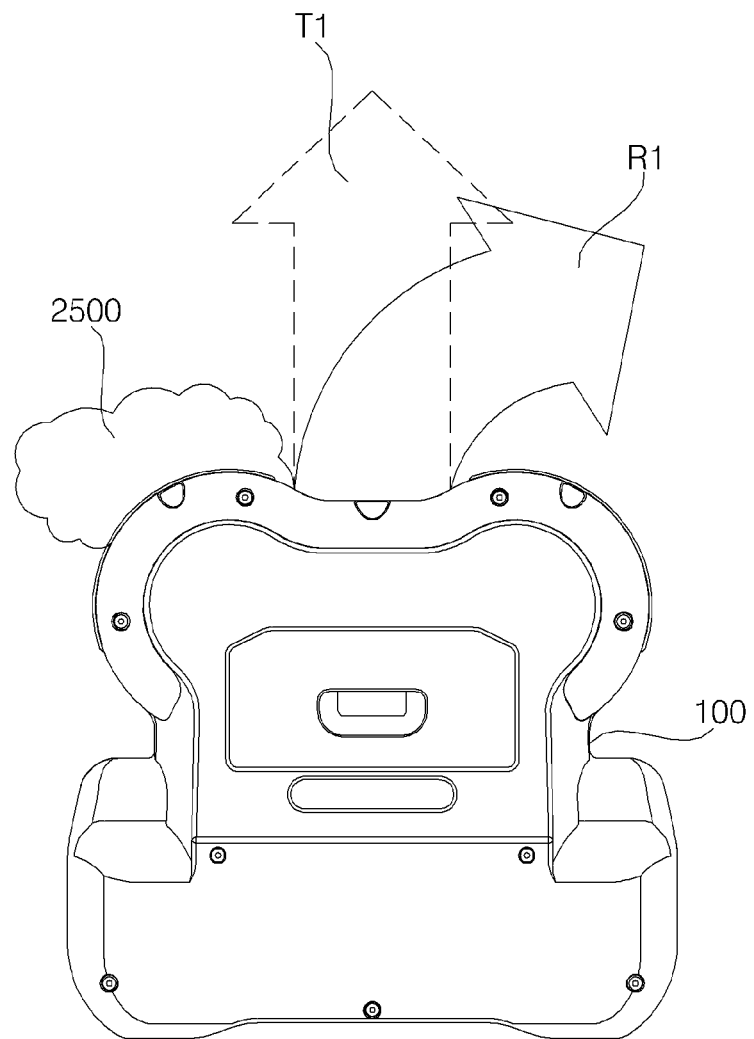

ROBOT CLEANER AND METHOD OF CONTROLLING THE SAME

CROSS-REFERENCE TO RELATED APPLICATIONS

This application is a U.S. National Phase entry under 35 U.S.C. § 371 from PCT International Application No. PCT/KR2017/007562, filed Jul. 14, 2017, which claims the benefit of priority of U.S. Provisional Application No. 62/362,358, filed Jul. 14, 2016, the contents of which are incorporated herein by reference in its entirety.

BACKGROUND OF THE INVENTION

Field of the Invention

The present invention relates to a robot cleaner capable of performing a mopping operation and a method of controlling the same.

Description of the Related Art

A robot cleaner is an apparatus that cleans a floor by suctioning foreign matter, such as dust, from the floor or sweeping away foreign matter on the floor while traveling autonomously. In recent years, there have been developed robot cleaners capable of performing a mopping operation.

Korean Registered Patent Publication No. 10-1602790 (Conventional Art 1) discloses a robot cleaner capable of traveling using a mop. In Conventional Art 1, the robot cleaner is configured such that a first rotary member and a second rotary member for fixing a pair of mops disposed in the leftward-rightward direction are inclined downwards and outwards from vertical shafts thereof. In the robot cleaner disclosed in Conventional Art 1, the first rotary member and the second rotary member are rotated to move the robot cleaner in the state in which only the mops fixed to the first rotary member and the second rotary member are in contact with a floor.

Conventional Art 1, which discloses the robot cleaner configured to travel through the rotation of the mops disposed in the leftward-rightward direction, has a problem in that frictional forces generated between the rotating mops and the floor frequently change, whereby it is difficult for the robot cleaner to travel straight. If it is difficult for the robot cleaner to travel straight, a considerable portion of the floor near a wall, along which straight travel of the robot cleaner is required, may not be cleaned with the mops.

Furthermore, the robot cleaner according to Conventional Art 1, which is configured to move using the surfaces of a pair of left and right mops, has a problem in that the traveling speed and trajectory are restricted.

In addition, the robot cleaner according to Conventional Art 1, which is configured to move using the surfaces of the pair of left and right mops, has a problem in that it is difficult to perform a mopping operation without rotational motion in place or straight motion.

Furthermore, the robot cleaner according to Conventional Art 1 performs routine motions regardless of the state of contamination of a floor.

Korean Registered Patent Publication No. 10-0773980 (Conventional Art 2) discloses a combined vacuum cleaner and robot air cleaner and a head for a vacuum cleaner connected thereto, in which an air pollution sensor is provided so as to detect air pollution conditions.

However, Conventional Art 2 is able to detect only air pollution conditions and has to be provided with additional sensors not associated with traveling, which is problematic.

In addition, Korean Registered Patent Publication No. 1996-0014582 (Conventional Art 3) discloses a cleaner configured to control cleaning strength according to the degree of contamination, which employs a method of detecting pollution in such a manner as to detect the extent of contamination of cleaning water introduced into a body, to output a high voltage to a microprocessor when the extent of contamination is high, and to output a low voltage to the microprocessor when the extent of contamination is low.

Like Conventional Art 2, Conventional Art 3 is also able to detect only air pollution conditions and has to be provided with additional sensors not associated with traveling, which is problematic.

Accordingly, there is a need to provide a solution for detecting contamination condition of a floor without providing additional hardware and performing the optimized traveling operation according to the contamination conditions.

DISCLOSURE

Technical Problem

Therefore, the present invention has been made in view of the above problems, and it is an object of the present invention to provide a robot cleaner capable of performing a stable traveling operation.

Another object of the present invention is to provide a robot cleaner capable of traveling along various traveling trajectories at various traveling speeds.

Still another object of the present invention is to provide a robot cleaner capable of performing a mopping operation while standing in place.

A further object of the present invention is to provide a robot cleaner capable of performing a traveling operation suitable for the situation using various traveling motions.

A still further object of the present invention is to provide a robot cleaner capable of detecting the position of a contaminant and the kind of a floor without having to provide additional sensors having no relation to traveling.

A yet still further object of the present invention is to provide a robot cleaner capable of performing the optimized traveling operation according to the position of a contaminant and the kind of a floor.

Technical Solution

In accordance with an aspect of the present invention, the above and other objects can be accomplished by the provision of a robot cleaner including a rolling cleaning module including a rolling member configured to rotate clockwise or counterclockwise when viewed from a left side while in contact with a floor, a sensor unit including a plurality of sensors, and a controller configured to detect a change in the position of the robot cleaner and a change in the load current of a motor connected to the rolling member based on data detected by the sensor unit and to, when it is determined that there is a change in position and a change in load current, determine a specific area of a floor to be a contaminated area, thereby performing an optimized traveling operation according to the position of a pollutant and the kind of floor.

In accordance with another aspect of the present invention, there is provided a method of controlling a robot cleaner, including monitoring an amount of position information of the robot cleaner, detecting an amount of load current of a motor connected to a rolling member when the monitored amount of position information is higher than a first upper-limit reference value or lower than a first lower-limit reference value, and determining a specific area of a floor, at which the robot cleaner is located, to be a contaminated area when the amount of the load current of the motor connected to the rolling member is higher than a second upper-limit reference value or lower than a second lower-limit reference value.

Advantageous Effects

According to at least one of the embodiments of the present invention, there is an advantage in that the robot cleaner performs a stable traveling operation using the pair of spin mops and a single rolling mop.

According to at least one of the embodiments of the present invention, it is possible to realize various traveling motions by combining rotational motion of the left and right spin mops with the rotational motion of the rolling mop.

According to at least one of the embodiments of the present invention, the robot cleaner is able to perform a traveling operation suitable for the situation using various traveling motions.

According to at least one of the embodiments of the present invention, the robot cleaner is able to perform a mopping operation while standing in place.

According to at least one of the embodiments of the present invention, the robot cleaner is able to detect the position of a contaminant and the kind of a floor without having to provide additional sensors having no relation to traveling.

According to at least one of the embodiments of the present invention, the robot cleaner is able to perform an optimized traveling operation according to the position of a contaminant and the kind of a floor.

The above and other objects, features and other advantages of the present invention will be more clearly understood from the following detailed description taken in conjunction with the accompanying drawings.

BRIEF DESCRIPTION OF THE DRAWINGS

FIG. 4 is a bottom view of the robot cleaner shown in FIG. 1;

FIGS. 9 to 19 are views useful for the description of a method of controlling various traveling operations of a robot cleaner according to the embodiment of the present invention;

FIGS. 23 to 29 are views useful for the description of the method of controlling the robot cleaner according to an embodiment of the present invention.

DETAILED DESCRIPTION OF THE PREFERRED EMBODIMENTS

Figure 1:
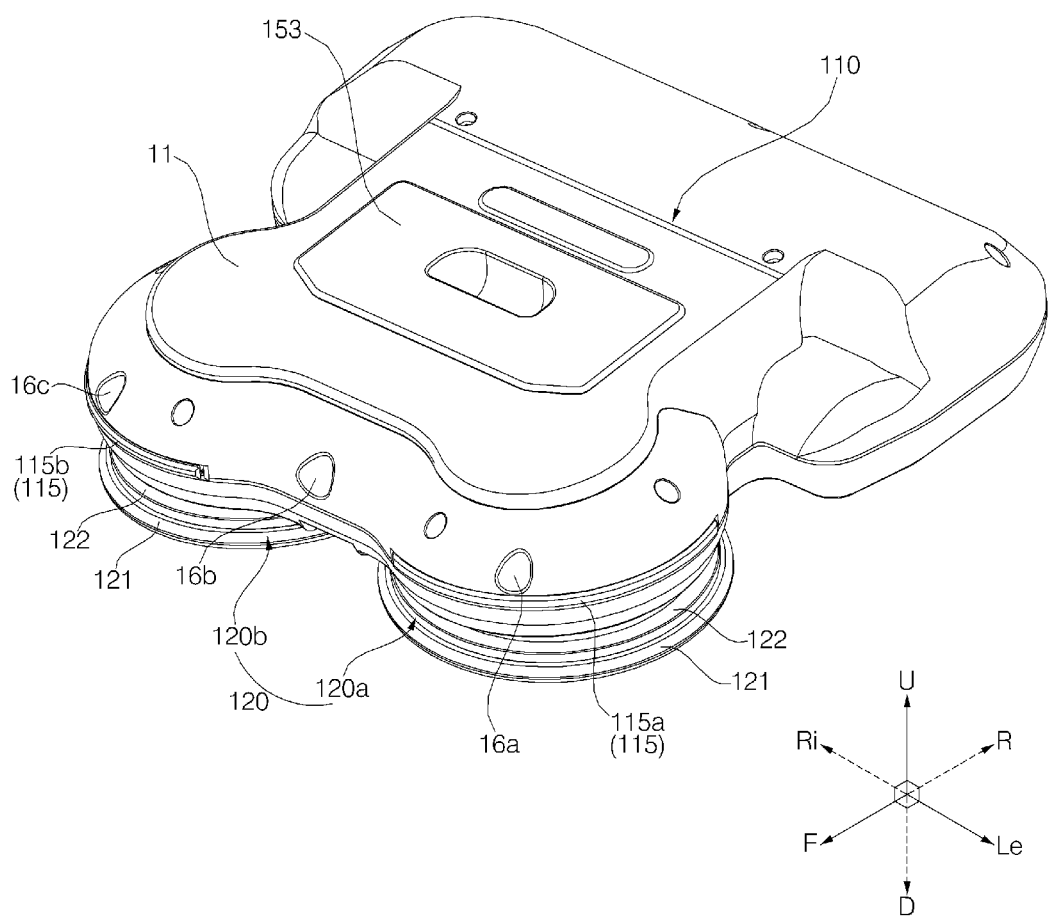
FIG. 1 is a perspective view of a robot cleaner according to an embodiment of the present invention.
Figure 2:
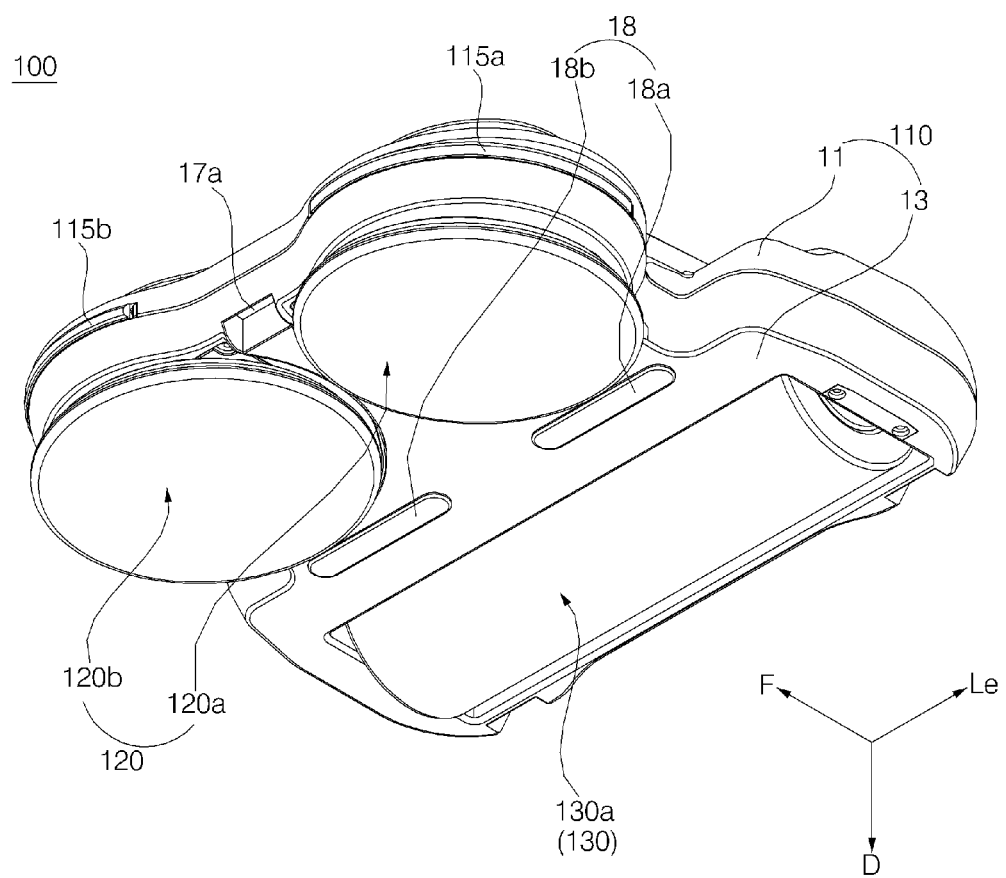
FIG. 2 is a perspective view of the robot cleaner shown in FIG. 1, which is viewed at a different angle.

In the following description, the terms "forward," "rearward," "leftward," "rightward," "upward," and "downward," which indicate directions, are defined based on forward (F), rearward (R), leftward (Le), rightward (Ri), upward (U), and downward (D) directions as illustrated in the drawings. In this specification, the direction in which a display panel is positioned with respect to a backlight unit is defined as the forward direction, and the other directions are defined based on the forward direction. However, these definitions are given only for clear understanding of the present invention, and the directions may be defined differently depending on the circumstances.

In the following description, the terms "first," and "second" are used only to avoid confusion between designated components, and do not indicate the sequence or importance of the components or the relationships between the components. For example, the present invention may be implemented using only a second component, without a first component.

The "mop" used herein may be formed of various materials, such as cloth or paper. The mop may be repeatedly used via washing or may be disposable.

The present invention may be applied to a manual cleaner, which is moved by a user, or a robot cleaner or the like, which is able to travel autonomously. Hereinafter, embodiments will be described based on a robot cleaner.

Referring to FIGS. 1 to 7, a robot cleaner 100 according to an embodiment of the present invention includes a body 110 having a controller 20. The robot cleaner 100 includes a rolling module 130 for supporting the body 110. The robot cleaner 100 includes a spin module 120 for supporting the body 110. The body 110 is supported by the spin module 120 and the rolling module 130.

The spin module 120 is configured to perform a mopping operation while in contact with a floor. The spin modules 120 includes a left spin mop 120a and a right spin mop 120b, which rotate clockwise or counterclockwise to perform a mopping operation, when viewed from above. The left spin mop 120a and the right spin mop 120b are configured to come into contact with a floor. The spin module 120 is disposed at a low side of the body 110. The spin module 120 is disposed in front of the rolling module 130. The robot cleaner 100 may be constructed such that the body 110 is movable by the rotational motion of the spin module 120 without an additional wheel.

The spin module 120 includes a pair of spin mop modules 120. The spin module 120 includes a left spin mop module 120 having the left spin mop 120a and a right spin mop module 120 having the right spin mop 120b. The left spin mop module 120 and the right spin mop module 120 are configured to perform a mopping operation. Each of the left spin mop module 120 and the right spin mop module 120 includes a mop member 121, a rotating plate 122, a water supply receiver (not shown), a spin rotating shaft 128, a spin drive unit 124 and a drive transmission unit 127. Each of the left spin mop module 120 and the right spin mop module 120 includes a tilting frame 125, a tilting rotating shaft 126 and an elastic member 129. The components included in the spin module 120 may be considered as the components included in each of the left spin mop module 120 and the right spin mop module 120.

The rolling module 130 is configured to come into contact with a floor. The rolling module 130 may be configured to come into contact with a floor so as to perform a mopping operation. The rolling module 130 is disposed below the body 110. The rolling module 130 may be disposed at a position anteroposteriorly spaced apart from the left and right spin mops, and may come into contact with a floor. For example, the rolling module 130 is disposed behind the spin module 120 so as to come into contact with a floor. In this embodiment, the rolling module 130 is configured to perform a mopping operation while rotating.

In another example, the rolling module 130 may include a mop pad and the like, which performs a mopping operation while sliding on a floor due to movement of the body 110.

In still another example, the rolling module 130 may be configured to be capable of performing a vacuum-cleaning operation.

In a further example, the rolling module 130 may include a brush for performing a sweeping operation on a floor. In this case, the brush may be configured to be capable of rotating. The brush may be rotated about a rotational axis extending substantially horizontally. The brush may be rotated about a rotational axis extending substantially laterally. The robot cleaner 100 may include a dust container such that relatively large foreign substances obtained by a sweeping operation of the brush on a floor are collected into the dust container.

Hereinafter, the present invention will be described with reference to this embodiment. Since the rolling module 130 can play its own role if the rolling module 130 supports the body while in contact with a floor, the specific construction of the rolling module 130 for cleaning may be modified.

The rolling module 130 may include a rolling member 130a. The robot cleaner 100 may be configured such that the body 110 is movable by the rotational motion of the rolling module 130 without an additional wheel.

The rolling member 130a may be configured to be rotated about a rotational axis different from those of the spin mops 120a and 120b.

For example, the rolling member 130a may be configured to be rotated about a rotational axis extending substantially horizontally. Accordingly, the rolling member 130a may be rotated clockwise or counterclockwise when viewed from the left or right side. The rolling module 130 may be configured to perform a mopping or sweeping operation while rotating clockwise or counterclockwise when viewed from one side (the left side or right side).

The rolling member 130a may include a mop disposed on the outer surface thereof so as to perform a mopping operation or a brush disposed on the outer surface thereof so as to perform a sweeping operation. The mop or the brush may be fixedly coupled to the rolling member 130a, or may be detachably coupled thereto.

Although an embodiment in which the rolling module 130 includes the rolling mop 130a, that is, the rolling member 130a including the mop, will be described hereinafter, the specific construction of the rolling module 130 for performing cleaning may be modified.

The robot cleaner 100 may be configured such that the body 110 is moved by rotational motion of at least one of the spin module 120 and the rolling module 130 without an additional wheel. The body 110 may be moved only by the rotational motion of the spin module 120. Furthermore, the body 110 may be moved only by the rotational motion of the rolling module 130. The body may be moved by the rotational motion of the spin module 120 and the rotational motion of the rolling module 130.

The robot cleaner 100 includes a water supply module (not shown) for supplying water required for a mopping operation. The water supply module may supply water required for a mopping operation of the spin module 120 or the rolling module 130. In this embodiment, the water supply module supplies water the spin module 120. The water supply module supplies water to the left spin mop module 120 and the right spin mop module 120.

The water supply module includes a water tank (not shown) for storing water to be supplied to the spin module 120 or the rolling module 130. In this embodiment, the water tank stores water to be supplied to the spin module 120.

Each of the spin module 120 and the rolling module 130 is configured to perform a mopping operation on a floor. In this embodiment, the spin module 120 is configured to perform a wet-type mopping operation (mopping while supplying water), and the water supply module supplies water to the spin module 120. In this embodiment, the rolling module 130 is configured to perform a dry-type mopping operation (mopping without the supply of water), and the water supply module does not supply water to the rolling module 130. In this embodiment, the water supply module supplies water only to the spin module 120, rather than to both the spin module 120 and the rolling module 130. Since the robot cleaner 100 is implemented as in this embodiment, when the robot cleaner 100 moves forwards, the rolling module 130 is capable of performing a dry-type mopping operation on a floor surface that has been subjected to the wet-type mopping operation of the spin module 120.

Hereinafter, the spin module 120 will be described as performing a wet-type mopping operation, and the rolling module 130 will be described as performing a dry-type mopping operation. However, the present invention is not necessarily limited thereto. The water supply module may be configured to supply water to the rolling module 130 rather than to the spin module 120, or to supply water to both the spin module 120 and the rolling module 130.

The robot cleaner 100 includes a battery 160 for supplying power. The battery 160 may supply power required for the rotational motion of the spin module 120. The battery 160 may supply power required for the rotational motion of the rolling module 130.

The robot cleaner 100 includes a case 11 defining the appearance of the robot cleaner. The case 100 defines an upper surface, a front surface, a rear surface, a left side surface and a right side surface of the body 110. The robot cleaner 100 may include a base 13 defining the lower surface of the body 110. The spin module 120 is fixed to the base 13. The rolling module 130 is also fixed to the base 13. The robot cleaner 100 includes a rolling mop housing 12, which is disposed on the base 130 and is depressed upwards so as to receive an upper portion of the rolling mop 130a. The controller 20, the water supply module and the battery 160 are disposed in the internal space defined by the case 11, the base 13 and the rolling mop housing 12.

The robot cleaner 100 includes a water tank lid 153 for opening and closing the water tank. The water tank lid 153 is disposed on the upper surface of the body 110. The robot cleaner 100 may include a water-level indicator (not shown) configured to indicate the level of water in the water tank. The water-level indicator may be formed of a transparent material so as to allow the level of water in the water tank in the body 110 to be visible.

The robot cleaner 100 includes an obstacle sensor 16 for detecting an obstacle present in front of the robot cleaner 100. The robot cleaner 100 may include a plurality of obstacle sensors 16a, 16b and 16c. The plurality of obstacle sensors 16a, 16b and 16c are disposed on the front surface of the body 110.

The robot cleaner 100 includes a cliff sensor 17 for detecting a cliff present on a floor in a cleaning region. The robot cleaner 100 may include a plurality of cliff sensors 17a, 17b and 17c). The cliff sensor 17a may be configured to detect a cliff present in front of the spin module 120. The cliff sensors 17b and 17c may be configured to detect a cliff present behind the rolling module 130.

In some embodiments, at least one of the cliff sensors 17 may include one or more light-emitting elements and one or more light-receiving elements.

In this case, the controller 20 may determine the material of the floor based on the amount of light, emitted from the light-emitting element, that is reflected by the floor and received into the light-receiving element.

For example, the controller 20 may determine the floor to be a hard floor if the amount of reflected light is equal to or greater than a predetermined value, and may determine the floor to be a carpet if the amount of reflected light is smaller than the predetermined value.

The robot cleaner 100 may include a power switch (not shown) for turning on or off the supply of power. The robot cleaner 100 may include an input unit (not shown) for enabling various user instructions to be input. The robot cleaner 100 may include a communication module (not shown) for performing communication with an external device.

The robot cleaner 100 includes an ultraviolet LED 18 for radiating ultraviolet rays downwards. The ultraviolet LED 18 is disposed between the spin module 120 and the rolling module 130. The ultraviolet LED 18 is disposed on the lower surface of the body 110 so as to radiate ultraviolet rays to the floor. The ultraviolet LED 18 is disposed on the lower surface of the base 13. The robot cleaner 100 may include a plurality of ultraviolet LEDs 18a and 18b. The plurality of ultraviolet LEDs 18a and 18b include an ultraviolet LED 18a disposed between the left spin mop 120a and the rolling mop 130a and an ultraviolet LED 18b disposed between the right spin mop 120b and the rolling mop 130a. Accordingly, when the robot cleaner 100 moves forwards while performing cleaning, the ultraviolet LEDs radiate ultraviolet rays to the floor, which has been subjected to a mopping operation performed by the spin module 120 so as to sterilize the floor, and then the rolling module 130 performs a cleaning operation on the floor, which has been sterilized by the ultraviolet rays.

The robot cleaner 100 includes the controller 20 for controlling autonomous travel.

Figure 8:
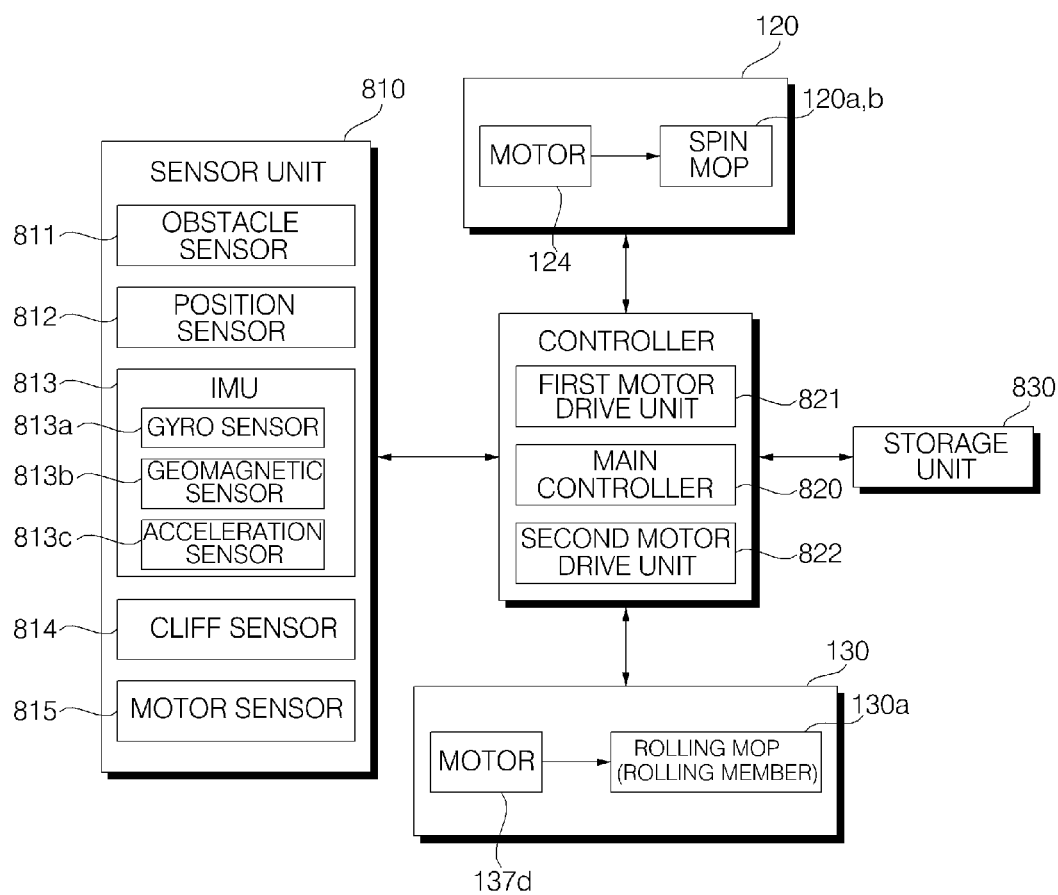
FIG. 8 is a block diagram illustrating a control relationship among substantial components of the robot cleaner according to an embodiment of the present invention.
Figure 9:
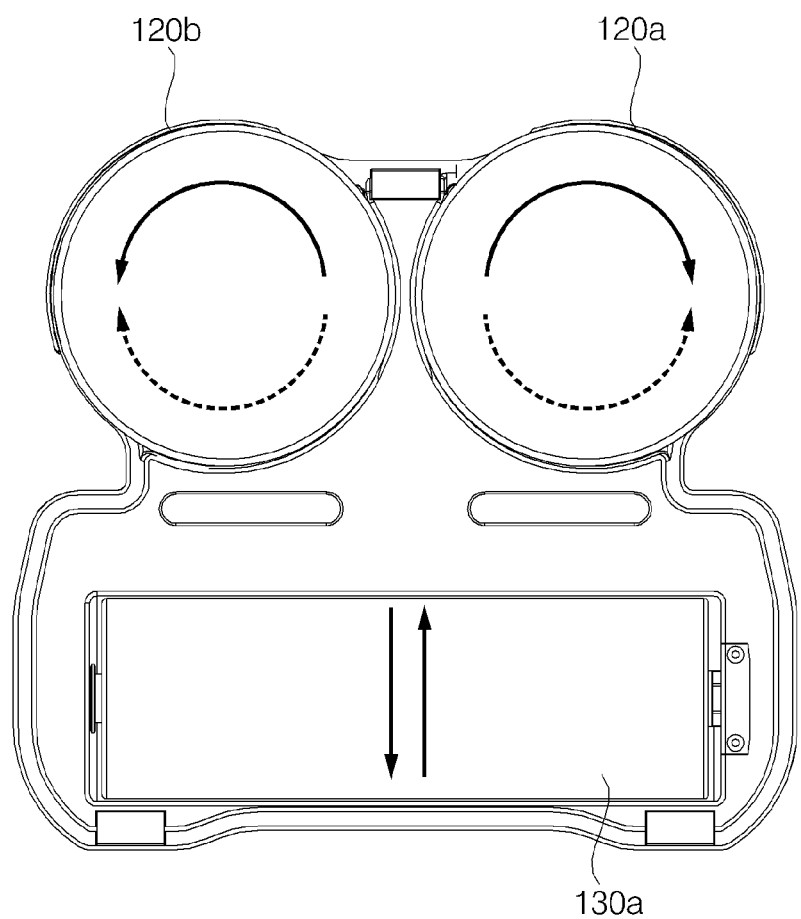

The controller 20 may process signals detected by a sensor unit 810 (FIG. 8). For example, the controller 20 may process signals detected by the obstacle sensor 150 or the cliff sensor 17. The controller 20 may process signals of the input unit or signals input through the communication module. The controller 20 includes a PCB 20 disposed in the body 110.

The body 110 defines the appearance of the robot cleaner. The body 110 includes a first part (not shown) disposed above the spin module 120, and a second part (not shown) disposed above the rolling module 130. The first part and the second part are integrally formed with each other. The body 110 is depressed upwards at the lower surface thereof between the spin module 120 and the rolling module 130 so as to define a body gap (not shown). The body gap may be disposed between the first part and the second part. The body gap may be formed by depressing the left and right side surfaces of the body 110 inwards.

The body 110 includes a bumper 115 for detecting an external impact. The bumper 115 is disposed above the rotating plate 122 of the spin module 120. The bumper 115 is disposed at a front side and a lateral side of the body 110. The bumper 115 includes a plurality of bumpers 115a and 115b. The bumper 115a is disposed at a front side and the left side of the left spin mop 120a. The bumper 115b is disposed at a front side and a right side of the right spin mop 120b.

The body 110 includes the case 11 and the base 13, which define the appearance of the robot cleaner.

The base 13 is provided with an opening in which the tilting frame 125 is disposed. The tilting frame 125 is connected to the base 13 via the tilting rotating shaft 126. The tilting rotating shaft 126 is rotatably secured to the base 13.

The base 13 includes a limiter for limiting the rotation range of the tilting frame 125. The limiter may include an upper-end limiter 13d and a lower-end limiter (not shown).

The base 13 includes an upper-end limiter 13d for limiting the upward-rotation range of the tilting frame 125. A left upper-end limiter 13d may be disposed at the left side of the left tilting frame 125. A right upper-end limiter 13d may be disposed at a right side of the right tilting frame 125. The left upper-end limiter 13d is disposed so as to be capable of contacting an upper-end limiter contact portion 125f of the left spin mop module 120. The right upper-end limiter 13d is disposed to be capable of contacting an upper-end limiter contact portion 125f of the right spin mop module 120. The upper-end limiter contact portion 125f may be disposed at the tilting frame 125. When the robot cleaner 100 is normally disposed on an external horizontal surface, the upper-end limiter contact portion 125f is in contact with the upper-end limiter 13d, and inclined angles Ag1 and Ag2 have the minimum value.

The base 13 includes a lower-end limiter for limiting the downward rotation range of the tilting frame 125. The lower-end limiter may be disposed at the inner surface of the base 13. The lower-end limiter may be disposed below the spin drive unit 124. The lower-end limiter is configured to come into contact with a lower-end limiter contact portion (not shown) in the state in which the tilting frame 125 is maximally rotated downwards. The lower-end limiter contact portion may be disposed at the lower surface of the spin drive unit 124. When the robot cleaner is normally disposed on an external horizontal surface, the lower-end limiter contact portion is spaced apart from the lower-end limiter. When there is no force with which lower surfaces of the spin mops 120a and 120b are pushed upward, the tilting frame 125 is rotated to the maximum angle and the lower-end limiter contact portion comes into contact with the lower-end limiter with the result that the inclined angles Ag1 and Ag2 are increased to the maximum value.

The base 13 includes a second support 13b for fixing an end of the elastic member 129. When the tilting frame 125 is rotated, the elastic member 129 is elastically deformed or restored by a first support 125d fixed to the tilting frame 125 and the second support 13b fixed to the base 13.

The base 13 includes a tilting rotating shaft support 13c for supporting the tilting rotating shaft 126. The tilting rotating shaft support 13c supports opposite ends of the tilting rotating shaft 126.

The base 13 may include a separate support member 13a for supporting the tilting frame 125. The support member 13a may be prepared as a separate component independent of the base 13. The support member 13a extends along a peripheral area of the opening formed in the lower surface of the base 13. The support member 13a may be provided at the center thereof with an opening in which the tilting rotating shaft 126 is disposed.

The support member 13a may include the second support 13b. The support member 13a may include the tilting rotating shaft support 13c. The support member 13a may include the upper-end limiter 13d. The support member 13a includes a support-member-fixing portion 13e coupled to the base 13.

Referring to FIGS. 2 to 4 and FIG. 5b, the rolling module 130 is disposed behind the spin module 120 so as to come into contact with a floor. The rolling module 130 is configured to perform a mopping operation while in contact with a floor as the body 110 moves. The rolling module 130 is configured to perform a dry-type mopping operation.

The rolling module 130 may include the rolling mop 130a, which rotates about the rotational axis Or, which extends horizontally. Although the rotational axis Or extends in a lateral direction in this embodiment, the rotational axis may extend in an anteroposterior direction or in a direction intermediate to the anteroposterior direction and the lateral direction in other embodiments. Accordingly, the rotational motion of the rolling mop 130a may provide the body 110 with a moving force in a horizontal direction (in a direction perpendicular to the rotational axis Or). Since the moving force resulting from the rolling mop 130a is additionally provided in addition to the moving force that is provided to the body 110 by the spin module 120, it is possible for the robot cleaner 100 to variously travel.

In this embodiment, the rolling module 130 includes the rolling mop 130a, which rotates about the rotational axis Or, which extends laterally. The rolling mop 130a may rotate about the rotational axis Or extending in a direction parallel to an array direction of the left spin mop 120a and the right spin mop 120b. Accordingly, the body 110 may be provided with a moving force in an anteroposterior direction by virtue of the rotational motion. Since a moving force in an anteroposterior direction resulting from the rolling mop 130a is additionally provided in addition to the moving force that is provided to the body 111 by virtue of the spin module 120, it is possible for the robot cleaner 100 to travel more variously and efficiently.

Referring to FIG. 4, when viewed from a lateral side, a clockwise direction, among rotational directions of the rolling mop 130a, is defined as a third forward direction w3f, and a counterclockwise direction is defined as a third reverse direction.

When the robot cleaner 100 moves forwards, the rolling mop 130a performs a mopping operation along a floor area, which has been cleaned by the spin module 120. Since the rolling mop 130a is configured to perform a dry-type mopping operation, the rolling mop 130a is able to remove moisture from a floor area that has been subjected to a wet-type mopping operation of the left spin mop 120a and the right spin mop 120b. Although the rolling module 130 includes a single rolling mop 130a in this embodiment, the rolling module 130 may include a plurality of rolling mops in other embodiments. In this case, the plurality of rolling mops may be rotated about a plurality of rotational axes parallel to each other.

The rolling module 130 includes a mop 131. A portion of the weight of the body 110 is transmitted to the floor via the mop 131. The mop 131 is disposed to surround a rotating member 132. The mop 131 is disposed along a circumference defined about the rotational axis Or. The mop 131 may be fixedly coupled to the rotating member 132, or may be detachably coupled to the rotating member 132.

The rolling module 130 includes the rotating member 132, which is rotatable. The rotating member 132 holds the mop 131 of the rolling mop 130a. The rotating member 132 is able to integrally rotate the mop 131. The rotating member 132 is rotated by driving force transmitted from a rolling drive unit 137. The rotating member 132 is rotated about the rotational axis Or.

The rotating member 132 is configured to have a cylindrical form. The rotating member 132 extends in the direction of the rotational axis Or. The rotating member 132 defines a cavity 132s therein. The mop 131 is fixed to the outer circumferential surface of the rotating member 132.

The rolling module 130 includes a first shaft portion 134 disposed at one end of the rotating member 132. The rolling module 130 includes a second shaft portion 135 disposed at the other end of the rotating member 132. The first shaft portion 134 and the second shaft portion 135 are disposed at opposite ends of the rolling module 130 in the direction of the rotational axis Or. In this embodiment, the first shaft portion 134 is disposed at the right end of the rotating member 132, and the second shaft portion 135 is disposed at the left end of the rotating member 132. One end of the rotating member 132 is depressed inwards, and the first shaft portion 134 is disposed in the depressed portion of the one end of the rotating member 132. The other end of the rotating member 132 is also depressed inwards, and the second shaft portion 135 is disposed in the depressed portion of the other end of the rotating member 132.

The first shaft portion 134 connects the one end of the rotating member 132 to the body 110. The first shaft portion 134 is fixedly connected to the rotating member 132. The first shaft portion 134 projects in the direction of the rotational axis Or. In this embodiment, the first shaft portion 134 projects rightward. The first shaft portion 134 is fitted into a hole formed in driving force transmitter 137a and is thus integrally rotated with the driving force transmitter 137a. The first shaft portion 134 is configured to have a shape other than a circular shape (for example, a polygonal shape) in a section perpendicular to the rotational axis Or, and the driving force transmitter 137a is provided with the hole having a sectional shape corresponding to the section of the first shaft portion 134.

The second shaft portion 135 connects the other end of the rotating member 132 to the body 110. The second shaft portion 135 is rotatably connected to the rotating member 132. The second shaft portion 135 projects in the direction of the rotational axis Or. In this embodiment, the second shaft portion 135 projects leftward. The second shaft portion 135 is fixedly fitted into a hole formed in the body 110 and in a coupler 117. When the first shaft portion 134 is rotated by the driving force transmitter 137a, the rotating member 132 and the mop 132 are integrally rotated with the first shaft portion 134, and the second shaft portion 135 is fixed and is rotated relative to the rotating member 132. A bearing may be provided between the second shaft portion 135 and the rotating member 132. The second shaft portion 135 is configured to have a shape (for example, a polygonal shape)

other than a circular shape in a section perpendicular to the rotational axis Or, and the hole formed in the body 110 and/or the coupler 117 has a sectional shape corresponding to the section of the second shaft portion 135.

The rolling module 130 includes the rolling drive unit 137 for supplying the driving force required for rotation of the rolling mop 130a. The rolling drive unit 137 provides driving force required for rotation of the rotating member 132. The rolling drive unit 137 includes a motor 137d. The motor 137d is disposed in the body 110. The rolling drive unit 137 includes a gear assembly 137c for transmitting a rotational force. The gear assembly 137c includes a plurality of gears, which are engaged with each other and are rotated. For example, the plurality of gears may include a drive gear, which is configured to be integrally rotated with the shaft of the motor 137d, and a driven gear, which is engaged with the drive gear and is rotated. The driven gear may include a plurality of driven gears, which are engaged with each other and are rotated. The rolling drive unit 137 may include a shaft 137b, which is integrally rotated with one of the plurality of driven gears. The rolling drive unit 137 may include the driving force transmitter 137a for transmitting a rotational force to the first shaft portion 134. The shaft 137b transmits the rotational force of the one of the plurality of driven gears to the driving force transmitter 137a. The driving force transmitter 137a includes a hole into which the first shaft portion 134 is fitted. The shaft 137b, the driving force transmitter 137a and the first shaft portion 134 are integrally rotated.

The robot cleaner 100 may include a coupler, which is detachably provided to the body 110. The coupler 117 is disposed at the base 13. The coupler 117 supports the lower end of the second shaft portion 135. The second shaft portion 135 is supported by the base 13. The coupler 117 may define a hole into which the second shaft portion 135 is fitted. By virtue of the coupler 117, the rotating member 132 and the mop 131 may be removed from or coupled to the body 110. For example, in the state in which the coupler 117 is removed, one of opposite ends of the rotating member 132, at which the second shaft portion 135 is disposed, may be pulled out of the body 110, and the first shaft portion 134 may then be easily removed from the driving force transmitter 137a. In contrast, in the state in which the coupler 117 is removed, the end of the first shaft portion 134 may be fitted into the hole in the driving force transmitter 137a, and the second shaft portion 135 and the coupler 117 may be fitted into the body. In order to maintain the state in which the rotating member 132 is coupled to the body 110, the coupler 117 may be fixed to the body 110 by a user. In order to separate the rotating member 132 from the body 110, the coupler 117 may be separated from the body 110 by a user.

Referring to FIGS. 1 to 7, the spin module 120 includes the left spin mop 120a and the right spin mop 120b, which are rotated clockwise or counterclockwise while in contact with a floor, when viewed from above. The spin module 120 is configured to perform a mopping operation by virtue of rotation of the left spin mop 120a and the right spin mop 120b.

Among components of the spin module 120, a component that is denoted by a term to which "left" is prepended indicates a component for operating the left spin mop 120a, and a component, which is denoted by a term to which "right" is prepended indicates a component for operating the right spin mop 120b. When there is no discrimination between left and right in the description regarding components of the spin module 120, the description may be applied to both left and right.

Referring to FIG. 4, the point, at which the rotational axis of the left spin mop 120 and the lower surface of the left spin mop 120a intersect each other is defined as the rotational center Osa of the left spin mop 120a, and the point, at which the rotational axis of the right spin mop 120b and the lower surface of the right spin mop 120b intersect each other is defined as the rotational center Osb of the right spin mop 120b. When viewed from below, the clockwise direction of the left spin mop 120a is defined as a first forward direction w1f, and the counterclockwise direction of the left spin mop 120a is defined as a first reverse direction w1r. When viewed from below, the counterclockwise direction of the right spin mop 120b is defined as a second forward direction w2f, and the clockwise direction of the right spin mop 120b is defined as a second reverse direction w2r.

Referring to FIG. 4, when the left spin mop 120a is rotated, the point P1a on the lower surface of the left spin mop 120a to which the maximum frictional force is applied from a floor is positioned to the left side of the rotational center Osa of the left spin mop 120a. It is possible to generate the maximum frictional force at the point P1a on the lower surface of the left spin mop 120a by subjecting the point P1a to greater load than other points on the lower surface. Although the point P1a is positioned immediately to the left of the rotational center Osa in this embodiment, the point P1a may be positioned left and to the front or rear of the rotational center Osa in other embodiments.

Referring to FIG. 4, when the right spin mop 120b is rotated, the point P1b on the lower surface of the right spin mop 120b to which the maximum frictional force is applied from a floor is positioned to the right side of the rotational center Osb of the right spin mop 120b. It is possible to generate the maximum frictional force at the point P1b on the lower surface of the right spin mop 120b by subjecting the point P1b to greater load than other points on the lower surface. Although the point P1b is positioned to the exact right side of the rotational center Osb in this embodiment, the point P1b may be positioned to the front or rear of the right side of the rotational center Osb in other embodiments.

The point P1a and the point P1b are disposed at positions symmetrical to each other in a lateral direction.

In order to subject the point P1a on the lower surface of the left spin mop 120a to be subjected to the maximum frictional force from a floor (or in order to subject the point P1b on the lower surface of the right spin mop 120b to the maximum frictional force from a floor), this may be implemented by the following embodiments.

Figure 3:
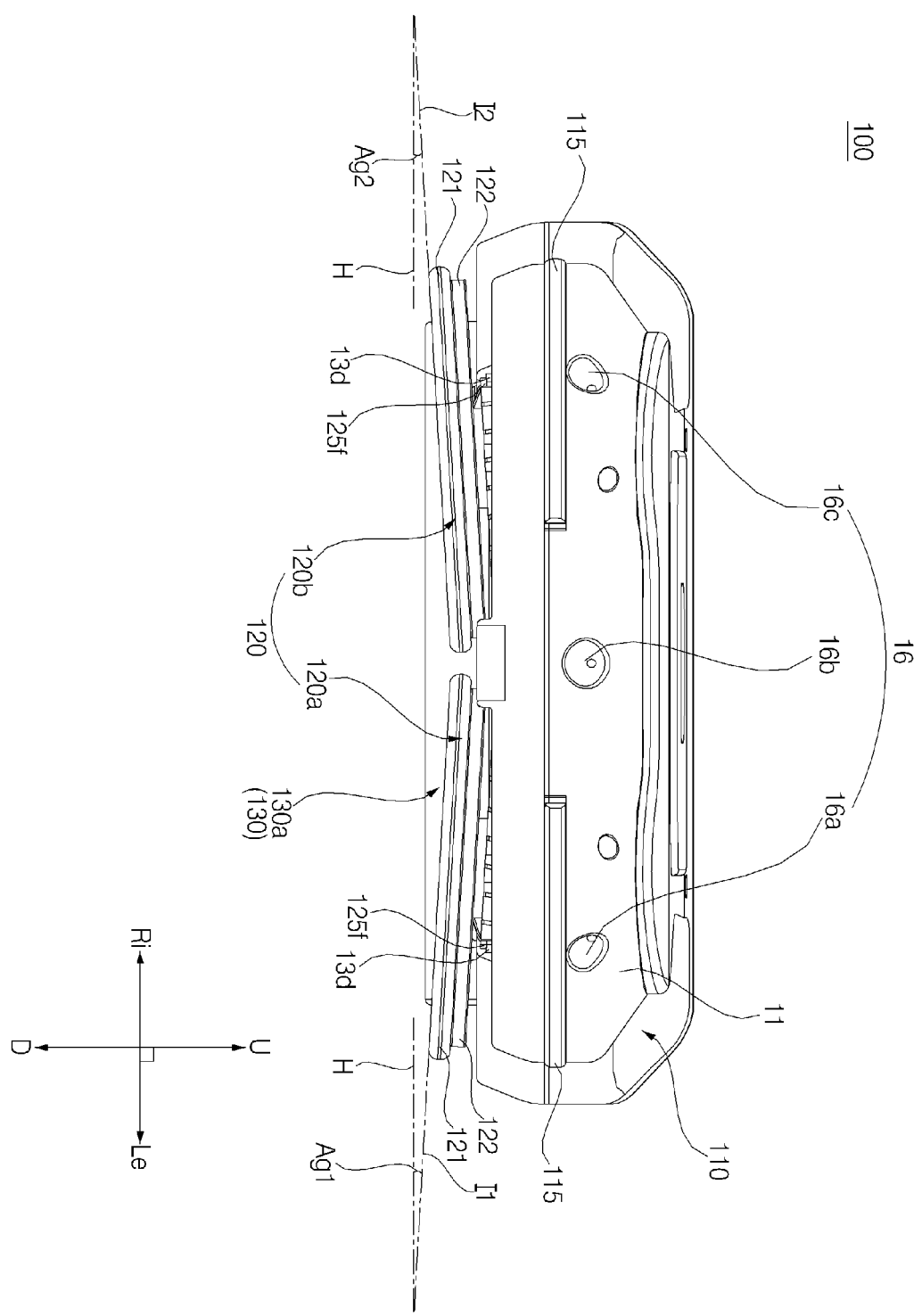
FIG. 3 is an elevation view of the robot cleaner shown in FIG. 1, which is viewed from the front.

In the embodiment shown in FIG. 3, the lower surface of the left spin mop 120a may be inclined downwards in a direction toward the point P1a from the rotational center Osa. In this case, the point P1a becomes the lowest point P1a on the lower surface of the left spin mop 120a. In this case, the angle defined between a virtual horizontal surface H and the lower surface I1 of the left spin mop 120a is defined as an inclined angle Ag1, and the angle defined between a virtual horizontal surface H and the lower surface of the right spin mop 120b is defined as an inclined angle Ag2. In other words, the angle defined between the lower surface I1 of the left spin mop 120a and an external horizontal surface H is an inclined angle Ag1, and the angle defined between the lower surface 12 of the right spin mop 120b and an external horizontal surface H is an inclined angle Ag2. The two inclined angles Ag1 and Ag2 may be the same as each other.

In another embodiment, the lower surface of the left spin mop 120a may be disposed to be horizontal. It is possible to apply a moment to the left spin mop 120a by means of an elastic member. The moment applied to the left spin mop 120a is a clockwise moment when viewed from the front. In this case, even when the left spin mop 120a is disposed parallel to an external horizontal surface H, the point P1a comes into contact with the external horizontal surface H with the maximum force, thereby generating the maximum frictional force. First and second embodiments for implementing this are as follows.

In the embodiment shown in FIG. 3, each of the lower surface of the left spin mop 120a and the lower surface of the right spin mop 120b is disposed to be inclined. Each of the inclined angle Ag1 of the left spin mop 120a and the inclined angle Ag2 of the right spin mop 120b defines an acute angle. In this embodiment, each of the inclined angles Ag1 and Ag2 ranges from about 30 degrees to about 6 degrees. Each of the inclined angles Ag1 and Ag2 may be set to be small to such an extent that the point to which the maximum frictional force is applied becomes the point P1a or P1b and the entire lower surface of the mop member 121 comes into contact with a floor by rotational motion of a corresponding one of left spin mop 120a and the right spin mop 120b.

The lower surface of the left spin mop 120a is inclined downwards and to the left. The lower surface of the right spin mop 120b is inclined downwards and to the right. Referring to FIG. 4, the left spin mop 120a has the lowest point P1a at the left region of the lower surface thereof. The left spin mop 120a has the highest point Pha at the right region of the lower surface thereof. The right spin mop 120b has the lowest point P1b at the right region of the lower surface thereof. The right spin mop 120b has the highest point Phb at the left region of the lower surface thereof.

Referring to FIG. 4, movement of the robot cleaner 100 is achieved using a frictional force generated between the spin module 120 and/or the rolling module 130 and a floor.

The spin module 120 may generate forward-movement frictional force for moving the body 110 forwards or rearward-movement frictional force for moving the body 110 backwards. The spin module 120 may generate leftward-moment frictional force for rotating the body leftwards or rightward-moment frictional force for rotating the body 110 rightwards. The spin module 120 may generate a combinational frictional force of one of the forward-movement frictional force and the rearward-movement frictional force and one of the leftward-moment frictional force and the rightward-moment frictional force.

The rolling module 130 may generate a forward-movement frictional force for moving the body 110 forwards or a rearward-movement frictional force for moving the body 110 rearwards.

In order for the spin module 120 to generate the forward-movement frictional force, the left spin mop 120a may be rotated in the first forward direction w1f at a predetermined RPM while the right spin mop 120b may be rotated in the second forward direction w2f at the same RPM.

In order for the rolling module 130 to generate the forward-movement frictional force, the rolling mop 130a may be rotated in the third forward direction w3f.

In order for the spin module 120 to generate the rearward-movement frictional force, the left spin mop 120a may be rotated in the first reverse direction w1r at a predetermined RPM while the right spin mop 120b may be rotated in the second reverse direction w2r at the same RPM.

In order for the rolling module 130 to generate the rearward-movement frictional force, the rolling mop 130a may be rotated in the third reverse direction w3r.

In order for the spin module 120 to generate the rightward-moment frictional force, the left spin mop 120a is rotated in the first forward direction w1f at a predetermined RPM while the right spin mop 120b may be rotated in the second reverse direction w2r, may be stopped without rotational motion or may be rotated in the second forward direction w2f at a RPM lower than the above RPM.

In order for the spin module 120 to generate the leftward-moment frictional force, the right spin mop 120b may be rotated in the second forward direction w2f at a predetermined RPM while the left spin mop 120a may be rotated in the first reverse direction w1r, may be stopped without rotational motion or may be rotated in the first forward direction w1f at a RPM lower than the above RPM.

By virtue of a combination of the frictional force generated by the spin module 120 and the frictional force generated by the rolling module 130, the body 110 may be moved or stopped in place.

In order to move the robot cleaner 100 forward in a straight line, both the spin module 120 and the rolling module 130 may generate the forward-movement frictional force. In another example, one of the spin module 120 and the rolling module 130 generates the forward-movement frictional force while the other may be maintained in a stopped state without rotational motion. In a further example, one of the spin module 120 and the rolling module 130 generates a relatively higher forward-movement frictional force while the other may generate a relatively lower rearward-movement frictional force.

In order to move the robot cleaner 100 backwards in a straight line, both the spin module 120 and the rolling module 130 may generate the rearward-movement frictional force. In another example, one of the spin module 120 and the rolling module 130 may generate the rearward-movement frictional force while the other may be maintained in a stopped state without rotational motion. In a further example, one of the spin module 120 and the rolling module 130 generates a relatively higher rearward-movement frictional force while the other may generate a relatively lower forward-movement frictional force.

In order to turn the robot cleaner 100 to the right, the spin module 120 may generate the rightward-moment frictional force while the rolling mop 130a may be rotated in the third forward direction w3f, may be stopped without rotational motion or may be rotated in the third reverse direction w3r.

In order to turn the robot cleaner 100 to the left the spin module 120 may generate the leftward-moment frictional force while the rolling mop 130a may be rotated in the third forward direction w3f, may be stopped without rotational motion or may be rotated in the third reverse direction w3r.

In order to maintain the robot cleaner 100 in place, both the spin module 120 and the rolling module 130 may be maintained in a stopped state without rotational motion. In another example, one of the spin module 120 and the rolling module 130 may generate the forward-movement frictional force while the other may generate the rearward-movement frictional force having the same strength as that of the forward-movement frictional force. Particularly, in the latter case, both the spin module 120 and the rolling module 130 may be rotated so as to perform a mopping operation on a predetermined area of a floor while the body 110 may be stopped in place.

According to the specific traveling control of the body 110, the rotational direction of the rolling mop 130a may be changed. Accordingly, since it is possible to combine the frictional force generated by the spin module 120 with one of the forward-movement frictional force and the rearward-movement frictional force generated by the rolling mop 130a, a greater variety of motions of the robot cleaner 100 may be obtained. Specifically, the highest speed that the robot cleaner 100 can travel in the anteroposterior direction may be further increased, and the turning radius with which the robot cleaner 100 is turned leftward or rightward may be variously changed. In addition, the robot cleaner 100 may be turned leftward or rightward while moving rearward, and it is possible to perform a mopping operation by virtue of the rotational motion while the body 110 is stopped in place.

When the spin module 120 performs a predetermined rotational motion (a motion generating the forward-movement frictional force, the rearward-movement frictional force, the leftward-moment frictional force or the rightward-moment frictional force), the rolling mop 130a may perform two or more different rotational motions. When the spin module performs a predetermined rotational motion, the rolling mop 130a may be controlled to be rotated in the third forward direction w3f. When the spin module performs a predetermined rotational motion, the rolling mop 130a may be controlled to be rotated in the third reverse direction w3r. When the spin module performs a predetermined rotational motion, the rolling mop 130a may be controlled to be stopped without rotational motion. When the spin module performs a predetermined rotational motion, the rolling mop 130a may be controlled to be rotated in the third forward direction w3f. When the spin module performs a predetermined rotational motion, the rolling mop 130a may be controlled to be rotated in the third forward direction w3f at one of two or more predetermined RPMs. When the spin module performs a predetermined rotational motion, the rolling mop 130a may be controlled to be rotated in the third rearward direction w3r at one of two or more predetermined RPMs. Accordingly, it is possible to realize various traveling orbits and traveling speeds of the robot cleaner 100.

The range of the floor with which the rolling mop 130a comes into contact may be elongated laterally. The right end of the left spin mop 120a and the left end of the right spin mop 120b may be spaced apart from each other by a predetermined distance. When viewed from the front, the range of the floor with which the rolling mop 130a comes into contact may overlap the entire gap between the left spin mop 120a and the right spin mop 120b. The gap between the left spin mop 120a and the right spin mop 120b is a range which is not sufficiently subjected to the mopping operation performed by the spin module 120. When the robot cleaner 100 travels in an anteroposterior direction, the rolling mop 130a performs a mopping operation on an area of a floor corresponding to the gap, thereby complementing the mopping operation performed by the spin module 120.

An area of a floor with which the rolling mop 130a comes into contact may be elongated laterally. When viewed from the front, a range of a floor with which the rolling mop 130a comes into contact may overlap the entire range between the rotational center Osa of the left spin mop 120a and the rotational center Osb of the right spin mop 120b. The right portion of the left spin mop 120a with respect to the rotational center Osa and the left portion of the right spin mop 120b with respect to the rotational center Osb are subjected to relatively lower frictional force. Hence, the portions may not be subjected to sufficient mopping operation, compared to the left portion of the left spin mop 120a with respect to the rotational center Osa and the right portion of the right spin mop 120b with respect to the rotational center Osb. The rolling mop 130a may serve to complement a mopping operation performed by the spin module 120 by performing a mopping operation on a range between the rotational center Osa of the left spin mop 120a and the rotational center Osb of the right spin mop 120b while the robot cleaner 100 travels anteroposteriorly.

The spin module 120 includes the mop members 121, which are coupled to lower sides of the rotating plates 122 so as to come into contact with a floor. The mop members 121 are respectively disposed on the lower surface of the left spin mop 120a and the lower surface of the right spin mop 120b. The mop members 121 may be fixedly disposed on the rotating plates 122, or may be detachably disposed on the rotating plates 122. The mop members 121 may be detachably coupled to the rotating plates 122 by means of Velcro fasteners, i.e. hook-loop fasteners. The mop member 121 may be composed of only a mop, or may be composed of a mop and a spacer (not shown). The mop comes into direct contact with a floor so as to perform a mopping operation. The spacer may be disposed between the rotating plate 122 and the mop so as to adjust the position of the mop. The spacer may be detachably coupled to the rotating plate 122, and the mop may be detachably coupled to the spacer. It goes without saying that the mop 121 may be directly detachably coupled to the rotating plate 122 without using the spacer.

Figure 5A:
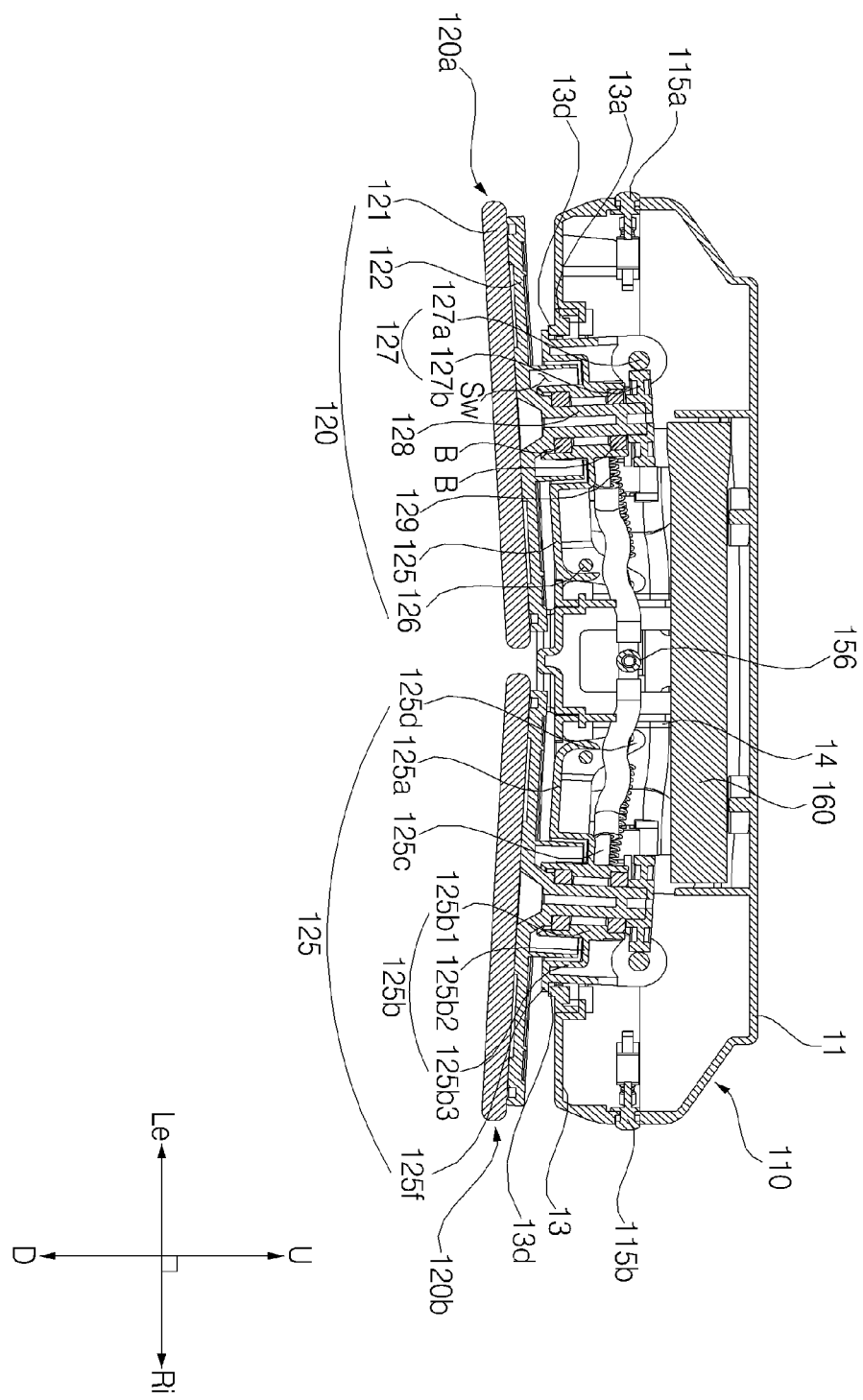
FIG. 5a is a vertical cross-sectional view taken along line S1-S1' of FIG. 4.
Figure 5B:
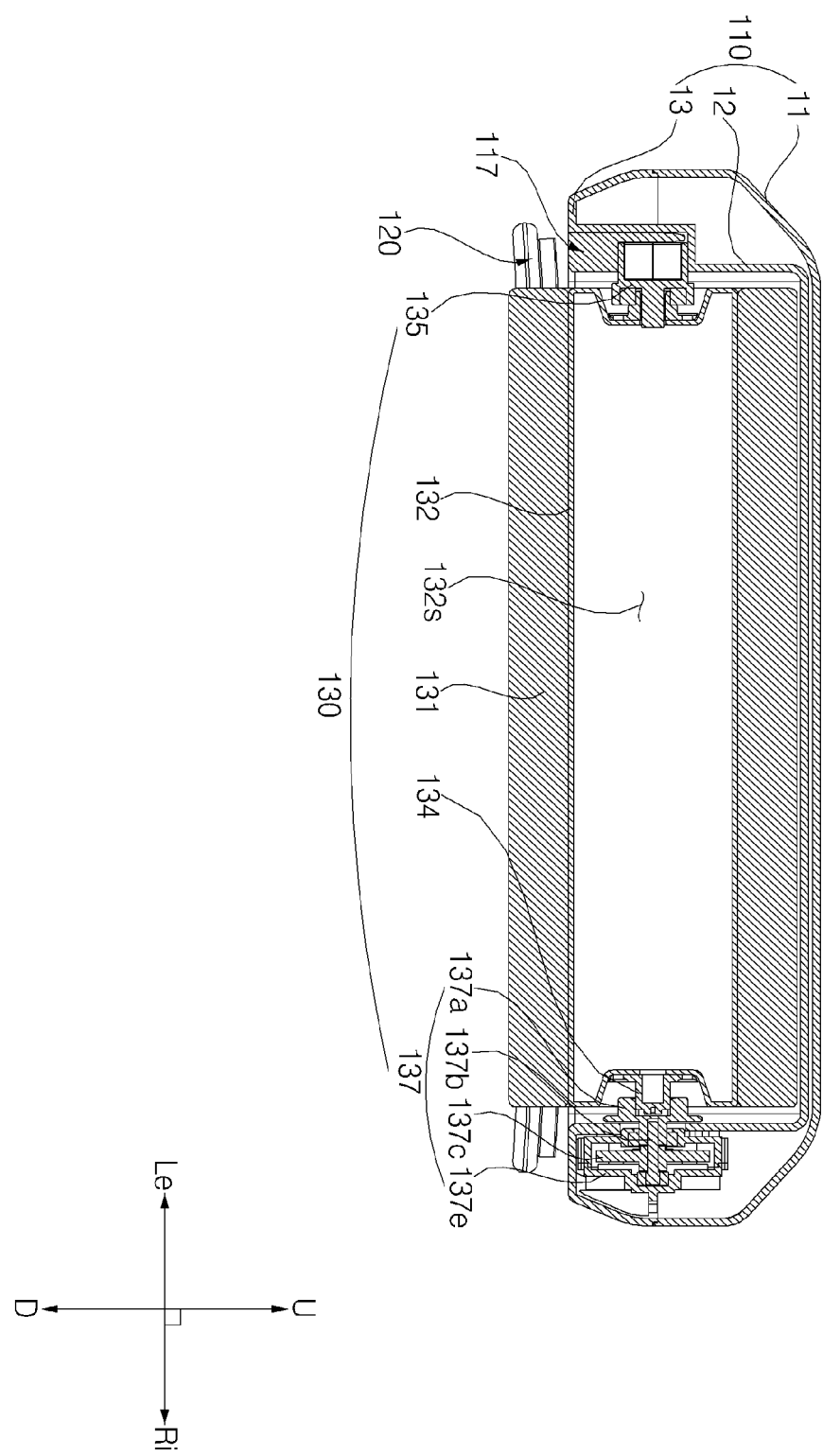
FIG. 5b is a vertical cross-sectional view taken along line S2-S2' of FIG. 4.

Referring to FIG. 5a, the spin module 120 includes a spin rotating shaft 128 for rotating the rotating plate 122. The spin rotating shaft 128 is fixed to the rotating plate 122 so as to transmit the rotational force of the spin drive unit 124 to the rotating plate 122. The spin rotating shaft 128 is connected to the upper side of the rotating plate 122. The spin rotating shaft 128 is disposed at the center of an upper portion of the rotating plate 122. The spin rotating shaft 128 is fixed to the rotational center Osa or Osb of the rotating plate 122. The spin rotating shaft 128 includes a gear holder (not shown) for holding a gear 127b. The gear holder is disposed at the upper end of the spin rotating shaft 128.

The spin module 120 includes a left spin rotating shaft 128, which is fixed to the left rotating plate 122 so as to rotate the left rotating plate 122, and a right spin rotating shaft 128, which is fixed to the right rotating plate 122 so as rotate the right rotating plate 122.

The spin rotating shaft 128 extends perpendicular to the rotating plate 122. The left spin rotating shaft 128 is disposed to be perpendicular to the lower surface of the left spin mop 120a, and the right spin rotating shaft 128 is disposed to be perpendicular to the lower surface of the right spin mop 120b. In an embodiment in which the lower surface of each of the spin mops 120a and 120b is inclined with respect to a horizontal surface, the spin rotating shaft 128 is inclined with respect to a vertical axis. The spin rotating shaft 128 is oriented such that the upper end thereof is inclined in one direction with respect to the lower end thereof. The left spin rotating shaft 128 is oriented such that the upper end thereof is inclined leftward with respect to the lower end thereof. The right spin rotating shaft 128 is oriented such that the upper end thereof is inclined rightward with respect to the lower end thereof.

The inclined angle of the spin rotating shaft 128 with respect to a vertical axis may be changed according to the rotation of the tilting frame 125 about the tilting rotating shaft 126. The spin rotating shaft 128 is rotatably coupled to the tilting frame 125 so as to be integrally inclined together with the tilting frame 125. When the tilting frame 125 is inclined, the spin drive unit 124, the drive transmission unit 127, the spin rotating shaft 128, the rotating plate 122, the water supply receiver and the mop member 121 are integrally inclined together with the tilting frame 125.

The spin module 120 includes the water supply receiver, which is disposed at the upper side of the rotating plate 122 so as to receive water therein.

The spin module 120 includes a spin drive unit 124 for supplying the driving force required for rotation of the spin mops 120a and 120b. The spin drive unit 124 may be an assembly including at least a motor. The spin module 120 includes a left spin drive unit 124 for supplying the driving force required for rotation of the left spin rotating shaft 128, and a right spin drive unit 124 for supplying the driving force required for rotation of the right spin rotating shaft 128. The left spin drive unit 124 supplies the driving force required for rotation of the left spin rotating shaft 128. The right spin drive unit 124 supplies the driving force required for rotation of the right spin rotating shaft 128.

The spin module 120 includes the drive transmission unit 127 for transmitting the rotational force of the spin drive unit 124 to the spin rotating shaft 128. The drive transmission unit 127 may include a plurality of gears and/or belts and the like.

In this embodiment, the drive transmission unit 127 includes a first gear 127a fixed to the rotating shaft of the motor 124. The first gear 127a may be a worm gear. The drive transmission unit 127 may include a second gear 127b, which is engaged with the first gear 127a and rotated. The second gear 127b may be a spur gear. The second gear 127b is fixed to the spin rotating shaft 128 so as to rotate the spin rotating shaft 128 when the second gear 127b is rotated.

The spin module 120 includes the tilting frame 125, which is inclined within a predetermined angular range. The tilting frame 125 enables the inclined angles Ag1 and Ag2 to be changed according to the state of the floor. The tilting frame 125 may serve as a suspension for the spin mops 120a and 120b (functions of supporting a weight and of mitigating vertical vibration). The tilting frame 125 is supported so as to be capable of being inclined with respect to the base 13. The tilting frame 125 rotatably supports the spin rotating shaft 128.

The spin module 120 includes the left tilting frame 125 for supporting the left spin rotating shaft 128. The left tilting frame 125 is rotatable within a predetermined range about the left tilting rotating shaft 126.

The spin module 120 includes the right tilting frame 125 for supporting the right spin rotating shaft 128. The right tilting frame 125 is rotatable within a predetermined range about the right tilting rotating shaft 126.

For example, when the left spin mop 120a comes into contact with a depressed portion of an external floor, the inclined angle Ag1 of the left spin mop 120a may be increased within a predetermined range by means of the left tilting frame 125. In this way, when the right spin mop 120b comes into contact with a depressed portion of an external floor, the inclined angle Ag2 of the right spin mop 120b may be increased within a predetermined range by means of the right tilting frame 125.

The tilting frame 125 includes a frame base 125a defining the lower surface thereof. The spin rotating shaft 128 extends vertically through the frame base 125a. The frame base 125a may be formed to have a plate shape having a predetermined thickness in a vertical direction. The tilting rotating shaft 126 rotatably connects the frame base 125a to the base 13.

The tilting frame 125 includes a water supply cabinet 125b receiving the spin rotating shaft 128 therein. The water supply cabinet 125b defines a space, which is depressed upwards from a lower side of the body 110 so as to receive an upper end of the water supply receiver. The water supply cabinet 125b is fixed to the frame base 125a. The water supply cabinet 125b defines a space, which is depressed upwards from the lower surface of the frame base 125a such that water is introduced into the space defined by the water supply cabinet 125b through a water supply unit 125c. The water supply cabinet 125b may guide all of the water into the water supply receiver while minimizing splashing of water.

The water supply cabinet 125b includes a rotating shaft support (not shown) for rotatably supporting the spin rotating shaft 128. A bearing B may be provided between the rotating shaft support and the spin rotating shaft 128. The bearing B may include a first bearing B1 disposed at a lower side and a second bearing B2 disposed at an upper side.

The lower end of the rotating shaft support is disposed in the water supply space defined in the water supply receiver. The inner circumferential surface of the rotating shaft supports the spin rotating shaft 128. The outer circumferential surface of the rotating shaft support faces the inner circumferential surface of the water supply receiver. Accordingly, it is possible to easily guide water into the water supply space while stably supporting the spin rotating shaft 128.

The lower end of the rotating shaft support is disposed between the spin rotating shaft 128 and the inner circumferential surface of the water supply receiver. The outer circumferential surface of the lower end of the rotating shaft support and the inner circumferential surface of the water supply receiver 123 are spaced apart from each other so as to define a water supply space Sw. An inclined portion is disposed at the lower end of the rotating shaft support.

The water supply cabinet 125b includes a partition wall (not shown) projecting from the rotating shaft support. The partition wall covers the upper end of the water supply receiver 123. The partition wall covers the upper end and the outer circumferential surface of the water supply receiver 123. The partition wall is disposed in the centrifugal direction of the rotating shaft support. The partition wall is fixed to and supported by the frame base 125a. The partition wall supports the rotating shaft support.

The tilting frame 125 includes the water supply unit 125c for receiving water from the water supply module. The water supply unit 125c receives water from a supply pipe 156. The water supply unit 125c defines a water channel. The water supply unit 125c guides water into the water supply receiver through the water supply cabinet 125b. One end of the water channel defined by the water supply unit 125c is connected to the end of the supply pipe 156. The other end of the water channel defined by the water supply unit 125c is disposed in the water supply space Sw. The one end of the water channel defined by the water supply unit 125c is disposed outside of the water supply cabinet 125b and the other end of the water channel is disposed in the water supply cabinet 125b (at which the water supply space is positioned). The water supply unit 125c is fixedly disposed at the tilting frame 125. The water supply unit 125c is fixed to the water supply cabinet 125b.

The tilting frame 125 includes the first support 125d for supporting one end of the elastic member 129. The other end of the elastic member 129 is supported by a second support 13b disposed at the base 13. The second support 13b may be formed at the support member 13a of the base 13. As the tilting frame 125 is inclined about the tilting rotating shaft 126, the position of the first support 125d varies and the length of the elastic member 129 varies.

The first support 125d is fixed to the tilting frame 125. The first support 125d is disposed at the right portion of the left tilting frame 125. The first support 125d is also disposed at the left portion of the right tilting frame 125.

The second support 13b is fixed to the base. The second support f13b is disposed at the right region of the left spin module 120. The second support 13b is also disposed at the left region of the right spin module 120.

The first support 125d is fixed to the tilting frame 125. When the tilting frame 125 is inclined, the first support 125d is inclined together with the tilting frame 125. The first support 125d projects away from the tilting rotating shaft 126 such that a portion of the first support 125d, to which the one end of the elastic member 129 is fixed, is positioned at a predetermined distance from the tilting rotating shaft 126. When the inclined angles Ag1 and Ag2 are decreased to the minimum, the first support 125d is positioned closest to the second support 13b. As the inclined angles Ag1 and Ag2 are decreased to the minimum, the elastic member 129 is elastically deformed to a tensioned state.

Referring to FIG. 5a, when viewed from the rear, when the left tilting frame 125 is rotated counterclockwise about the tilting rotating shaft 126, the second support 13b is moved leftward, and the elastic member 129 is elastically restored while being shortened. When viewed from the rear, when the left tilting frame 125 is rotated clockwise about the tilting rotating shaft 126, the second support 13b is moved rightward, and the elastic member 129 is elastically deformed while being elongated. When viewed from the rear, when the right tilting frame 125 is rotated clockwise about the tilting rotating shaft 126, the second support 13b is moved rightward, and the elastic member 129 is elastically restored while being shortened. When viewed from the rear, when the right tilting frame 125 is rotated counterclockwise about the tilting rotating shaft 126, the second support 13b is moved leftward, and the elastic member 129 is elastically deformed while being elongated.

The tilting frame 125 includes a motor support 125e for supporting the spin drive unit 124. The motor support 125e may support the drive transmission unit 127.

The tilting frame 125 includes the upper-end limiter contact portion 125f, which is capable of coming into contact with the upper-end limiter 13d. The upper surface of the upper-end limiter contact portion 125f may come into contact with the lower surface of the upper-end limiter 13d. The left upper-end limiter contact portion 125f may be disposed at the left end of the left tilting frame 125. The right upper-end limiter contact portion 125f may be disposed at the right end of the right tilting frame 125.

The spin module 120 includes the tilting rotating shaft 126, serving as the rotating shaft of the tilting frame 125. The tilting rotating shaft 126 extends in a direction perpendicular to the inclined direction of the spin mops 120a or 120b. The tilting rotating shaft 126 may extend horizontally. In this embodiment, the tilting rotating shaft 126 extends anteroposteriorly.

The spin module 120 includes the left tilting rotating shaft 126, which extends in a direction perpendicular to the inclined direction of the lower surface of the left spin mop 120a. The spin module 120 includes the right tilting rotating shaft 126, which extends in a direction perpendicular to the inclined direction of the lower surface of the right spin mop 120b.

The spin module 120 includes the elastic member 129 for applying elastic force to the tilting frame 125. The elastic member 129 is elongated when the tilting frame 125 is rotated downwards, and is shortened when the tilting frame 125 is rotated upward. The elastic member 129 enables the tilting frame 125 to be operated in a shock-absorbing manner (in an elastic manner). The elastic member 129 applies a moment to the tilting frame 125 in the direction in which the inclined angles Ag1 and Ag2 are increased. The elastic member 129 may be disposed to extend laterally overall.

Figure 6:
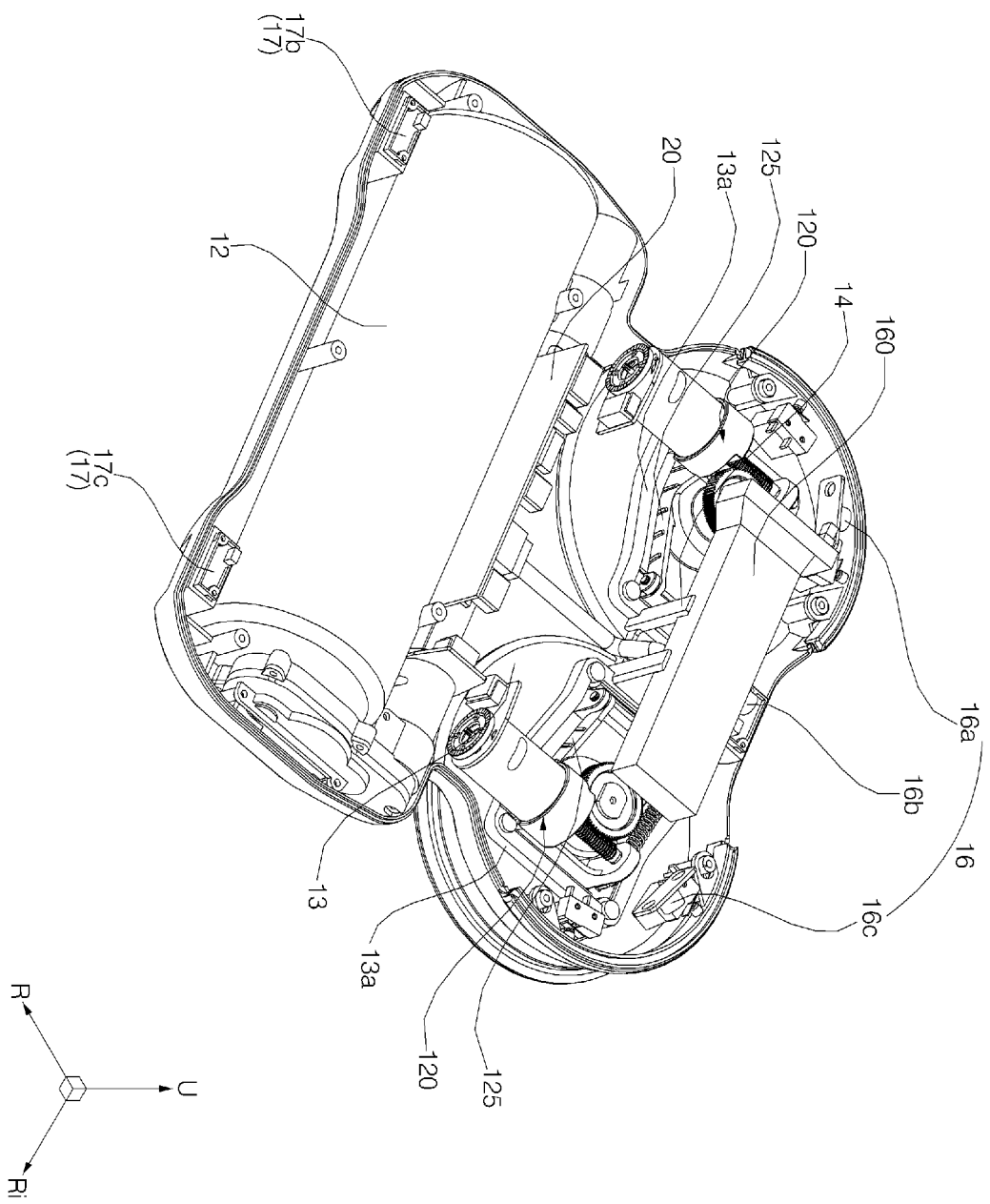
FIG. 6 is a perspective view of the robot cleaner shown in FIG. 1, with a case removed therefrom.
Figure 7:
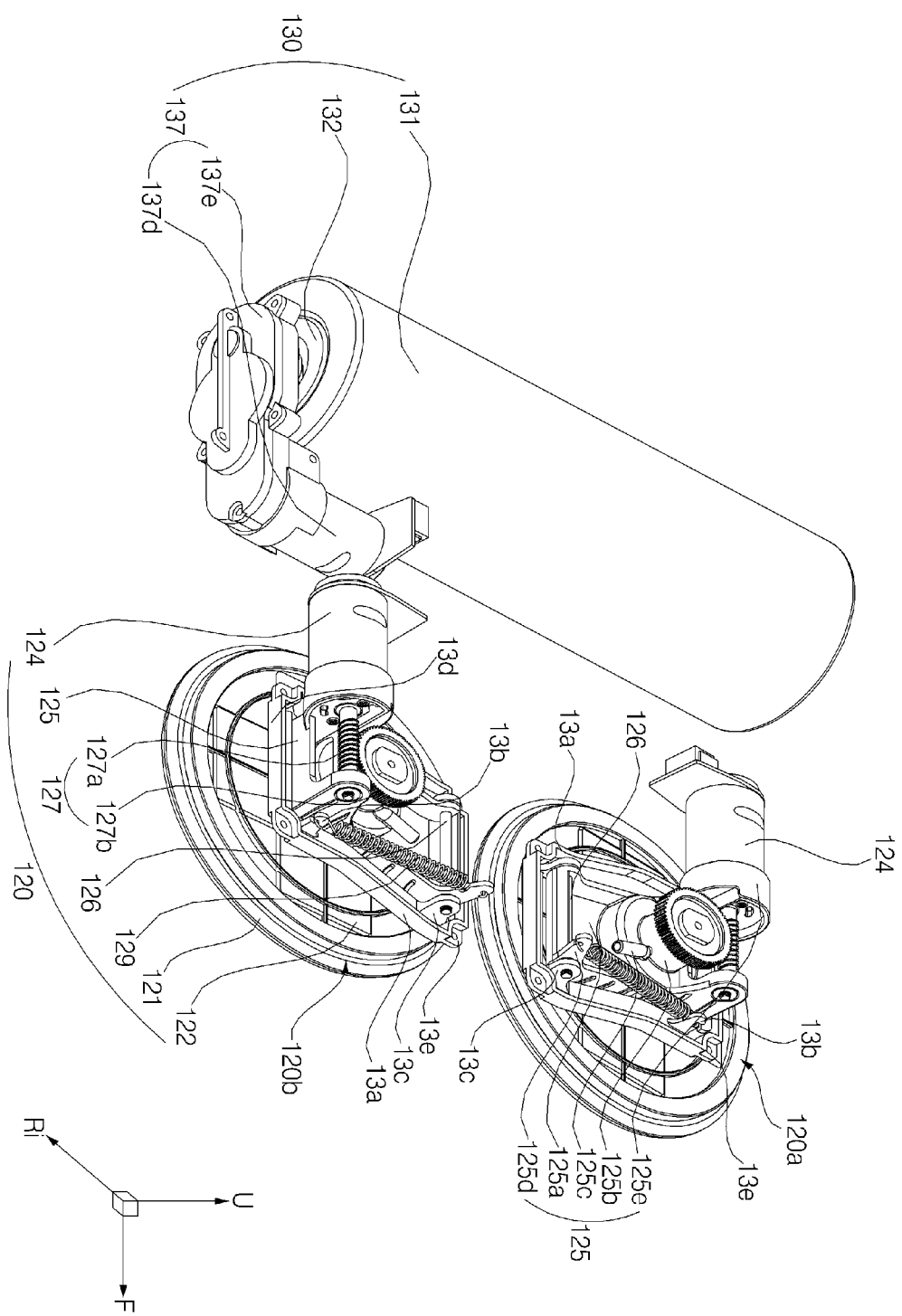
FIG. 7 is a detailed perspective view illustrating a spin module and a rolling module of the robot cleaner shown in FIG. 1.

Referring to FIG. 6, the body 110 includes a battery support 14 for supporting the battery 160. The battery support 14 positions the battery 160 above the supply pipe. The battery support 14 functions to guide the position of the supply pipe 156.

FIG. 8 is a block diagram illustrating the control relationship among substantial components of the robot cleaner according to an embodiment of the present invention.

FIGS. 9 to 19 are views illustrating a method of controlling various traveling operations of the robot cleaner according to an embodiment of the present invention.

Referring to FIGS. 1 to 7, 8 and 9, the robot cleaner 100 according to an embodiment of the present invention may include the spin module 120 including the left spin mop 120a and the right spin mop 120b, which are rotated clockwise or counterclockwise when viewed from above while in contact with the floor, the rolling module 130 disposed behind the spin module 120, the rolling module 130 including the rolling mop 130a, which is rotated clockwise or counterclockwise when viewed from the left while in contact with the floor, and a controller 20 for controlling the rotational motion of the left spin mop 120a and the right spin mop 120b and the rotational motion of the rolling mop 130a.

The robot cleaner 100 according to an embodiment of the present invention may travel by virtue of a front wheel composed of a pair of spin mops 120a and 120b and a rear wheel composed of the rolling mop 130a.

The spin mops 120a and 120b may generate driving force required for traveling in a desired direction while performing a wet-type cleaning operation by supplying water.

The rolling mop 130a may be rotated about the rotational axis extending horizontally. Specifically, when viewed from the left, the rolling mop 130a may be rotated clockwise or counterclockwise.

The rolling mop 130a, which is a rotatable cylindrical wet mop, may include a single rotating member 132 or a plurality thereof having a roller or cylinder shape, and the mop member 131 disposed to surround the rotating member 132 and composed of a fabric material having a high moisture content ratio and a high sweeping ability.

In forward traveling, the rolling mop 130a may perform a mopping operation using the mop member 131 while moving along an area of a floor that has been subjected to a wet-type cleaning operation performed by the spin mops 120a and 120b.

The controller 20 may control the rotational motion of the left spin mop 120a and the right spin mop 120b and the rotational motion of the rolling mop 130a. Furthermore, the controller 20 may independently control the two spin mops 120a and 120b and the single rear rolling mop 130a.

In addition, the controller 20 may perform control so as to change the rotational direction and speed of the rolling mop 130a, thereby controlling the acceleration or deceleration of the robot cleaner 100.

According to an embodiment of the present invention, it is possible to improve floor-cleaning performance, such as absorption of remaining moisture and decontamination by means of the rear rolling mop 130a, and it is possible to assist the body in traveling by control of the rotational direction and/or speed of the rear rolling mop 130a.

Furthermore, according to an embodiment of the present invention, there are advantages of realizing various traveling motions as well as a rotary frictional cleaning operation by control of the rotational direction and speed of the front spin mops 120a and 120b and the rear rolling mop 130a.

The controller 20 may control the traveling motion of the robot cleaner 100 by causing movement due to concurrent slipping of the spin mops 120a and 120b and the rolling mop 130a, which correspond to front and rear wheels, and to the difference in drag force attributable to the difference in rotational speed and frictional force between the spin mops 120a and 120b and the rolling mop 130a.

Furthermore, the rolling mop 130a may be rotated in the same direction as the traveling direction due to rotation of the spin mops 120a and 120b so as to increase a ratio of the driving force of the rolling mop, thereby realizing high-speed traveling.

In addition, the rolling mop 130a may be rotated in a direction opposite a traveling direction due to rotation of the spin mops 120a and 120b so as to make it possible to perform a backward traveling.

The rolling mop 130a may be rotated in a direction opposite a traveling direction due to rotation of the spin mops 120a and 120b so as to maintain a equilibrium of rotational force between the rolling mop 130a and the spin mops 120a and 120b, thereby causing the robot cleaner 100 to stand in place and thus enabling concentrated cleaning at a specific location.

Specifically, the controller 20 may control rotation of the spin mops 120a and 120b and the rolling mop 130a so as to cause a traveling direction due to rotation of the spin mops 120a and 120b to be opposite a traveling direction due to rotation of the rolling mop 130a. As a result, equilibrium in traveling force between forward travel and backward travel is established, thereby causing the robot cleaner 100 to stand in place.

In this case, since the spin mops 120a and 120b and the rolling mop 130a continue to be rotated, it is possible to continuously perform a cleaning operation without cease.

The spin module 120 may include the motor 124 for rotating the spin mops 120a and 120b. The motor 124 may include a left motor for rotating the left spin mop 120a and a right motor for rotating the right spin mop 120b.

The controller 20 may include a first motor drive unit 821 for driving the motor 124 for rotating the spin mops 120a and 120b.

By virtue of the control operation of a main controller 820 of the controller 20, the first motor drive unit 821 is controlled, and the motor 124 is driven by the first motor drive unit 821. Accordingly, the spin mops 120a and 120b are rotated by the motor 124.

The first motor drive unit 821, which is intended to drive the motor 124, may include an inverter (not shown), an inverter controller (not shown), a current detector (not shown) for detecting current flowing to the motor 124 and a voltage detector (not shown) for detecting the voltage applied to the motor 230. The first motor drive unit 821 may further include a converter for supplying direct-current input to the inverter (not shown).

The rolling module 130 is configured to come into contact with a floor. The rolling module 130 may be disposed behind the spin module 120 so as to come into contact with a floor. In this embodiment, the rolling module 130 is configured to perform a mopping operation while rotating.

In another example, the rolling module 130 may include a mop pad or the like, which is used to perform a mopping operation while sliding on a floor as the body 110 moves.

In still another example, the rolling module 130 may also be configured to be capable of performing a vacuum-cleaning operation.

In a further example, the rolling module 130 may include a brush, which is used to perform a sweeping operation. The brush may be configured to be rotated. The brush may be rotated about a rotational axis extending substantially horizontally. The brush may be configured to be rotated about a rotational axis extending substantially laterally. The robot cleaner 100 may include the dust container such that relatively large particles obtained by a sweeping operation of the brush on the floor are collected into the dust container.

The rolling module 130 may include the motor 137d for rotating the rolling mop 130a. In this case, the controller 20 may include a second motor drive unit 822 for driving the motor 137d.

By virtue of a control operation of the main controller 820 of the controller 20, the second motor drive unit 822 is controlled, and the motor 137d is driven by the second motor drive unit 822. Accordingly, the rolling mop 130a is rotated by the motor 137d.

The second motor drive unit 822, which is intended to drive the motor 137d, may include an inverter (not shown), an inverter controller (not shown), a current detector (not shown) for detecting the current flowing to the motor 137d and a voltage detector (not shown) for detecting the voltage applied to the motor 137d. The second motor drive unit 822 may further include a converter for supplying direct-current input to the inverter (not shown).

Although FIG. 8 illustrates an example in which the first and second motor drive units 821 and 822 are included in the controller 20, the present invention is not limited thereto.

For example, the first and second motor drive units 821 and 822 may be separately provided outside the controller 20 and may be operated under the control of the controller 20.

In addition, the first and second motor drive units 821 and 822 may be changed in the detailed configuration thereof depending on the type and specification of the motors 124 and 137d.

The robot cleaner 100 according to an embodiment of the present invention may include a storage unit 830 for storing various data.

The storage unit 830, which is intended to store various information required for control of the robot cleaner 100, may include a volatile or non-volatile recording medium. The recording medium, which stores data readable by a microprocessor, may include a hard disk drive (HDD), a solid-state disk (SSD), a ROM, a RAM, a CD-ROM, a magnetic tape, a floppy disc, optical data storage, and the like.

In some embodiments, the storage unit 830 may store cleaning history information. The cleaning history information may be created every time a cleaning operation is performed.

The robot cleaner 100 may include a sensor unit 810 including a plurality of sensors for sensing various data associated with the operation and state of the robot cleaner 100.

The sensor unit 810 may include an obstacle sensor 811 for detecting an obstacle in front of the robot cleaner 100. The obstacle sensor 811 may include the plurality of sensors 16a, 16b and 16c illustrated in FIG. 1.

The obstacle sensor 811 may include an infrared sensor, an ultrasonic sensor, an RF sensor, a geomagnetic sensor, a position-sensitive device (DSD) sensor and the like.

The position and type of the sensors included in the obstacle sensor 811 may be changed depending on the model of the robot cleaner, and the obstacle sensor 811 may further include various sensors.

The controller 20 may perform control so as to travel while skirting around a detected obstacle.

According to the present invention, the controller 20 may control various traveling motions by combining the motion of the spin mops 120a and 120b with the motion of the rolling mop 130a.

Accordingly, the controller 20 may perform control so as to perform various skirting traveling operations according to an obstacle detected by the obstacle sensor 811.

The controller 20 may perform control so as to perform another skirting traveling operation according to on an obstacle detected by the obstacle sensor 811.

In addition, the sensor unit 810 may include a position sensor 812 for detecting the position of the robot cleaner 100 by receiving an external recognition signal.

For example, the position sensor 812 may be a UWB sensor employing an ultra-wideband (UWB) communication signal. Ultra-wideband communication, which is a technology for transmitting a signal through an ultra-wideband frequency with low power at short range, is advantageously used in an indoor space, in which an obstacle such as a wall is present, because it is excellent in distance resolution and penetrating power.

The controller 20 may detect the position of the robot cleaner 100 based on the signal received from the position sensor 812.

The external recognition signal is a signal transmitted from a signal generator such as a beacon located outside, and the signal generator may include a plurality of signal generators, which are provided at a plurality of separate sites.

Accordingly, the position sensor 812 is able to receive recognition signals transmitted from signal generators located at different sites.

The position sensor 812 may detect the position or traveling direction of the robot cleaner 100 by performing a comparison operation on information such as the strength and direction of the recognition signals received from the signal generators and the times at which the signals are received from the signal generators, information received at a previous site and information received at the current site.

The present invention may detect a spatial position from a relative distance with respect to three or more signal generators such as anchors or beacons, which generate specific recognition signals such as a UWB communication signal and a BLE signal.

In this case, the controller 20 may calculate speed information by performing a comparison operation between previous and current position information and receipt times of the previous and current position information based on the signal received at the position sensor 812. Thereafter, the controller 20 may control the rotation of the motor by estimating a target trajectory from calculation of a remaining distance and positional error with respect to the target trajectory and the current site based on the position information.

The sensor unit 810 may include an inertial measurement unit (IMU) 813. The inertial measurement unit 813 may include a gyro sensor 813a, a geomagnetic sensor 813b and an acceleration sensor 813c. Alternatively, the sensor unit 810 may include the gyro sensor 813a, the geomagnetic sensor 813b and the acceleration sensor 813c, which are independently provided.

The gyro sensor 813a may detect a designated reference direction, the geomagnetic sensor 813b may measure a heading angle (azimuthal angle), and the acceleration sensor 813c may measure speed variation. Consequently, the inertial measurement unit sensor 813 may measure a moving speed, a direction, a gravitational force and an acceleration of the robot cleaner 100.

Each of the gyro sensor 813a and the acceleration sensor 813c may be a triaxial sensor. The information collected from the gyro sensor 813a may be roll, pitch and yaw information, and the information collected from the acceleration sensor 813c may be x-axis acceleration, y-axis acceleration and z-axis acceleration information.

The inertial measurement unit sensor 813 is able to measure accelerations in the traveling direction, lateral direction and height direction and an angular speed in rolling, pitching and yaw. The controller 20 is able to perform calculation of a speed and a heading angle of the robot cleaner 100 by integrating an acceleration and an angular speed obtained by the inertial measurement unit sensor 813.

The rolling mop 130a or the like of the robot cleaner 100 according to an embodiment of the present invention may be configured such that the ratio between rolling motion and slipping motion is continuously changed according to the changing state of frictional force.

The robot cleaner 100 according to an embodiment of the present invention may have a compensation control structure for controlling movement, which is able to change the RPM of the motor by controlling the output of the plurality of motor drive units 821 and 822 according to variation of acceleration and angular speed obtained by the inertial measurement unit sensor 813.

For example, the controller 20 may control rotational speed of the left spin mop 120a, the right spin mop 120b and the rolling mop 130a based on variation of acceleration and angular speed detected by the inertial measurement unit sensor 813.

The controller 20 is able to control the motors 124 and 137d in such a manner as to respectively compensate output of the motors 124 and 137d using information, such as acceleration and speed, detected by the sensor unit 810.

Furthermore, the controller 20 is able to detect current traveling conditions of the robot cleaner 100 based on predetermined information such as a heading angle information of the robot cleaner 100 detected by the sensor unit 810.

The sensor unit 810 may further include cliff sensors 814 for detecting a cliff present in a traveling area on a floor. Each of the cliff sensors 814 may be the cliff sensor 17 illustrated in FIG. 1.

In some embodiments, at least one of the cliff sensors 814 may include at least one light-emitting element and at least one light-receiving element.

A floor has optical reflectivity, which varies according to the material of the floor. For example, a hard floor may have a high optical reflectivity, and a soft floor such as a carpet may have a low optical reflectivity.

Accordingly, the controller 20 may determine the material of a floor based on the amount of reflected light, which is emitted from the light-emitting element, reflected at the floor and received at the light-receiving element.

For example, the controller 20 may determine the floor to be a hard floor when the amount of reflected light is equal to or greater than a predetermined reference value, and may determine that the floor is a carpet when the amount of reflected light is less than the predetermined reference value.

The reference value, which is employed as the criterion for determination of the material of the floor, may be set according to the distance between the floor and the cliff sensor 814.

For example, there may be a difference between the reference value in the case in which the distance between the floor and the cliff sensor 814, detected by the cliff sensor 814, is 25 mm, and the reference value in the case in which the distance is 35 mm.

When the distance between the floor and the cliff sensor 814 is excessively short, there may be no significant difference between the two reference values.

Accordingly, the controller 20 may employ the reference value as a criterion of determination for a floor only when the distance between the floor and the cliff sensor 814 is equal to or greater than a predetermined distance.

For example, the controller 20 may determine the material of a floor based on the amount of reflected light, which is detected by the cliff sensor 814 when the distance between the floor and the cliff sensor 814 is 20 mm or more.

It is preferred that a carpeted floor not be subjected to a wet-type cleaning operation. Accordingly, it is very important for the robot cleaner 100 configured to perform a wet-type cleaning operation to be capable of detecting carpet.

According to an embodiment of the present invention, there is an advantage of being capable of identifying a carpet based on the amount of reflected light detected by the cliff sensor 814.

Furthermore, according to an embodiment of the present invention, it is possible to determine the condition of a floor in two or three manners based on the amount of reflected light detected by the cliff sensor 814 and the value of the load current of the motor. Accordingly, there is an advantage of being capable of more accurately determining the condition of a floor.

The sensor unit 810 according to an embodiment of the present invention may further include a motor sensor 815 for detecting information about the operation and state of the motor. The motor sensor 815 may detect the value of the load current of the motor and the like.

In some embodiment, the motor sensor 815 may be simply composed of a current detector included in each of the first and second motor drive units 821 and 822.

The robot cleaner 100 according to the embodiment of the present invention includes the front spin mops 120a and 120b and the rear rolling mop 130a. The front spin mops 120a and 120b and the rear rolling mop 130a have a cooperative relationship with each other in a traveling operation.

The controller 20 may control the traveling operation of the robot cleaner 100 by controlling the rotational motion of the front spin mops 120a and 120b and the rear rolling mop 130a.

The rotational direction of the left spin mop 120a and the rotational direction of the right spin mop 120b are opposite each other during a forwards or backwards traveling operation.

Specifically, the front spin mops 120a and 120b are rotated outwards when viewed from the front during a forward traveling operation, and are rotated inwards during a backward traveling operation.

During a left-turning operation, the rotational directions of the front spin mops 120a and 120b are the same.

For example, when the robot cleaner 100 intends to turn right, both the front spin mops 120a and 120b are rotated counterclockwise (when viewed from above). At this time, the right spin mop 120b serves as the center point of the right-turning motion, and the opposite left spin mop 120a serves to provide supplementary force for the right-turning motion.

In contrast, when the robot cleaner 100 tries to turn right, both the front spin mops 120a and 120b are rotated clockwise (when viewed from above). At this time, the left spin mop 120a serves as the center point of the left-turning motion, and the opposite right spin mop 120b serves to provided supplementary force for the left-turning motion.

In a forward traveling operation, the rear rolling mop 130a is rotated forwards or serves to increase RPM.

In contrast, in a backward traveling operation, the rear rolling mop 130a is rotated backwards or serves to decrease RPM.

Hereinafter, various motions of the rear spin mops 120a and 120b and the rear rolling mop 130a during a traveling operation of the robot cleaner 100 will be described with reference to FIGS. 10 to 17.

Referring to FIG. 10, the controller 20 may control the robot cleaner 100 so as to perform a high-speed forward traveling operation by rotating the left spin mop 120a and the right spin mop 120b outwards while rotating the rolling mop 130a forward.

Referring to FIG. 10(*a*), in a high-speed forward traveling operation, when viewed from above, the left spin mop 120a is rotated counterclockwise and the right spin mop 120b is rotated clockwise, that is, the front spin mops 120a and 120b are rotated outwards so as to enable the robot cleaner 100 to perform a forward traveling operation.

In this case, the rolling mop 130a may be rotated forwards so as to provide supplementary force in a forward direction. Consequently, it is possible to increase acceleration in a forward direction.

Referring to FIG. 10(*b*), in a high-speed forward traveling operation, when viewed from below, the left spin mop 120a is rotated clockwise and the right spin mop 120b is rotated counterclockwise; that is, the rear spin mops 120a and 120b are rotated outwards so as to enable the robot cleaner 100 to perform a forward traveling operation.

In this case, the rolling mop 130a may be rotated forwards so as to provide supplementary force in a forward direction. Consequently, it is possible to increase acceleration in a forward direction.

Thus, when both of the two front spin mops 120a and 120b and the rear rolling mop 130a are rotated, the robot cleaner 100 is able to travel forward at a higher speed than when only the two spin mops 120a and 120b are rotated.

Accordingly, in a high-speed forward traveling operation, control is performed so as to cause the left spin mop 120a and the right spin mop 120b to be rotated outwards and to cause the rolling mop 130a to be rotated forwards.

The controller 20 may perform control so as to perform various motions by controlling the rotational direction and speed of the rolling mop 130a while the left spin mop 120a and the right spin mop 120b are rotated outward.

For example, the controller 20 may control the robot cleaner 100 to perform a stationary operation by causing the left spin mop 120a and the right spin mop 120b to be rotated outwards while causing the rolling mop 130a to be rotated backwards at a first speed. Here, the first speed may be set so as to obtain a backward propulsive force equal to a forward propulsive force resulting from rotation of the left spin mop 120a and the right spin mop 120b.

Alternatively, the controller 20 may control the robot cleaner 100 so as to perform a low-speed forward traveling operation by causing the left spin mop 120a and the right spin mop 120b to be rotated outward while causing the rolling mop 130a to be rotated backwards at a second speed. Here, the absolute value of the second speed may be lower than the absolute value of the first speed. Consequently, although the forward propulsive force becomes higher than the backward propulsive force, thereby enabling forward traveling operation, the speed of the robot cleaner 100 is decreased owing to the presence of the backward propulsive force.

Alternatively, the controller 20 may control the robot cleaner 100 so as to perform a low-speed backward traveling operation by causing the left spin mop 120a and the right spin mop 120b to be rotated outwards while causing the rolling mop 130a to be rotated backwards at a higher speed than the first speed.

Referring to FIG. 11(a), when viewed from above, the left spin mop 120a is rotated counterclockwise and the right spin mop 120b is rotated clockwise; that is, the front spin mops 120a and 120b are rotated outwards so as to enable the robot cleaner 100 to perform a forward traveling operation.

In this case, the rolling mop 130a may be rotated backwards so as to provide supplementary force in a backward direction opposite the forward direction. Consequently, it is possible to decrease acceleration in a forward direction.

Referring to FIG. 11(b), when viewed from below, the left spin mop 120a is rotated clockwise and the right spin mop 120b is rotated counterclockwise; that is, the rear spin mops 120a and 120b are rotated outwards so as to enable the robot cleaner 100 to perform a forward traveling operation.

In this case, the rolling mop 130a may be rotated backwards so as to provide supplementary force in a backward direction. Consequently, it is possible to decrease acceleration in a forward direction.

Thus, when both of the two front spin mops 120a and 120b and the rear rolling mop 130a are rotated, the robot cleaner 100 is able to travel forward at a lower speed than when only the two spin mops 120a and 120b are rotated. In other words, in order to increase cleaning performance, the robot cleaner 100 is able to travel forward at a lower speed while maintaining the rotational speed of the spin mops 120a and 120b.

Furthermore, when the rotational speed (RPM) of the rolling mop 130a is further increased while the mops are rotated in the above respective rotational directions, the robot cleaner 100 is able to perform a mopping operation by rotating the spin mops 120a and 120b and the rolling mop 130a while standing in place (stationary operation).

In addition, when the rotational speed (RPM) of the rolling mop 130a is further increased while the mops are rotated in the above respective rotational directions, the robot cleaner 100 is able to perform a mopping operation by rotating the spin mops 120a and 120b and the rolling mop 130a while performing a backward traveling operation.

Specifically, it is possible not only to increase cleaning performance by increasing the rotational speeds of the spin mops 120a and 120b and the rolling mop 130a but also to perform a concentrated cleaning operation of intensively performing a mopping operation on a certain area by decreasing a moving speed of the robot cleaner 100 or maintaining the robot cleaner 100 in the stationary state.

Referring to FIG. 12, the controller 20 may control the robot cleaner 100 so as to perform a high-speed backward traveling operation by rotating the left spin mop 120a and the right spin mop 120b inward while rotating the rolling mop 130a backwards.

Referring to FIG. 12(a), in a high-speed backward traveling operation, when viewed from above, the left spin mop 120a is rotated clockwise and the right spin mop 120b is rotated counterclockwise; that is, the front spin mops 120a and 120b are rotated inwards so as to enable the robot cleaner 100 to perform a backward traveling operation.

In this case, the rolling mop 130a may be rotated backwards so as to provide supplementary force in a backward direction. Consequently, it is possible to increase acceleration in a backward direction.

Referring to FIG. 12(b), in a high-speed backward travelling operation, when viewed from below, the left spin mop 120a is rotated counterclockwise and the right spin mop 120b is rotated clockwise; that is, the rear spin mops 120a and 120b are rotated inwards so as to enable the robot cleaner 100 to perform a backward traveling operation.

In this case, the rolling mop 130a may be rotated backwards so as to provide supplementary force in a backward direction. Consequently, it is possible to increase acceleration in a backward direction.

Thus, when both of the two front spin mops 120a and 120b and the rear rolling mop 130a are rotated, the robot cleaner 100 is able to travel backwards at a higher speed than when only the two spin mops 120a and 120b are rotated.

Accordingly, in a high-speed backward traveling operation, control is performed so as to cause the left spin mop 120a and the right spin mop 120b to be rotated inwards and to cause the rolling mop 130a to be rotated backwards.

The controller 20 may perform control so as to perform various motions by controlling the rotational direction and speed of the rolling mop 130a while the left spin mot 120a and the right spin mop 120b are rotated inwards.

For example, the controller 20 may perform control the robot cleaner 100 to perform a stationary operation by causing the left spin mop 120a and the right spin mop 120b to be rotated inwards while causing the rolling mop 130a to be rotated forwards at a third speed. Here, the third speed may be set so as to obtain a forward propulsive force equal to the backward propulsive force resulting from rotation of the left spin mop 120a and the right spin mop 120b.

Alternatively, the controller 20 may control the robot cleaner 100 so as to perform a low-speed backward traveling operation by causing the left spin mop 120a and the right spin mop 120b to be rotated inwards while causing the rolling mop 130a to be rotated forwards at a fourth speed. Here, the absolute value of the fourth speed may be lower than the absolute value of the first speed. Consequently, although the backward propulsive force becomes higher than the forward propulsive force, thereby enabling a backward traveling operation, the speed of the robot cleaner 100 is decreased owing to the presence of the forward propulsive force.

Alternatively, the controller 20 may control the robot cleaner 100 so as to perform a low-speed forward traveling operation by causing the left spin mop 120a and the right spin mop 120b to be rotated inwards while causing the rolling mop 130a to be rotated forwards at a higher speed than the third speed.

Referring to FIG. 13(a), when viewed from above, the left spin mop 120a is rotated clockwise and the right spin mop 120b is rotated counterclockwise; that is, the front spin mops 120a and 120b are rotated inwards so as to enable the robot cleaner 100 to perform a backward traveling operation.

In this case, the rolling mop 130a may be rotated forwards so as to provide supplementary force in a forward direction, opposite the backward direction. Consequently, it is possible to decrease acceleration in a backward direction.

Referring to FIG. 13(b), when viewed from below, the left spin mop 120a is rotated counterclockwise and the right spin mop 120b is rotated clockwise; that is, the rear spin mops 120a and 120b are rotated inwards so as to enable the robot cleaner 100 to perform a backward traveling operation.

In this case, the rolling mop 130a may be rotated forwards so as to provide supplementary force in a forward direction. Consequently, it is possible to decrease acceleration in a backward direction.

Thus, when both of the two front spin mops 120a and 120b and the rear rolling mop 130a are rotated, the robot cleaner 100 is able to travel backwards at a lower speed than when only the two spin mops 120a and 120b are rotated. In other words, in order to increase cleaning performance, the robot cleaner 100 is able to travel backwards at a lower speed while maintaining the rotational speed of the spin mops 120a and 120b.

Furthermore, when the rotational speed (RPM) of the rolling mop 130a is further increased while the mops are rotated in the above respective rotational directions, the robot cleaner 100 is able to perform a mopping operation by rotating the spin mops 120a and 120b and the rolling mop 130a while standing in place (stationary operation).

In addition, when the rotational speed (RPM) of the rolling mop 130a is further increased while the mops are rotated in the above rotational directions, the robot cleaner 100 is able to perform a mopping operation by rotating the spin mops 120a and 120b and the rolling mop 130a while performing a forward traveling operation.

Specifically, it is possible not only to increase cleaning performance by increasing the rotational speeds of the spin mops 120a and 120b and the rolling mop 130a but also to perform a concentrated cleaning operation of intensively performing a mopping operation on a certain area by decreasing the moving speed of the robot cleaner 100 or maintaining the robot cleaner 100 in the stationary state.

In a turning operation, the controller 20 may control a rotational direction by rotating at least one of the left spin mop 120a and the right spin mop 120b clockwise or counterclockwise and may control the turning extent of the robot cleaner 100 by rotating the rolling mop 130a forwards or backwards.

Referring to FIG. 14(a), when viewed from above, the left spin mop 120a and the right spin mop 120b are rotated counterclockwise so as to enable the robot cleaner 100 to perform a right-turning operation.

In this case, the rolling mop 130a may be rotated forwards so as to provide supplementary force in a forward direction. Consequently, the robot cleaner 100 may perform a turning operation with a larger turning radius.

Referring to FIG. 14(b), when viewed from below, the left spin mop 120a and the right spin mop 120b are rotated clockwise so as to enable the robot cleaner 100 to perform a right-turning operation.

In this case, the rolling mop 130a may be rotated forwards so as to provide supplementary force in a forward direction. Consequently, it is possible to increase the turning radius of the robot cleaner 100.

Thus, when both of the two front spin mops 120a and 120b and the rear rolling mop 130a are rotated, the robot cleaner 100 is able to turn right with a larger turning radius than when only the two spin mops 120a and 120b are rotated. It is possible to continuously move the center of the turning motion forwards while performing the turning operation.

Alternatively, when viewed from above, the controller 20 may control the robot cleaner 100 to perform a turning operation with a larger turning radius by rotating the left spin mop 120a clockwise at a lower speed than the right spin mop 120b while rotating the right spin mop 120b counterclockwise or by rotating the rolling mop 130b forwards while the left spin mop 120a is stationary.

Alternatively, when viewed from above, the controller 20 may control the robot cleaner 100 to perform a turning operation with a larger turning radius by rotating the right spin mop 120b clockwise at a lower speed than the left spin mop 120a while rotating the left spin mop 120a counterclockwise or by rotating the rolling mop 130b forwards while the right spin mop 120b is stationary.

Referring to FIG. 15(a), when viewed from above, the left spin mop 120a and the right spin mop 120b are rotated counterclockwise so as to enable the robot cleaner 100 to perform a right-turning operation.

In this case, the rolling mop 130a may be rotated backwards so as to provide supplementary force in a backward direction. Consequently, the robot cleaner 100 may perform a turning operation with a smaller turning radius.

Referring to FIG. 15(b), when viewed from below, the left spin mop 120a and the right spin mop 120b are rotated clockwise so as to enable the robot cleaner 100 to perform a right-turning operation.

In this case, the rolling mop 130a may be rotated backwards so as to provide supplementary force in a backward direction. Consequently, it is possible to decrease the turning radius of the robot cleaner 100.

Thus, when both of the two front spin mops 120a and 120b and the rear rolling mop 130a are rotated, the robot cleaner 100 is able to turn right with a smaller turning radius than when only the two spin mops 120a and 120b are rotated. It is possible to continuously move the center of the turning motion backwards while performing the turning operation.

Alternatively, when viewed from above, the controller 20 may control the robot cleaner 100 to perform a turning operation with a smaller turning radius by rotating the left spin mop 120a clockwise at a lower speed than the right spin mop 120b while rotating the right spin mop 120b counterclockwise or by rotating the rolling mop 130b backwards while the left spin mop 120a is stationary.

Alternatively, when viewed from above, the controller 20 may control the robot cleaner 100 to perform a turning operation with a smaller turning radius by rotating the right spin mop 120b clockwise at a lower speed than the left spin mop 120a while rotating the left spin mop 120a counterclockwise or by rotating the rolling mop 130b backwards while the right spin mop 120b is stationary.

Referring to FIG. 16(a), when viewed from above, the left spin mop 120a and the right spin mop 120b are rotated clockwise so as to enable the robot cleaner 100 to perform a left-turning operation.

In this case, the rolling mop 130a may be rotated forwards so as to provide supplementary force in a forward direction. Consequently, the robot cleaner 100 may perform a turning operation with a larger turning radius.

Referring to FIG. 16(b), when viewed from below, the left spin mop 120a and the right spin mop 120b are rotated counterclockwise so as to enable the robot cleaner 100 to perform a left-turning operation.

In this case, the rolling mop 130a may be rotated forwards so as to provide supplementary force in a forward direction. Consequently, it is possible to increase the turning radius of the robot cleaner 100.

Thus, when both of the two front spin mops 120a and 120b and the rear rolling mop 130a are rotated, the robot cleaner 100 is able to turn left with a larger turning radius than when only the two spin mops 120a and 120b are rotated. It is possible to continuously move the center of the turning motion forwards while performing the turning operation.

Alternatively, when viewed from above, the controller 20 may control the robot cleaner 100 to perform a turning operation with a larger turning radius by rotating the left spin mop 120*a* counterclockwise at a lower speed than the right spin mop 120*b* while rotating the right spin mop 120*b* clockwise or by rotating the rolling mop 130*b* forwards while the left spin mop 120*a* is stationary.

Alternatively, when viewed from above, the controller 20 may control the robot cleaner 100 to perform a turning operation with a larger turning radius by rotating the right spin mop 120*b* counterclockwise at a lower speed than the left spin mop 120*a* while rotating the left spin mop 120*a* clockwise or by rotating the rolling mop 130*b* forwards while the right spin mop 120*b* is stationary.

Referring to FIG. 17(*a*), when viewed from above, the left spin mop 120*a* and the right spin mop 120*b* are rotated clockwise so as to enable the robot cleaner 100 to perform a left-turning operation.

In this case, the rolling mop 130*a* may be rotated backwards so as to provide supplementary force in a backward direction. Consequently, the robot cleaner 100 may perform a turning operation with a smaller turning radius.

Referring to FIG. 17(*b*), when viewed from below, the left spin mop 120*a* and the right spin mop 120*b* are rotated counterclockwise so as to enable the robot cleaner 100 to perform a left-turning operation.

In this case, the rolling mop 130*a* may be rotated backwards so as to provide supplementary force in a backward direction. Consequently, it is possible to decrease the turning radius of the robot cleaner 100.

Thus, when both of the two front spin mops 120*a* and 120*b* and the rear rolling mop 130*a* are rotated, the robot cleaner 100 is able to turn left with a smaller turning radius than when only the two spin mops 120*a* and 120*b* are rotated. It is possible to continuously move the center of the turning motion backwards while performing the turning operation.

Alternatively, when viewed from above, the controller 20 may control the robot cleaner 100 to perform a turning operation with a smaller turning radius by rotating the left spin mop 120*a* counterclockwise at a lower speed than the right spin mop 120*b* while rotating the right spin mop 120*b* clockwise or by rotating the rolling mop 130*b* backwards while the left spin mop 120*a* is stationary.

Alternatively, when viewed from above, the controller 20 may control the robot cleaner 100 to perform a turning operation with a smaller turning radius by rotating the right spin mop 120*b* counterclockwise at a lower speed than the left spin mop 120*a* while rotating the left spin mop 120*a* clockwise or by rotating the rolling mop 130*b* backwards while the right spin mop 120*b* is stationary.

The robot cleaner 100 according to an embodiment of the present invention may perform a traveling operation using movement resulting from the difference in drag force due to the difference in rotational speed and frictional force between the spin mops 120*a* and 120*b*, serving as front wheels, and the rolling mop 130*a*, serving as a rear wheel.

Furthermore, when the spin mops 120*a* and 120*b* and the rolling mop 130*a* are rotated so as to provide propulsive forces in the same direction, it is possible to perform a high-speed traveling operation by increasing a ratio of driving force of the rolling mop.

In addition, when the spin mops 120*a* and 120*b* and the rolling mop 130*a* are rotated so as to attain the force equilibrium therebetween, the robot cleaner 100 stands in place while the spin mops 120*a* and 120*b* and the rolling mop 130*a* concurrently slip, thereby enabling intensive cleaning at a specific location.

According to an embodiment of the present invention, the sensor unit 810 may include a position sensor 812 for detecting a position by receiving an external recognition signal, and the controller 20 may detect the position of the robot cleaner 100 based on the signal received from the position sensor 812.

The external recognition signal is a signal transmitted from a signal generator such as an externally located beacon, and the signal generator may include a plurality of signal generators, which are provided at a plurality of separate sites.

Accordingly, the position sensor 812 is able to receive a recognition signal transmitted from the signal generator located at different sites.

Figure 18:
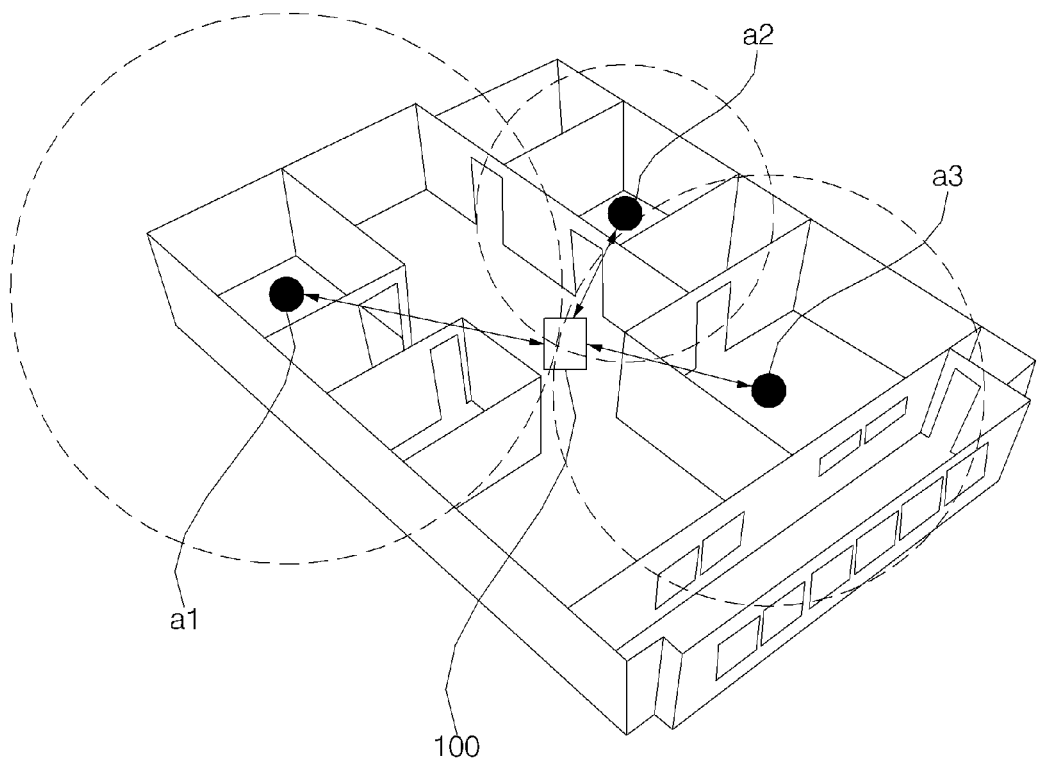

Referring to FIG. 18, the robot cleaner 100 may receive recognition signals from a signal generator, such as a UWB communication signal and a BLE signal, located at a plurality of sites a1, a2 and a3 through the position sensor 812.

The position sensor 812 may detect the position or direction of the robot cleaner 100 by performing a comparison operation among information such as the strength and direction of the recognition signal received from the signal generators located at the plurality of sites a1, a2 and a3 and the times at which the signals are received from the signal generators, information received at a previous site and information received at a current site.

The robot cleaner 100 according to the embodiment of present invention may detect a spatial position from a relative distance with respect to three or more signal generators located at a plurality of sites a1, a2 and a3. For example, it is possible to detect a spatial position through a three-point positioning technology.

In this case, the controller 20 may calculate speed information via a comparison operation between input times and positions of the previous position information and the current position information based on the signal received at the position sensor 812. Furthermore, the controller 20 may control the rotation of the motor so as to follow a target trajectory by calculating the remaining distance and positional error with respect to the current site based on the position information.

The main controller 820 may control the rotation of the rolling mop 130*a* in such a manner as to calculate speed information from a comparison operation performed on the input time and the position in the previously received position information and then to calculate input to the motor drive units 821 and 822 from calculation of the remaining distance and positional error with respect to the current site so as to follow a target trajectory based on the position information. Accordingly, it is possible for the robot cleaner 100 to reliably follow the target trajectory by virtue of the combined rolling and slipping motion.

For example, the position sensor 812 may be a UWB sensor employing a UWB communication signal.

The robot cleaner 100 is able to detect an absolute position in space in real time through a UWB sensor and to control traveling motion.

Furthermore, although it is difficult to estimate a travel distance and a current position through detection of the rotational speed of wheels owing to continuous slippage of the wheels, the present invention enables standing at a specific site, movement to a target point and travel to an area not cleaned, by virtue of the UWB sensor capable of detecting an indoor position in real time.

The sensor unit 810 may include an inertial measurement unit (IMU) 813. The inertial measurement unit 813 may include a gyro sensor 813a, a geomagnetic sensor 813b and an acceleration sensor 813c. Alternatively, the sensor unit 810 may include the gyro sensor 813a, the geomagnetic sensor 813b and the acceleration sensor 813c, which are independently provided.

Accordingly, the sensor unit 813 may measure a moving speed, a direction, a gravitational force and an acceleration of the robot cleaner 100.

Each of the gyro sensor 813a and the acceleration sensor 813c may be a triaxial sensor. The information collected from the gyro sensor 813a may be roll, pitch and yaw information, and the information collected from the acceleration sensor 813c may be x-axis acceleration, y-axis acceleration and z-axis acceleration information.

The inertial measurement unit sensor 813 is able to measure accelerations in the traveling direction, lateral direction and height direction and an angular speed of rolling, pitching and yaw. The controller 20 is able to perform calculation of a speed and a heading angle of the robot cleaner 100 by integrating an acceleration and an angular speed obtained by the inertial measurement unit sensor 813.

The rolling mop 130a or the like of the robot cleaner 100 according to an embodiment of the present invention may be configured such that the ratio between rolling motion and slipping motion is continuously changed according to the changing state of frictional force.

The robot cleaner 100 according to an embodiment of the present invention may have a compensation control structure for controlling movement, which is able to change the RPM of the motor by controlling the output of the plurality of motor drive unit 821 and 822 according to variation in the acceleration and angular speed obtained by the inertial measurement unit sensor 813.

For example, the controller 20 may control the rotational speed of the left spin mop 120a, the right spin mop 120b and the rolling mop 130a based on variation of acceleration and angular speed detected by the inertial measurement unit sensor 813.

The controller 20 is able to determine the current traveling state of the robot cleaner 100 based on predetermined information such as the heading angle of the robot cleaner 100 detected by the sensor unit 810.

Furthermore, the controller 20 is able to control stabilization of traveling motion through information obtained at the inertial measurement unit sensor 813.

Slipping extent and frictional force may vary according to the type and condition of the floor on which the robot cleaner 100 travels. The controller 20 is able to determine the traveling state of the robot cleaner 100, which varies according to the type and condition of the floor, through information obtained at the inertial measurement unit sensor 813, so as to perform compensation control.

FIG. 19 illustrates various condition of a floor that have an influence on frictional force.

FIG. 19(a) illustrates a linoleum sheet 1410, which is laid on a floor of a typical residential space. FIG. 19(b) illustrates a marble floor 1420, which is laid on the floor of a building lobby, a public facility or the like. FIG. 19(c) illustrates a coarse floor 1430. The coarse floor 1430 may be a floor made of a material having a coarse surface, such as a wood plate and a carpet.

The marble floor 1420 may be coarser, that is, may have greater frictional force, than the linoleum sheet 1410. Accordingly, when the robot cleaner 100 is controlled to be traveled with the same driving force, the actual traveling speed of the robot cleaner 100 on the marble floor 1420 may be higher than on the linoleum sheet 1410. The controller may control the motors 124 and 137d by respectively compensating the outputs of the motors 124 and 137d using information, such as acceleration and speed, detected by the sensor unit 810.

The coarse floor 1430 may have a higher frictional force than the linoleum sheet 1410. Accordingly, when the robot cleaner 100 is controlled to travel with the same driving force, the actual traveling speed of the robot cleaner 100 on the coarse floor 1430 may be lower than on the linoleum sheet 1410. The controller 20 may control the motors 124 and 137d by respectively compensating the outputs of the motors 124 and 137d using information, such as acceleration and speed, detected by the sensor unit 810.

The sensor unit 810 may include the obstacle sensor 811 for detecting an obstacle in front of the robot cleaner 100, and the controller 20 may perform control so as to perform a skirting traveling operation with respect to a detected obstacle.

According to the present invention, the controller 20 is able to perform control of various traveling motions by combining motion of the front spin mops 120a and 120b with motion of the rear rolling mop 130a.

Accordingly, the controller 20 may perform control so as to perform various skirting traveling operations according to an obstacle detected by the obstacle sensor 811.

The controller 20 may perform control so as to perform another skirting traveling operation based on the distance to an obstacle detected by the obstacle sensor 811.

For example, when the obstacle sensor 811 detects an obstacle, the controller 20 may perform control so as to perform a skirting traveling operation by rotating the rolling mop 130a forwards or backwards, depending on the distance to an obstacle detected by the obstacle sensor 811, while rotating both the left spin mop 120a and the right spin mop 120b clockwise or counterclockwise.

In other words, as described with reference to FIGS. 14 to 17, since the controller 20 may control the turning radius of the robot cleaner 100, the robot cleaner 100 may perform a turning operation with a turning radius appropriate to the distance to an obstacle detected by the obstacle sensor 811, thereby skirting around the obstacle.

As specifically described with reference to FIGS. 1 to 19, the robot cleaner 100 according to an embodiment of the present invention may include the spin module 120 including the left spin mop 120a and the right spin mop 120b, which are rotated clockwise or counterclockwise when viewed from above while in contact with the floor, the rolling module 130 being in contact with the floor at a position anteroposteriorly spaced apart from the left spin mop 120a and the right spin mop 120b, the sensor unit 810 including the plurality of sensors, and a controller 20 for controlling rotational motion of the left spin mop 120a and the right spin mop 120b and the rotational motion of the rolling mop 130a.

The controller 20 may perform control so as to perform rotational motion of the left spin mop 120a and the right spin mop 120b based on data detected by the sensor unit 810.

In the embodiment including the rolling mop 130a, the controller 20 may control the rotational motion of the rolling mop 130a.

Hereinafter, the embodiment including the rolling mop 130a will be mainly described.

The controller 20 may control the motors 124 and 137d of the spin mops and rolling mop 120a, 120b and 130a by compensating the output of the motor 124 and 137d using information, such as acceleration and speed, detected by the sensor unit 810.

Data detected by the sensors when the robot cleaner 100 travels on various floors and/or reference values determined based on the detected data may be stored in the storage unit 830, and the controller 20 may control the motion of the robot cleaner 100 by performing a comparison operation between the data detected upon traveling on various floors and previously stored data.

The controller 20 may detect a change in the position of the robot cleaner 100 and a change in the load current of the motors 124 and 137d of the mops 120a, 120b and 130a at a specific area of a floor based on data detected by the sensor unit 810. When a change in the position of the robot cleaner 100 or a change in the load current of the motors is detected, the controller 20 may determine the specific area to be a contaminated area.

Figures 20, 21:
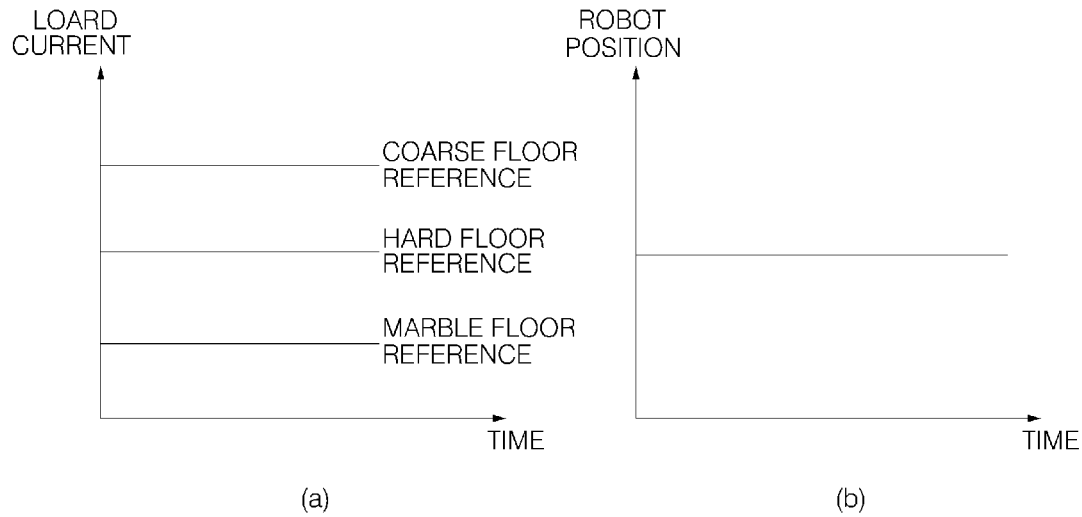
FIG. 20 is a view illustrating data detected during straight traveling on a normal floor without pollutants thereon.
FIG. 21 is a view useful for the description of state determination of the robot cleaner according to the embodiment of the present invention.

FIG. 20 illustrates data detected during straight travel on a normal floor without pollutants thereon.

FIG. 20(a) illustrates the load current of the motor during straight traveling on three types of floors.

Here, the term "hard floor" refers to a smooth floor composed of a stone material, a wood material or a linoleum sheet, and the term "coarse floor" refers to a floor composed of a soft material such as a carpet or a wood material having a coarse surface.

The marble floor may have a higher smoothness and a lower frictional force than a usual hard floor. Accordingly, when the mops 120a, 120b and 130a are rotated at the same speed, the load current of the motor on the marble floor is lower than on a usual hard floor, and the load current of the motor on the marble floor is also lower than on the hard floor.

The coarse floor may have a higher frictional force than the usual hard floor. Accordingly, when the mops 120a, 120b and the 130a are rotated at the same speed, the coarse floor causes a higher load and a higher detected load current than a usual hard floor.

According to the present invention, it is possible to detect a change in the condition of a floor by detecting the amount of current (load current value) I and the amount of current change ΔI of the motors 124 and 137d, which are connected to the front spin mops 120a and 120b and the rear rolling mop 130a, assuming that values on a normal floor are reference values.

In other words, it is possible to detect the condition change of a floor by detecting the change in the load current of the motors 124 and 137d attributable to friction with the floor.

Since the rolling mop 130a contacts a floor over a greater surface area than the spin mop 120a or 120b, the rolling mop 130a may be more sensitive to a change in the condition of a floor than the spin mop 120a or 120b. In this case, since the load current value of the motor associated with the rolling mop 130a may greatly change according to a change in the condition of the floor, it is possible to detect a change in the condition of the floor with a higher degree of accuracy.

Since the pair of spin mops 120a and 120b are respectively disposed to the left and right sides, there is an advantage of easily determining at which of the left and right sides the condition change occurs.

Furthermore, since the robot cleaner generally performs a forward traveling operation more frequently than a backward traveling operation, it is possible to more quickly detect a change in the condition of a floor using the load current value of a motor connected to a front one among the spin mops 120a and 120b and the rolling mop 130a.

Although FIG. 20(a) illustrates load current values of the motor during forward traveling on several types of floors, the present invention is not limited thereto. For example, the types of floors may be more finely classified so as to use data detected based on a greater variety of types of floors.

FIG. 20(b) illustrates position information detected during a normal forward traveling operation. For example, the position information may be heading angle information.

The controller 20 may compare position information detected during an actual forward traveling operation with the position information detected during a previous normal forward traveling operation shown in FIG. 20(b). As a result of the comparison, if a significant difference is found between the two pieces of position information, the controller 20 may determines that there is a change in the position of the robot cleaner 100.

According to an embodiment of the present invention, when a change in the position of the robot cleaner 100 is caused by a change in the condition of a floor due to a pollutant or the like, unlike the intended normal position during a forward traveling operation, a backward traveling operation or a turning operation, it is possible to determine that there is a change in the position of the robot cleaner 100, by detecting the position of the robot cleaner 100 and the magnitude of the change in the position of the robot cleaner 100 through the gyro sensor 813a or the geomagnetic sensor 813c.

In other words, when there is a change in the position of the robot cleaner 100 different from a change in the position of the robot cleaner in an intended motion, it is possible to determine that there is a change in the position of the robot cleaner 100 by detecting unwanted motion through the gyro sensor 813a or the geomagnetic sensor 813c.

Although FIG. 20 illustrates data detected during normal forward traveling operation and an embodiment using the data, the present invention is not limited thereto. For example, data detected during a turning operation and/or reference values determined based on the data detected during the turning operation may be stored in the storage unit 830, and the controller 20 may control the motion of the robot cleaner 100 by comparing the data detected during an actual turning operation with a previously stored data.

FIG. 21 is a view illustrating state determination of the robot cleaner 100 according to an embodiment of the present invention.

Referring to FIG. 21, the controller 20 may determine whether there is a change in the position of the robot cleaner 100 and a change in the load current of the motors 124 and 137d connected to the mops 120a, 120b and 130a based on data detected by the sensor unit 810. If it is determined that there is a change in position and a change in load current, the controller 20 may determine that the specific area of the floor at which the robot cleaner 100 is placed is contaminated area.

If it is determined that there is a change in the position without a change in the load current, the controller 20 may determine that the change in the position is caused by an external force.

Meanwhile, if it is determined that there is a change in the load current without a change in the position, the controller 20 may determine that the type of floor is changed.

Furthermore, if it is determined that there is no change in either position or load current, the controller 20 may determine that the robot cleaner 100 is performing an intended normal operation without exceptional circumstances.

Hereinafter, an embodiment in which the load current of the motor 137d is used for the purpose of determination will be described. However, in an embodiment which is provided with the left spin mop 120a and the right spin mop 120b, the load current of the motors 124 of the left spin mop 120a and the right spin mop 120b may be used like the previous embodiment, which uses the load current of the motor 137d of the rolling mop 130a.

When the value of position information detected by the sensor unit 810 is higher than a first upper-limit reference value or lower than a first lower-limit reference value, the controller 20 may determine that there is a change in the position of the robot cleaner 100. Here, the value of the position information may be a heading angle.

When the value of the load current of the motor connected to the rolling mop 130a, which is detected by the sensor unit 810, is higher than a second upper-limit reference value or lower than a second lower-limit reference value, the controller 20 may determine that there is a change in the load current.

In some embodiments, when the magnitude of a change in the load current of the motor connected to the left spin mop 120a exceeds a predetermined range, the controller 20 may determine that the floor area beneath the left portion of the robot cleaner 100 is a contaminated area. When the magnitude of a change in the load current of the motor connected to the right spin mop 120b exceeds the predetermined range, the controller 20 may determine that the floor area beneath the right portion of the robot cleaner 100 is a contaminated area.

The second upper-limit reference value and the second lower-limit reference value may be set differently depending on the type of floor.

The controller 20 may determine the kind of pollutant on the contaminated area based on the direction in which the load current of the motor connected to the rolling mop 130a varies.

For example, when the value of the load current of the motor connected to the rolling mop 130a increases to be higher than the second upper-limit reference value, the controller 20 may determine the contaminated area to be a sticky contaminated area. When the value of the load current of the motor connected to the rolling mop 130a decreases to be lower than the second lower-limit reference value, the controller 20 may determine the contaminated area to be a slippery contaminated area.

In some embodiments, the controller 20 may detect change in the speed of the robot cleaner 100 attributable to the pollutant by comparing the moving distance estimated by the acceleration sensor 813c with the actual moving distance of the robot cleaner 100.

The controller 20 may control the robot cleaner 100 to perform a skirting traveling operation so as to skirt around the contaminated area or to perform a concentrated cleaning operation.

Figure 22:
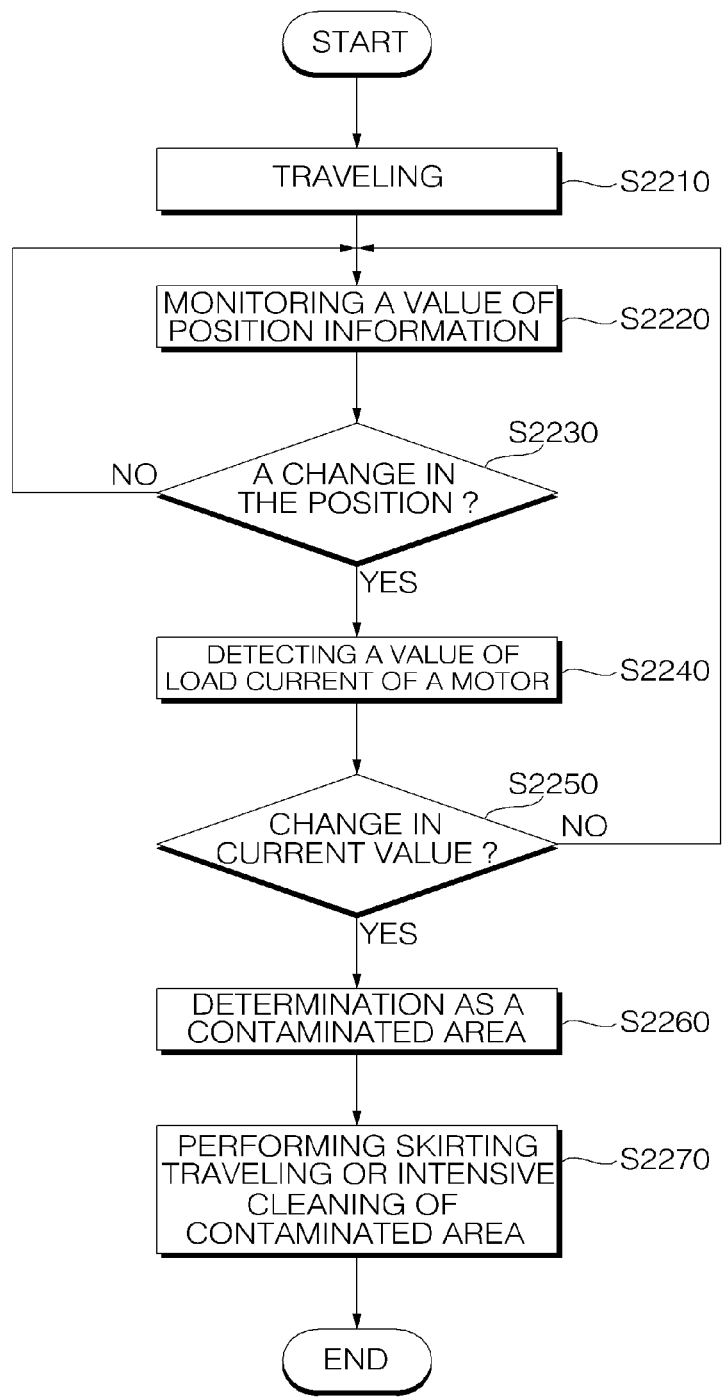
FIG. 22 is a flowchart illustrating a method of controlling the robot cleaner, according to an embodiment of the present invention.

FIG. 22 is a flowchart illustrating a method of controlling the robot cleaner, according to an embodiment of the present invention.

FIGS. 23 to 29 are views useful for the description of the method of controlling the robot cleaner according to the embodiment of the present invention.

Referring to FIG. 22, the robot cleaner 100 may travel under the control of the controller 20 (S2210), and the sensor unit 810 may monitor the value of position information of the robot cleaner 100 during traveling (S2220). Here, the value of position information may be a heading angle.

For example, the inertial measurement unit sensor 813 may include the gyro sensor 813a, the geomagnetic sensor 813b and an acceleration sensor 813c. The gyro sensor 813a may detect a designated reference direction, the geomagnetic sensor 813b may measure a heading angle (azimuthal angle), and the acceleration sensor 813c may measure speed variation. Consequently, the inertial measurement unit sensor 813 may measure a moving speed, a direction, a gravitational force and an acceleration of the robot cleaner 100.

Alternatively, the sensor unit 810 may include the gyro sensor 813a, the geomagnetic sensor 813b and the acceleration sensor 813c, which are independently provided.

According to an embodiment of the present invention, when a change in the position of the robot cleaner 100 is caused by a change in the condition of a floor due to a pollutant or the like, unlike the intended normal position during a forward traveling operation, a backward traveling operation or a turning operation, it is possible to determine that there is a change in the position of the robot cleaner 100 by detecting the position of the robot cleaner 100 and the magnitude of the change in the position of the robot cleaner 100 through the gyro sensor 813a or the geomagnetic sensor 813c.

In other words, if there is a change in the position of the robot cleaner 100 different from a change in the position of the robot cleaner in an intended motion, the controller 20 may determine that there is a change in the position of the robot cleaner 100, by detecting unwanted motion through the gyro sensor 813a or the geomagnetic sensor 813c.

The controller 20 may detect a change in the position of the robot cleaner 100 based on position information measured during a previous traveling operation. For example, the controller 20 may compare position information detected during an actual forward traveling operation with the position information detected during a previous normal forward traveling operation. As a result of the comparison, if a significant difference is found between the two pieces of position information, the controller 20 may determines that there is a change in the position of the robot cleaner 100.

If the detected value of position information is higher than a first upper-limit reference value or lower than a first lower-limit reference value, the controller 20 may determine that there is a change in the position of the robot cleaner 100 (S2230).

Here, the first upper-limit reference value and the first lower-limit reference value may be the upper-end limiter value and the lower-end limiter value of the reference range determined based on the value of position information measured during a previous traveling operation.

Since a contaminant tends to increase or decrease frictional force, the present invention may detect the presence of a contaminant using positional change information such as horizontal acceleration information and rotational angle information of the robot cleaner 100 (S2260).

Critical values (for example, a first upper-limit reference value and a first lower-limit reference value) of an amount of positional change may be previously set during a previous traveling operation, and the controller 20 may determine that there is a contaminant when the change in the position exceeds the critical values.

Under the control of the controller 20, the robot cleaner 100 may perform an intensive cleaning operation on a contaminated area, which has been determined to have a contaminant thereon (S2270).

In some embodiments, the controller 20 may determine whether a contaminant is present and to determine at which of the left and right sides the contaminant is present by measuring the current applied to the motor connected to the rolling mop 130a.

For example, if the detected value of position information is higher than the first upper-limit reference value or lower than the first lower-limit reference value, the controller 20 may detect the value of the load current of the motor connected to the rolling mop 130a (S2240).

In some embodiments, the controller 20 may finally determine whether a contaminant is present and at which of the left and right sides the contaminant is present by measuring the current applied to the motor connected to the left spin mop 120a and the right spin mop 120b.

For example, if the detected value of position information is higher than the first upper-limit reference value or lower than the first lower-limit reference value, the controller 20 may detect values of the load current of the motors connected to the left spin mop 120a and the right spin mop 120b (S2240).

In other words, if it is determined that there is a change in the position (S2230), the controller 20 may detect the value of the load current of the motor in order to determine whether the change in the position is caused by a contaminant (S2240).

The value of the load current of the motor may be detected by the motor sensor 815 included in the sensor unit 810 or the current detector included in the first and second motor drive units 821 and 822. In some embodiments, the motor sensor 815 may be connected to the current detector included in the first and second motor drive units 821 and 822 or may include the current detector.

According to the present invention, it is possible to detect a change in the condition of a floor by detecting an amount of current (load current value) I and the amount of current change ΔI of the motors 124 and 137d, which are connected to the front spin mops 120a and 120b and the rear rolling mop 130a, assuming that values on a normal floor are reference values.

In other words, it is possible to detect a change in the condition of a floor by detecting a change in the load current of the motors 124 and 137d attributable to friction with the floor.

For example, if the value of the load current of the motor connected to the rolling mop 130a is higher than the second upper-limit reference value or lower than the second lower-limit reference value (S2250), the controller 20 may determine the specific area of the floor to be a contaminated area (S2260).

Here, the first upper-limit reference value and the first lower-limit reference value may be the upper-end limiter value and the lower-end limiter value of the reference range determined based on the value of position information measured during a previous traveling operation. The second upper-limit reference value and the second lower-limit reference value may be set to be different depending on the type of floor.

FIG. 23 illustrates data detected during a straight traveling operation when a sticky pollutant is present on a hard floor.

More specifically, FIG. 23(a) illustrates position information detected during a straight traveling operation when a sticky pollutant is present on a hard floor. FIG. 23(b) illustrates the value of the load current of the motor detected during a straight traveling operation when a sticky pollutant is present on a hard floor.

Referring to FIG. 23(a), when a sticky pollutant is present on a hard floor, the value of position information detected during a straight traveling operation may depart from the range defined between the first upper-limit reference value RU1 and the first lower-limit reference value RD1.

When a sticky pollutant is present on a hard floor, the frictional force at a specific area of the floor may increase due to the sticky pollutant. Hence, the robot cleaner 100 may not maintain the value of position information obtained during the intended normal traveling operation, and the value of position information may exceed the first upper-limit reference value RU1.

In this case, the controller 20 may determine that there is a change in the position.

Referring to FIG. 23(b), when a sticky pollutant is present on a hard floor, the value of the load current of the motor detected during a straight traveling operation may depart from the range defined between the second upper-limit reference value RU2 and the second lower-limit reference value RD2.

When a sticky pollutant is present on a hard floor, the frictional force at a specific area of the floor may increase due to the sticky pollutant. Hence, the robot cleaner 100 may not maintain the value of the load current of the motor obtained during the intended normal traveling operation, and the value of the load current of the motor may exceed the second upper-limit reference value RU2.

In contrast, when a slippery pollutant is present on a hard floor, the frictional force at a specific area of the floor may decrease due to the slippery pollutant. Hence, the robot cleaner 100 may not maintain the value of the load current of the motor obtained during the intended normal traveling operation, and the value of the load current of the motor may decrease and thus exceed the second lower-limit reference value RD2.

In this case, the controller 20 may determine that there is a change in the load current.

FIG. 24 illustrates data detected during a straight traveling operation when a slippery pollutant is present on a marble floor.

More specifically, FIG. 24(a) illustrates position information detected during a straight traveling operation when a slippery pollutant is present on a marble floor. FIG. 24(b) illustrates the value of the load current of the motor detected during a straight traveling operation when a slippery pollutant is present on a marble floor.

Referring to FIG. 24(a), when a slippery pollutant is present on a marble floor, the value of position information detected during a straight traveling operation may depart from the range defined between the first upper-limit reference value RU1 and the first lower-limit reference value RD1.

When a slippery pollutant is present on a marble floor, the frictional force at a specific area of the floor may decrease due to the slippery pollutant. Hence, the robot cleaner 100 may not maintain the value of position information obtained during the intended normal traveling operation, and the value of position information may exceed the first upper-limit reference value RU1.

In this case, the controller 20 may determine that there is a change in the position.

Referring to FIG. 24(b), when a slippery pollutant is present on a marble floor, the value of the load current of the motor detected during a straight traveling operation may depart from the range defined between the second upper-limit reference value RU2 and the second lower-limit reference value RD2.

When a slippery pollutant is present on a marble floor, the frictional force at a specific area of the floor may decrease due to the slippery pollutant. Hence, the robot cleaner 100 may not maintain the value of the load current of the motor obtained during the intended normal traveling operation, and the value of the load current of the motor may exceed the second lower-limit reference value RD2.

In contrast, when a sticky pollutant is present on a marble floor, the frictional force at a specific area of the floor may increase due to the sticky pollutant. Hence, the robot cleaner 100 may not maintain the value of the load current of the motor obtained during the intended normal traveling operation, and the value of the load current of the motor may increase and thus exceed the second upper-limit reference value RU2.

In this case, the controller 20 may determine that there is a change in the load current.

Thereafter, the controller 20 may control the robot cleaner 100 to perform a skirting traveling operation so as to skirt around the contaminated area or to perform an intensive cleaning operation (S2270).

According to the present invention, the controller 20 is able to perform control of various skirting motions by combining motion of the front spin mops 120*a* and 120*b* with motion of the rear rolling mop 130*a*. Accordingly, the controller 20 may control the robot cleaner 100 to perform various skirting traveling operations so as to skirt around the detected contaminated area.

According to the present invention, the rolling mop 130*a* may be rotated so as to generate a propulsive force in a direction opposite the direction in which a propulsive force generated by rotation of the spin mops 120*a* and 120*b* is directed. Accordingly, since force equilibrium may be established by controlling the propulsive forces, the robot cleaner 100 may perform an intensive cleaning operation at a specific area while standing in place.

Specifically, the controller 20 may control the robot cleaner 100 to stand in place by controlling the propulsive force generated by rotation of the spin mops 120*a* and 120*b* and the propulsive force generated by rotation of the rolling mop 130*a* to be directed opposite each other while establishing equilibrium between the opposite propulsive forces.

At this time, since the spin mops 120*a* and 120*b* and the rolling mop 130*a* continue to rotate without cease, the intensive cleaning operation may be continuously performed.

The controller 20 may detect a change in the speed of the robot cleaner 100 attributable to a pollutant by comparing the moving distance estimated by the acceleration sensor 813*c* with the actual moving distance of the robot cleaner 100.

When the value of the load current of the motor connected to the left spin mop 120*a* is higher than the second upper-limit reference value or lower than the second lower-limit reference value, the controller 20 may determine that a floor area beneath a left portion of the robot cleaner 100 is a contaminated area. In contrast, when the value of the load current of the motor connected to the right spin mop 120*b* is higher than the second upper-limit reference value or lower than the second lower-limit reference value, the controller 20 may determine that a floor area beneath the right portion of the robot cleaner 100 is a contaminated area.

In addition, the controller 20 may determine the kind of pollutant on the contaminated area based on the direction of deviation of the load current of the motor connected to the rolling mop 130*a*.

For example, when the value of the load current of the motor connected to the rolling mop 130*a* increases and thus exceed the second upper-limit reference value, the controller 20 may determine the contaminated area to be a sticky contaminated area. Accordingly, when the value of the load current of the motor connected to the rolling mop 130*a* decreases and thus falls below the second lower-limit reference value, the controller 20 may determine the contaminated area to be a slippery contaminated area.

In contrast, when the value of the load current of the motor connected to the rolling mop 130*a* is not higher than the second upper-limit reference value and not lower than the second lower-limit reference value, the controller 20 may determine the change in the position to be caused by an external force.

Figure 26:
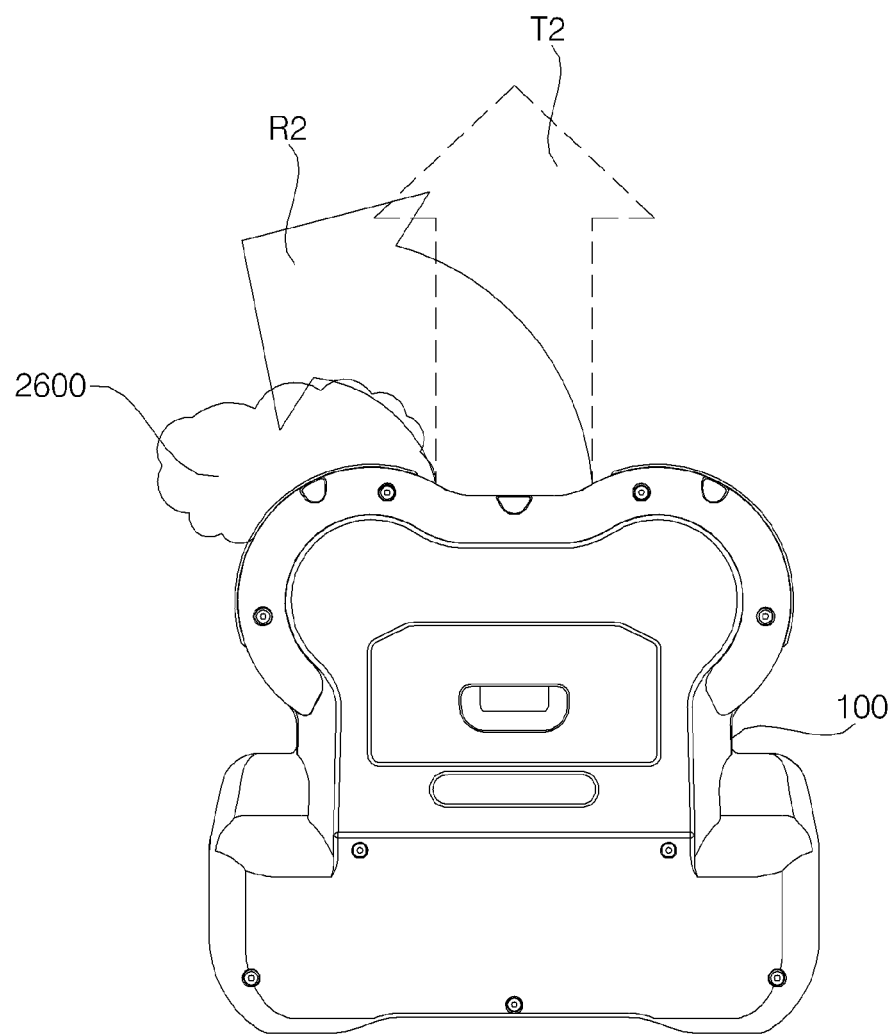
Figure 27:
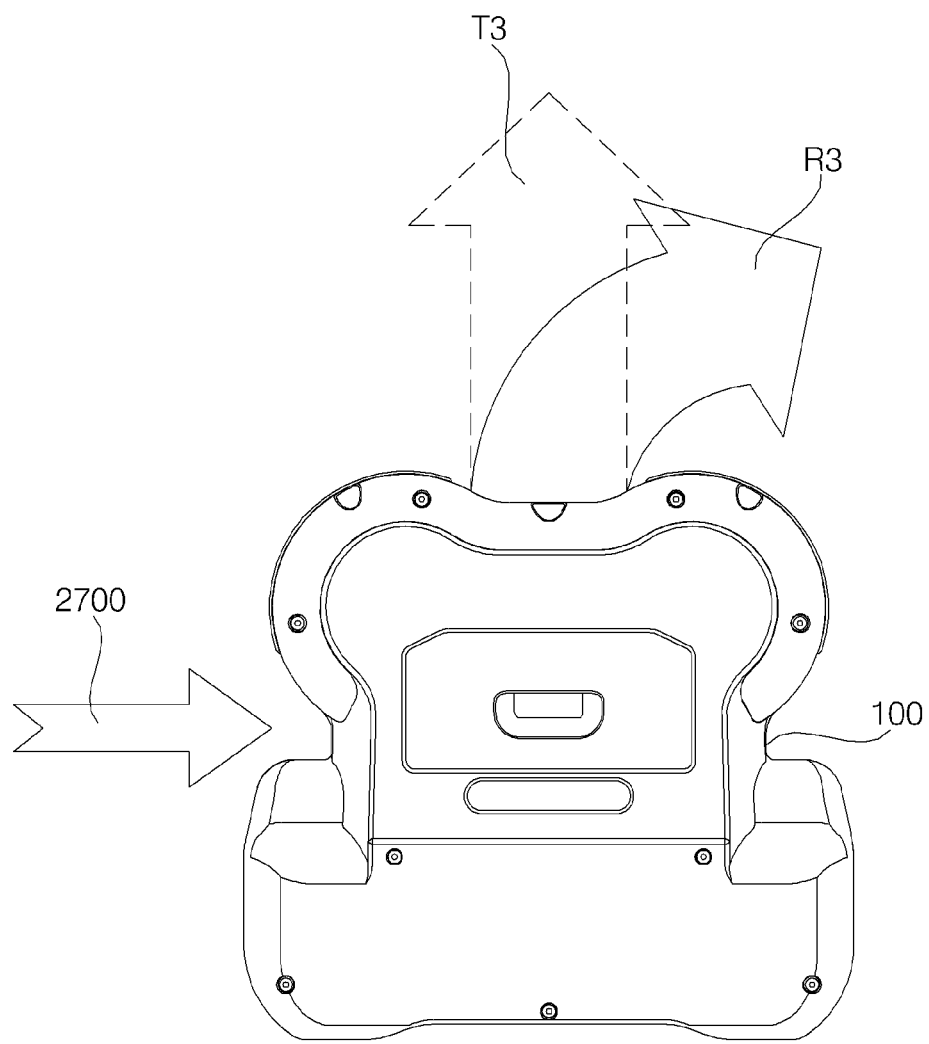

FIGS. 25 to 27 illustrate examples of determining whether a contaminant is present under the various conditions.

Referring to FIG. 25, when the contaminant is a kind of material that increases a frictional force between the rolling mop 130*a* and/or the spin mops 120*a* and 120*b* and a floor, the actual traveling direction R1 of the robot cleaner 100 may be different from the intended traveling direction T1.

For example, when a contaminant that increases frictional force is present on the floor area at which the left spin mop 120*a* is placed, the actual traveling direction R1 of the robot cleaner 100 is turned rightward rather than being directed in the intended traveling direction T1.

At this time, the value of load current applied to the motor connected to the rolling mop 130*a* and/or the two spin mops 120*a* and 120*b* is measured. As a result of the measurement, when the value of load current applied to the motor connected to the left spin mop 120*a* is higher than a reference value, the controller 20 may determine that the contaminant, which increases a frictional force, is present on a floor area at which the left spin mop 120*a* is placed. Accordingly, the controller 20 may determine the floor area at which the left spin mop 120*a* is placed to be a contaminated area.

Referring to FIG. 26, when the contaminant is a kind of material that decreases a frictional force between the rolling mop 130*a* and/or the spin mops 120*a* and 120*b* and a floor, the actual traveling direction R2 of the robot cleaner 100 may be different from the intended traveling direction T1.

For example, when a contaminant that decreases a frictional force, is present on a floor area at which the left spin mop 120*a* is placed, the actual traveling direction R2 of the robot cleaner 100 is turned left rather than being directed in the intended traveling direction T2.

At this time, the value of load current applied to the motor connected to the rolling mop 130*a* and/or the two spin mops 120*a* and 120*b* is measured. As a result of the measurement, when the value of load current applied to the motor connected to the left spin mop 120*a* is lower than the reference value, the controller 20 may determine that the contaminant, which decreases a frictional force, is present on a floor area at which the left spin mop 120*a* is placed. Accordingly, the controller 20 may determine the floor area at which the left spin mop 120*a* is placed to be a contaminated area.

Referring to FIG. 27, an external force 2700 may be applied to the robot cleaner 100 from the left or right side of the robot cleaner 100 in the state in which there is no contaminant between the rolling mop 130*a* and/or the spin mops 120*a* and 120*b*. For example, an external force may be applied to the robot cleaner 100 in the event that the robot cleaner 100 collides with a user or an obstacle or is pushed by the user during a traveling operation.

In this case, the actual traveling direction R3 of the robot cleaner 100 may be different from the intended traveling direction T3.

For example, when an external force 2700 is applied to the robot cleaner 100 from the left side to the right side, the actual traveling direction R3 of the robot cleaner 100 is turned right rather than being directed in the intended traveling direction T3.

At this time, the values of load current applied to the motors connected to the rolling mop 130a and/or the two spin mops 120a and 120b is measured. As a result of the measurement, when the values of load current applied to all of the motors are in the reference range (the range between the upper- and lower-limit reference values), the controller 20 may determine that a contaminant is not present on any of the floor areas at which the rolling mop 130a and/or the spin mops 120a and 120b are placed.

Although FIGS. 20, 23 and 24 illustrate an example in which detected data maintain constant values, this is an ideal case, and data measured during an actual traveling operation tends to vary within a predetermined range.

Accordingly, the present invention may apply predetermined reference ranges as criteria for determining a change in position and a change in load current.

For example, a first upper-limit reference value RU1 and a first lower-limit reference value RD1 may be set for a change in the position, and a second upper-limit reference value RU2 and a second lower-limit reference value RD2 for a change in the load current of the motor.

Figure 28:
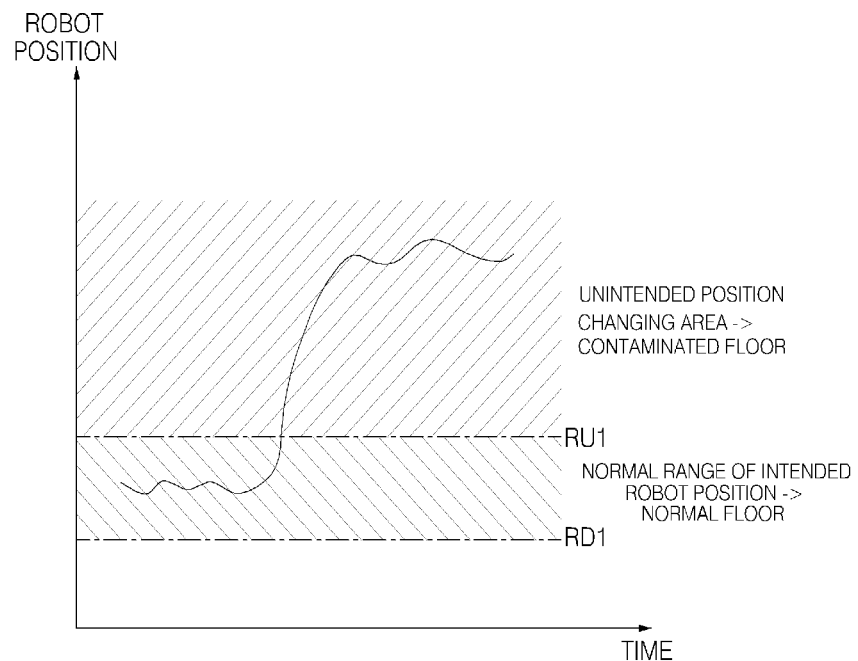

Referring to FIG. 28, the value of position information that is detected when the robot cleaner 100 performs an intended motion on a normal floor does not depart from the reference range between the first upper-limit reference value RU1 and the first lower-limit reference value RD1.

However, the robot cleaner 100 may exhibit an unintended a change in the position on a floor on which a contaminant is present. Accordingly, the detected value of position information may depart from the reference range between the first upper-limit reference value RU1 and the first upper-limit reference value RD1. At this time, the controller 20 may determine that a change in the position of the robot cleaner 100 occurs.

Figure 29:
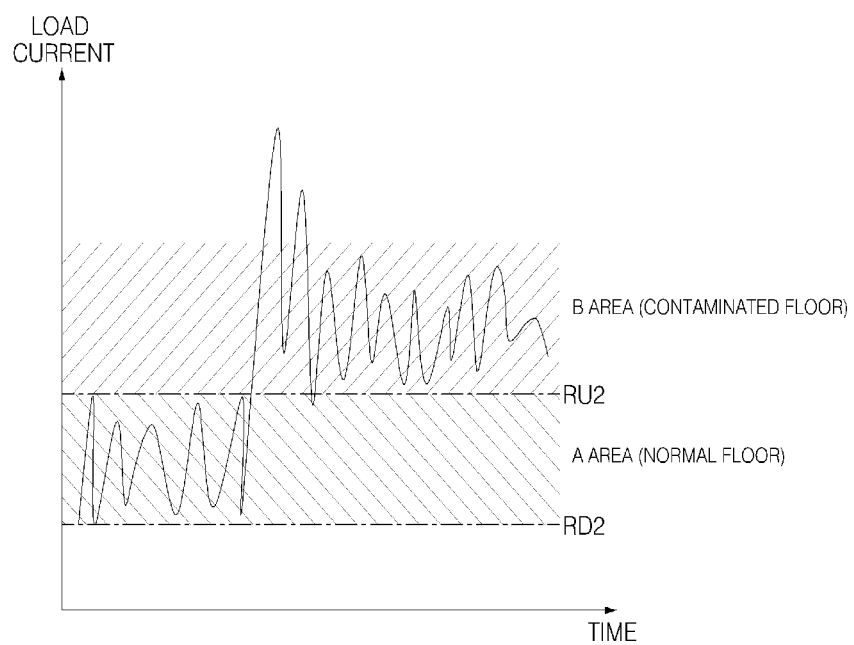

Referring to FIG. 29, when the robot cleaner 100 performs an intended motion on a normal floor, a detected value of the load current of the motor does not depart from the reference range between the first upper-limit reference value RU1 and the first upper-limit reference value RD1.

However, when the robot cleaner 100 performs a traveling motion on a floor on which a contaminant is present, a change in the load current of the motor may occur due to a change in frictional force between the mops and the floor. Accordingly, a detected value of the load current of the motor may depart from the reference range between the second upper-limit reference value RU2 and the second upper-limit reference value RD2. At this time, the controller 20 may determine that a change in the load current of the motor occurs.

According to at least one of the embodiments of the present invention, there is an advantage in that the robot cleaner performs a stable traveling operation using the pair of spin mops and a single rolling mop.

According to at least one of the embodiments of the present invention, it is possible to realize various traveling motions by combining rotational motion of the left and right spin mops with the rotational motion of the rolling mop.

According to at least one of the embodiments of the present invention, the robot cleaner is able to perform a traveling operation suitable for the situation using various traveling motions.

According to at least one of the embodiments of the present invention, the robot cleaner is able to perform a mopping operation while standing in place.

According to at least one of the embodiments of the present invention, the robot cleaner is able to detect the position of a contaminant and the kind of a floor without having to provide additional sensors having no relation to traveling.

According to at least one of the embodiments of the present invention, the robot cleaner is able to perform an optimized traveling operation according to the position of a contaminant and the kind of a floor.

The present invention is directed to a method of detecting a pollutant using the robot cleaner 100 configured to perform a mopping operation using frictional motion of the mops 120a, 120b and 130a, which are rotated by the drive motors, while performing a traveling operation, and a method of controlling the robot cleaner.

The robot cleaner 100 according to the present invention is able to determine the contaminated state of a floor and to perform an intensive cleaning operation on the contaminated area or to skirt around the contaminated area.

The robot cleaner and the method of controlling the robot cleaner according to the present invention are not limited to the above-described embodiments, and all or some of the above embodiments may be selectively combined so as to realize various modifications.

The method of controlling a robot cleaner, according to the present invention may be implemented as processor-readable code that can be written on a processor-readable recording medium and thus read by a processor of the robot cleaner. The processor-readable recording medium may be any type of recording device in which data is stored in a processor-readable manner. Examples of the processor-readable recording medium include a ROM, a RAM, a CD-ROM, a magnetic tape, a floppy disc, optical data storage, and a carrier wave such as data transmission over the Internet. The processor-readable recording medium can be distributed over a plurality of computer systems connected to a network so that processor-readable code is written thereto and executed therefrom in a decentralized manner.

While the present disclosure has been particularly shown and described with reference to preferred embodiments thereof, it will be understood by those of ordinary skill in the art that the present disclosure is not limited to the foregoing specific embodiments, and that various modifications may be made therein without departing from the spirit and scope of the present disclosure, and these modified embodiments should not be understood individually from the spirit and scope of the present disclosure.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A robot cleaner comprising:
   a rolling cleaning module including a rolling member configured to rotate clockwise or counterclockwise when viewed from a left side of the robot cleaner while in contact with a floor;
   a sensor unit including a plurality of sensors;
   a controller configured to detect a change in position of the robot cleaner and a change in load current of a motor connected to the rolling member based on data detected by the sensor unit and to, upon detecting the change in position and the change in load current, determine a specific area of the floor to be a contaminated area; and a spin module including left and right spin mops configured to rotate clockwise or counterclockwise when viewed from above while being in contact with the floor, wherein the controller is configured to determine a direction of the contaminated area based on a change in load current of motors connected to the left and right spin mops.

2. The robot cleaner according to claim 1, wherein the controller is configured to determine that the change in position is caused by an external force when it is determined that there is the change in position without the change in load current of the motor connected to the rolling member.

3. The robot cleaner according to claim 1, wherein the controller is configured to determine that a kind of the floor is changed when it is determined that there is the change in load current of the motor connected to the rolling member without the change in position.

4. The robot cleaner according to claim 1, wherein the controller is configured to determine that there is the change in position when a value of position information detected by the sensor unit is higher than a first upper-limit reference value or lower than a first lower-limit reference value, and to determine that there is the change in load current of the motor connected to the rolling member when a value of the load current of the motor connected to the rolling member is higher than a second upper-limit reference value or lower than a second lower-limit reference value.

5. The robot cleaner according to claim 4, wherein the controller is configured to determine the contaminated area to be a sticky contaminated area when the value of the load current of the motor connected to the rolling member increases to be higher than the second upper-limit reference value, and to determine the contaminated area to be a slippery contaminated area when the value of the load current of the motor connected to the rolling member decreases to be lower than the second lower-limit reference value.

6. The robot cleaner according to claim 4, wherein the second upper-limit reference value and the second lower-limit reference value are set to be different according to a kind of the floor.

7. The robot cleaner according to claim 4, wherein the value of position information is a heading angle.

8. The robot cleaner according to claim 1, wherein the controller is configured to detect a change in speed of the robot cleaner attributable to a pollutant by comparing an actual moving distance of the robot cleaner with a moving distance estimated by an acceleration sensor.

9. The robot cleaner according to claim 1, wherein the controller is configured to determine a kind of a pollutant on the contaminated area based on a direction in which a value of the load current of the motor connected to the rolling member changes.

10. The robot cleaner according to claim 1, wherein the controller is configured to control the robot cleaner to perform a skirting traveling operation so as to skirt the contaminated area or to perform an intensive cleaning operation on the contaminated area.

11. The robot cleaner according to claim 1, wherein the sensor unit includes one or more cliff sensors each having a light-emitting element and a light-receiving element, and wherein the controller is configured to determine a material of the floor based on an amount of light emitted from the light-emitting element, that is reflected by the floor and received into the light-receiving element.

12. The robot cleaner according to claim 11, wherein the controller is configured to determine the floor to be a hard floor when an amount of the reflected light is higher than a predetermined reference value, and to determine the floor to be a carpet when the amount of the reflected light is lower than the predetermined reference value.

* * * * *